United States Patent
Kang et al.

(10) Patent No.: US 10,928,985 B2
(45) Date of Patent: *Feb. 23, 2021

(54) USER TERMINAL DEVICE AND DISPLAYING METHOD THEREOF

(71) Applicant: SAMSUNG ELECTRONICS CO., LTD., Suwon-si (KR)

(72) Inventors: Dong-goo Kang, Seoul (KR); Yun-kyung Kim, Suwon-si (KR); Yong-yeon Lee, Suwon-si (KR); Ji-yeon Kwak, Seoul (KR); Hyun-jin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,666

(22) Filed: Oct. 7, 2019

(65) Prior Publication Data

US 2020/0034012 A1 Jan. 30, 2020

Related U.S. Application Data

(63) Continuation of application No. 14/618,379, filed on Feb. 10, 2015, now Pat. No. 10,437,421.
(Continued)

(30) Foreign Application Priority Data

Jul. 17, 2014 (KR) .......................... 10-2014-0090403

(51) Int. Cl.
*G06F 3/041* (2006.01)
*G06F 3/0482* (2013.01)
(Continued)

(52) U.S. Cl.
CPC ............ *G06F 3/0482* (2013.01); *G06F 1/165* (2013.01); *G06F 1/1641* (2013.01);
(Continued)

(58) Field of Classification Search
CPC ...... G06F 1/1618; G06F 1/165; G06F 1/1652; G06F 1/1677; G06F 1/1692;
(Continued)

(56) References Cited

U.S. PATENT DOCUMENTS

| 7,453,437 B2 | 11/2008 | Inui |
| 8,502,788 B2 | 8/2013 | Cho |

(Continued)

FOREIGN PATENT DOCUMENTS

| CN | 1334690 A | 2/2002 |
| CN | 1879395 A | 12/2006 |

(Continued)

OTHER PUBLICATIONS

Communication dated Dec. 30, 2019 issued by the Korean intellectual Property Office in counterpart Korean Application No. 10-2014-0090403.
(Continued)

*Primary Examiner* — Insa Sadio
(74) *Attorney, Agent, or Firm* — Sughrue Mion, PLLC

(57) ABSTRACT

A user terminal device and a controlling method thereof are provided. The user terminal device includes a display configured to be divided into a first area and a second area which is larger than the first area with reference to a folding line, a cover disposed on a rear side of the display, a detector configured to detect a user interaction on the display and the cover, and a controller configured to, in response to the display being folded along the folding line such that the first area and the second area face each other, control the detector to detect a user interaction through an exposure area, which
(Continued)

is an exposed part of the second area, and the cover, and, in response to the display being folded such that the two parts of the cover face with each other with reference to the folding line, control the detector to detect a user interaction through the first area and the second area.

17 Claims, 125 Drawing Sheets

Related U.S. Application Data

(60) Provisional application No. 61/937,744, filed on Feb. 10, 2014.

(51) Int. Cl.

| | | |
|---|---|---|
| G06F 3/0484 | (2013.01) | |
| G06F 3/0488 | (2013.01) | |
| G06F 3/0481 | (2013.01) | |
| G06F 9/451 | (2018.01) | |
| H04M 1/725 | (2021.01) | |
| G06F 1/16 | (2006.01) | |
| G06F 3/0487 | (2013.01) | |
| G11B 27/34 | (2006.01) | |
| H04M 1/02 | (2006.01) | |

(52) U.S. Cl.
CPC .......... *G06F 1/1652* (2013.01); *G06F 1/1677* (2013.01); *G06F 1/1692* (2013.01); *G06F 1/1694* (2013.01); *G06F 3/0487* (2013.01); *G06F 3/0488* (2013.01); *G06F 3/04817* (2013.01); *G06F 3/04842* (2013.01); *G06F 3/04883* (2013.01); *G06F 3/04886* (2013.01); *G06F 9/451* (2018.02); *G11B 27/34* (2013.01); *H04M 1/0214* (2013.01); *H04M 1/0243* (2013.01); *H04M 1/0245* (2013.01); *H04M 1/72522* (2013.01); *H04M 1/72583* (2013.01); *G06F 2200/1637* (2013.01); *G06F 2203/04803* (2013.01); *H04M 2250/16* (2013.01); *H04M 2250/22* (2013.01)

(58) Field of Classification Search
CPC ....... G06F 2203/04803; G06F 3/04817; G06F 3/0482; G06F 3/04842; G06F 3/0487; G06F 3/0488; G06F 3/04883; G06F 3/04886; G06F 9/4443; G06F 9/451; H04M 1/0214; H04M 1/0243; H04M 1/0245; H04M 1/72522; H04M 1/72583; H04M 2250/16; H04M 2250/22
See application file for complete search history.

(56) References Cited

U.S. PATENT DOCUMENTS

| | | | |
|---|---|---|---|
| 8,836,611 B2 | 9/2014 | Kilpatrick, II et al. | |
| 8,863,038 B2 | 10/2014 | King et al. | |
| 8,866,840 B2 | 10/2014 | Dahl et al. | |
| 8,923,934 B2 | 12/2014 | Choi et al. | |
| 8,947,462 B2 | 2/2015 | Joo | |
| 9,020,571 B2 | 4/2015 | Chi et al. | |
| 9,112,988 B2 | 8/2015 | Lee et al. | |
| 9,436,378 B2 | 9/2016 | Lee et al. | |
| 9,448,660 B2 | 9/2016 | Seo et al. | |
| 9,489,078 B2 | 11/2016 | Seo et al. | |
| 9,489,079 B2 | 11/2016 | Seo et al. | |
| 9,489,080 B2 | 11/2016 | Seo et al. | |
| 9,684,342 B2 | 6/2017 | Kim et al. | |
| 9,818,370 B2 | 11/2017 | Joo | |
| 9,864,438 B2 | 1/2018 | Seo et al. | |
| 10,114,476 B2 | 10/2018 | Seo et al. | |
| 10,275,045 B2 | 4/2019 | Seo et al. | |
| 10,459,625 B2 | 10/2019 | Seo et al. | |
| 10,503,274 B2 | 12/2019 | Seo et al. | |
| 10,534,531 B2 | 1/2020 | Seo et al. | |
| 10,642,485 B1 | 5/2020 | Seo et al. | |
| 2002/0005818 A1 | 1/2002 | Bruzzone | |
| 2005/0104866 A1 | 5/2005 | Inui | |
| 2006/0189345 A1* | 8/2006 | Suzuki | H04M 1/72577 |
| | | | 455/550.1 |
| 2007/0149262 A1 | 6/2007 | Navntoft | |
| 2008/0158795 A1 | 7/2008 | Aoki et al. | |
| 2009/0011798 A1 | 1/2009 | Yamada | |
| 2009/0164951 A1 | 6/2009 | Kumar | |
| 2010/0056272 A1 | 3/2010 | Dutilly et al. | |
| 2010/0064244 A1 | 3/2010 | Kilpatrick, II et al. | |
| 2010/0079355 A1 | 4/2010 | Kilpatrick, II et al. | |
| 2010/0085274 A1* | 4/2010 | Kilpatrick, II | H04M 1/0247 |
| | | | 345/1.3 |
| 2010/0120470 A1 | 5/2010 | Kim et al. | |
| 2010/0131880 A1 | 5/2010 | Lee et al. | |
| 2010/0162169 A1 | 6/2010 | Skarp | |
| 2010/0182265 A1 | 7/2010 | Kim et al. | |
| 2010/0241989 A1 | 9/2010 | Wen | |
| 2010/0302179 A1 | 12/2010 | Ahn et al. | |
| 2011/0126141 A1 | 5/2011 | King et al. | |
| 2011/0216064 A1 | 9/2011 | Dahl et al. | |
| 2011/0241998 A1 | 10/2011 | McKinney et al. | |
| 2012/0115422 A1 | 5/2012 | Tziortzis et al. | |
| 2012/0129581 A1 | 5/2012 | Choi et al. | |
| 2012/0174026 A1 | 7/2012 | Shim et al. | |
| 2012/0262367 A1 | 10/2012 | Chiu et al. | |
| 2012/0307472 A1 | 12/2012 | Bohn et al. | |
| 2013/0021762 A1 | 1/2013 | van Dijk et al. | |
| 2013/0027364 A1* | 1/2013 | Kim | G06F 1/1616 |
| | | | 345/204 |
| 2013/0050270 A1 | 2/2013 | Joo | |
| 2013/0076649 A1 | 3/2013 | Myers et al. | |
| 2013/0097668 A1 | 4/2013 | Park et al. | |
| 2013/0120239 A1 | 5/2013 | Suzuki et al. | |
| 2013/0127918 A1 | 5/2013 | Kang et al. | |
| 2013/0141373 A1 | 6/2013 | Takuma et al. | |
| 2013/0154970 A1 | 6/2013 | Seo et al. | |
| 2013/0176248 A1 | 7/2013 | Shin et al. | |
| 2013/0222998 A1 | 8/2013 | Cho et al. | |
| 2013/0265221 A1 | 10/2013 | Lee et al. | |
| 2013/0296000 A1 | 11/2013 | Park et al. | |
| 2013/0300679 A1 | 11/2013 | Oh et al. | |
| 2013/0300697 A1 | 11/2013 | Kim et al. | |
| 2013/0307816 A1 | 11/2013 | Lee et al. | |
| 2013/0314349 A1 | 11/2013 | Chien et al. | |
| 2013/0315419 A1 | 11/2013 | Chien | |
| 2013/0321340 A1 | 12/2013 | Seo et al. | |
| 2014/0004906 A1 | 1/2014 | Chi et al. | |
| 2014/0028596 A1 | 1/2014 | Seo et al. | |
| 2014/0029212 A1 | 1/2014 | Hwang et al. | |
| 2014/0062919 A1* | 3/2014 | Park | G06F 1/1643 |
| | | | 345/173 |
| 2014/0245225 A1 | 8/2014 | Yagihashi et al. | |
| 2014/0320393 A1 | 10/2014 | Modarres et al. | |
| 2015/0004939 A1 | 1/2015 | Higashibeppu | |
| 2015/0145798 A1 | 5/2015 | Joo | |
| 2015/0153778 A1 | 6/2015 | Jung | |
| 2015/0227271 A1 | 8/2015 | Kang et al. | |
| 2015/0277695 A1 | 10/2015 | Lee et al. | |
| 2015/0309691 A1 | 10/2015 | Seo et al. | |
| 2015/0378503 A1 | 12/2015 | Seo et al. | |
| 2016/0357397 A1 | 12/2016 | Lee et al. | |
| 2016/0370877 A1 | 12/2016 | Seo et al. | |
| 2017/0052698 A1 | 2/2017 | Seo et al. | |
| 2018/0120954 A1 | 5/2018 | Seo et al. | |
| 2019/0033984 A1 | 1/2019 | Seo et al. | |
| 2019/0179425 A1 | 6/2019 | Seo et al. | |
| 2019/0272091 A1 | 9/2019 | Seo et al. | |
| 2020/0117285 A1 | 4/2020 | Seo et al. | |

(56) References Cited

U.S. PATENT DOCUMENTS

FOREIGN PATENT DOCUMENTS

| CN | 101452365 A | 6/2009 |
|---|---|---|
| CN | 101788850 A | 7/2010 |
| CN | 102150095 A | 8/2011 |
| CN | 102150120 A | 8/2011 |
| CN | 102187296 A | 9/2011 |
| CN | 102469183 A | 5/2012 |
| CN | 102591558 A | 7/2012 |
| CN | 103477304 A | 12/2013 |
| EP | 2581808 A1 | 4/2013 |
| EP | 3 105 666 | 8/2015 |
| EP | 3 105 667 | 8/2015 |
| JP | 2005-149364 A | 6/2005 |
| JP | 2009-124449 A | 6/2009 |
| JP | 2009-201157 A | 9/2009 |
| JP | 2010-63159 A | 3/2010 |
| JP | 2010-66918 A | 3/2010 |
| JP | 2013-73352 A | 4/2013 |
| KR | 10-1063882 B1 | 9/2011 |
| KR | 1020120092037 A | 8/2012 |
| KR | 10-2013-0024085 A | 3/2013 |
| KR | 10-2013-0056674 A | 5/2013 |
| KR | 10-2013-0113895 A | 10/2013 |
| KR | 10-2013-0127122 A | 11/2013 |
| KR | 10-2014-0003132 A | 1/2014 |
| KR | 1020140016082 A | 2/2014 |
| RU | 2 480 811 C2 | 4/2013 |
| WO | 2005/053287 A1 | 6/2005 |
| WO | 2008/147637 A1 | 12/2008 |
| WO | 2010/028394 A1 | 3/2010 |
| WO | 2012/160674 A1 | 11/2012 |
| WO | 2013/154318 A1 | 10/2013 |
| WO | 2014/021628 A1 | 2/2014 |

OTHER PUBLICATIONS

Communication dated Mar. 12, 2020 issued by the European Intellectual Property Office in counterpart European Application No. 19208930.8.
Communication dated Jan. 14, 2020 issued by the European Intellectual Property Office in counterpart European Application No. 15 746 532.9.
Communication dated Dec. 30, 2019 issued by the United States Patent Office in counterpart U.S. Appl. No. 16/683,629.
Office Action dated Jul. 11, 2017, issued by the Australian Patent Office in counterpart Australian Application No. 2015214697.
Communication issued by the Russian Patent Office dated Oct. 27, 2017 in counterpart Russian Patent Application No. 2016136345.
Communication dated Feb. 8, 2019, issued by the European Patent Office in counterpart European Application No. 15 745 916.5.
Communication dated May 8, 2019, issued by the Chinese Patent Office in counterpart Chinese Application No. 201580007989.1.
Communication dated Jun. 28, 2019, issued by the European Patent Office in counterpart European Application No. 15746584.0.
Communication dated Feb. 1, 2017, issued by the United States Patent and Trademark Office in counterpart U.S. Appl. No. 14/618,447.
Communication dated Jul. 10, 2017, from the Japanese Patent Office in counterpart application No. 2016-568774.
Communication issued by the United States Patent and Trademark Office dated Nov. 9, 2017 in counterpart U.S. Appl. No. 14/618,421.
Communication dated Dec. 17, 2018 issued by the United States Intellectual Property Office in counterpart U.S. Appl. No. 14/618,223.
Communication dated Apr. 2, 2019, issued by the Chinese Patent Office in counterpart Chinese Application No. 201580007942.5.
Communication dated May 14, 2019, issued by the Chinese Patent Office in counterpart Chinese Application No. 201580007972.6.
Communication dated Jul. 9, 2019, issued by the European Patent Office in counterpart European Application No. 15746532.9.
Communication dated Jul. 19, 2019, from the European Patent Office in counterpart European Application No. 15745916.5.
Communication dated Jan. 20, 2017, issued by the United States Patent and Trademark Office in counterpart U.S. Appl. No. 14/618,421.
Communication from United States Patent and Trademark Office dated Jul. 20, 2017, in U.S. Appl. No. 14/618,447.
Communication issued by the European Patent Office dated Sep. 19, 2017 in counterpart European Patent Application No. 15745916.5.
Communication issued by the European Patent Office dated Oct. 2, 2017 in counterpart European Patent Application No. 15746883.6.
Communication issued by the Australian Patent Office dated Nov. 8, 2017 in counterpart Australian Patent Application No. 2015214697.
Communication dated Oct. 31, 2018 issued by the Korean Intellectual Property Office in counterpart Korean Application No. 10-2014-0090403.
Communication dated Sep. 10, 2018, issued by the State Intellectual Property Office of P.R. China in counterpart Chinese Application No. 201580007972.6.
Communication from United States Patent and Trademark Office dated Jun. 8, 2017, in U.S. Appl. No. 14/618,223.
Communication issued by the European Patent Office dated Sep. 4, 2017 in counterpart European Patent Application No. 15746584.0.
Communication issued by the United States Patent and Trademark dated Nov. 9, 2017 in counterpart U.S. Appl. No. 14/618,223.
Communication dated Jan. 18, 2019 issued by the State Intellectual Property Office of P.R. China in counterpart Chinese Application No. 201580007966.0.
Communication dated Feb. 12, 2019, issued by the European Patent Office in counterpart European Application No. 15 746 883.6.
Communication dated Jul. 3, 2018, issued by the State Intellectual Property Office of P.R. China in counterpart Chinese Application No. 201580007942.5.
Written Opinion dated Apr. 27, 2015, issued by the International Searching Authority in counterpart International Application No. PCT/KR2015/001266.
Written Opinion dated Apr. 30, 2015, issued by the International Searching Authority in counterpart International Application No. PCT/KR2015/001312.
Communication dated Sep. 3, 2018, issued by the State Intellectual Property Office of P.R. China in counterpart Chinese Application No. 201580007989.1.
Search Report dated Apr. 28, 2015, issued by the International Searching Authority in counterpart International Application No. PCT/KR2015/001347.
Search Report dated May 19, 2015, issued by the International Searching Authority in counterpart International Application No. PCT/KR2015/001341.
Communication dated Dec. 22, 2017, from the European Patent Office in counterpart European Application No. 15746584.0.
Communication dated Feb. 12, 2019, issued by the European Patent Office in counterpart European Application No. 15 746 532.9.
Communication dated May 31, 2019, issued by the Korean Intellectual Property Office in corresponding Korean Application No. 10-2014-0090403.
Patent Examination Report No. 1 issued by the Australian IP Office in counterpart Australian Patent Application No. 2018203609 dated Jul. 31, 2019.
Written Opinion dated Apr. 28, 2015, issued by the International Searching Authority in counterpart International Application No. PCT/KR2015/001347.
Written Opinion dated May 19, 2015, issued by the International Searching Authority in counterpart International Application No. PCT/KR2015/001341.
Communication dated Jul. 1, 2016 issued by the United States Patent and Trademark Office in counterpart U.S. Appl. No. 14/618,447.
Communication from United States Patent and Trademark Office dated Jan. 29, 2018, in U.S. Appl. No. 14/618,223.
Communication dated Jul. 2, 2018, issued by the State Intellectual Property Office of P.R. China in counterpart Chinese Application No. 201580007966.0.
Search Report dated Apr. 27, 2015, issued by the International Searching Authority in counterpart International Application No. PCT/KR2015/001266.

(56) References Cited

OTHER PUBLICATIONS

Search Report dated Apr. 30, 2015, issued by the International Searching Authority in counterpart International Application No. PCT/KR2015/001312.
Communication dated Jun. 2, 2016 issued by the United States Patent and Trademark Office in counterpart U.S. Appl. No. 14/618,421.
Communication from United States Patent and Trademark Office dated Feb. 21, 2018, in U.S. Appl. No. 14/618,447.
Communication dated May 2, 2019 issued by the United States Patent and Trademark Office in counterpart U.S. Appl. No. 16/165,736.
Communication dated Sep. 4, 2017, from the European Patent Office in counterpart European Application No. 15746532.9.
Communication dated Oct. 8, 2019 issued by the State Intellectual Property Office of P.R. China in counterpart Chinese Application No. 201580007942.5.
Communication dated Nov. 20, 2019, issued by the Australian Patent Office in counterpart Australian Application No. 2018203609.
"Mailbox", XP 55651298, 2013, 2 pages, Retrieved from URL: <https://web.archive.org/web/20130427055457/http://uxarchive.com/apps/mailbox>.
Amarnath Natarajan, "How to Answer a Call on Samsung Galaxy Note 2", XP 55651506, Jan. 1, 2013, 1 page, Retrieved from URL: <primeinspiration.com/how-to-answer-a-call-on-samsung-galaxy-note-2.html>.
Communication dated Jul. 7, 2020, issued by the European Patent Office in European Application No. 15746584.0.
Communication dated Aug. 31, 2020, issued by the Korean Intellectual Property Office in Korean Application No. 10-2020-0066043.
Communication dated Aug. 12, 2020, from the European Patent Office in European Application No. 20170860.9.
Communication dated Aug. 5, 2020 from the Brazilian Patent and Trademark Office in Application No. BR1120160182626.
Communication dated Mar. 19, 2020 issued by the Indian Patent Office in Indian Application No. 201617029934.
Communication dated Mar. 20, 2020 issued by the Indian Patent Office in Indian Application No. 201617029937.
Communication dated Apr. 20, 2020 issued by the Indian Patent Office in Indian Application No. 201617029932.
Communication dated May 19, 2020 issued by the Indian Patent Office in Indian Application No. 201617029935.
Communication dated Nov. 30, 2020 issued by the European Patent Office in European Application No. 15746584.0.
Communication dated Dec. 22, 2020 issued by the Korean Intellectual Property Office in Korean Application No. 10-2014-0083244.
Communication dated Dec. 22, 2020 issued by the Korean Intellectual Property Office in Korean Application No. 10-2014-0083282.

* cited by examiner

USER TERMINAL DEVICE AND DISPLAYING METHOD THEREOF

CROSS-REFERENCE TO RELATED APPLICATIONS

This application is a Continuation Application of U.S. application Ser. No. 14/618,379 filed on Feb. 10, 2015, which claims priority from Korean Patent Application No. 10-2014-0090403, filed in the Korean Intellectual Property Office on Jul. 17, 2014, and claims the benefit of U.S. Provisional Application No. 61/937,744, filed in the United States Patent and Trademark Office on Feb. 10, 2014, the disclosures of which are incorporated herein by reference in their entireties.

BACKGROUND

1. Field

Apparatuses and methods consistent with exemplary embodiments relate to a user terminal device and a displaying method thereof, and more particularly, to a user terminal device where a display is folded asymmetrically with reference to a hinge or folding line so as to expose a part of the display and a displaying method thereof.

2. Description of Related Art

With the development of electronic technology, various types of user terminal devices have been developed and distributed. Recently, the size of such user terminal devices has been minimized while the functions of the devices have become diverse and thus, the demands for user terminal devices have been increasing continuously.

A user terminal device may provide various contents such as multimedia contents and application screens according to a user's request. A user may select a desired function using a button or a touch screen provided with a user terminal device. A user terminal device may execute a program selectively according to a user interaction and display the result of execution.

Meanwhile, as a user terminal device provides more diverse functions, there are various needs for a method of displaying contents or a user interface method. In other words, as the method of displaying contents has changed and the type and function of contents have been increasing, the existing interaction methods such as simply selecting a button or touching a screen may not be sufficient to perform various functions of a user terminal device.

Particularly, a user terminal device of which display can be folded with reference to a folding line has been developed in order to minimize the size of the user terminal device. When the display is folded symmetrically with reference to the hinge, however, the display is folded completely and a user may not use or watch the display.

SUMMARY

Aspects of one or more exemplary embodiments relate to a user terminal device that, when a display is folded asymmetrically with reference to a hinge or folding line, exposing a part of the display, provides various User Interfaces (UI) through the exposure area, and a displaying method thereof.

According to an aspect of an exemplary embodiment, there is provided a user terminal device which includes a display configured to be divided into a first area and a second area which is larger than the first area with reference to a folding line, a cover disposed on a rear side of the display, a detector configured to detect a user interaction on the display and the cover, and a controller configured to: in response to the display being folded along the folding line such that the first area and the second area face each other, control the detector to detect a user interaction through an exposure area which is exposed part of the second area, and the cover, and in response to the display being folded along the folding line such that two parts of the cover face each other, control the detector to detect a user interaction through the first area and the second area.

The controller may be configured to, in response to a user interaction being detected on the cover while the display is unfolded, control the display to rotate a currently executed one or more applications in a direction of a z axis to be displayed.

The controller may be configured to, in response to a telephone call request being received while the display is folded such that the first area and the second area face each other, control the display to display a UI for informing that a telephone call request is received on the exposure area, and accept or reject the telephone call request according to a user interaction detected on the cover.

The controller may be configured to, in response to a user interaction of dragging simultaneously in a same direction being detected on the display and the cover while the display is unfolded, control the display to display a currently executed one or more applications overlapping.

The controller may be configured to, in response to a user interaction of dragging simultaneously in different directions being detected on the display and the cover while the display is unfolded, control the display to display a currently executed one or more applications overlapping by a predetermined angle.

The controller may be configured to, in response to a user interaction being detected simultaneously on the first area and the second area of the display while the display is folded such that the two parts of the cover face each other, control a first screen displayed on the second area to be changed to a second screen.

The first screen may be a lock screen.

The second screen may include a menu screen corresponding to the first screen.

According to an aspect of another exemplary embodiment, there is provided a user terminal device which includes a display configured to be divided into a first area and a second area which is larger than the first area with reference to a folding line, a cover disposed on a rear side of the display that includes one or more light emitting parts, a detector configured to detect a user interaction on the display and the cover, and a controller configured to, in response to the display being folded along the folding line such that the first area and the second area face each other, control an object to be displayed on an exposure area which is an exposed part of the second area, and control the light emitting parts such that one or more visual indicators is displayed on the cover based on the object displayed.

The controller may be configured to, in response to a user interaction of touching the cover at a location of one of the visual indicators, control an application corresponding to the object displayed.

According to an aspect of another exemplary embodiment, there is provided a user interaction controlling method of a user terminal device which includes a display divided into a first area and a second area larger than the first area, and a cover which is disposed on a rear side of the display, which includes detecting a first folding state of the display and a second folding state where the display is folded in a direction opposite to the direction of the first folding state and controlling, in the first folding state, a user interaction to be detected through an exposure area which is an exposed part of the second area, and the cover, and controlling, in the second folding state, a user interaction to be detected through the first area and the second area.

In the first folding state, the display may be folded such that the first area and the second area face each other.

The method may further include detecting a user interaction on the cover while the display is unfolded, and rotating and displaying a currently executed one or more applications in a direction of z axis based on the user interaction.

The method may further include receiving a telephone call request while the display is in the first folding state, detecting a user interaction on the cover, and accepting or rejecting the telephone call request based on the user interaction.

The method may further include, while the display is in an unfolded state, simultaneously detecting a first user interaction on the display and a second user interaction on the cover, and displaying a currently executed one or more applications overlapping on the display based on the first user interaction and the second user interaction.

The displaying may include, in response to the first user interaction being in a first direction and the second user interaction being in a second direction different than the first direction, displaying the one or more applications overlapping by a predetermined angle.

The method may further include detecting user interactions simultaneously on the first area and the second area while the display is in the second folding state, and changing a first screen displayed on the first area or the second area, to a second screen, in response to the user interactions.

The first screen may be a lock screen.

The second screen may include a menu screen regarding the first screen.

According to an aspect of another exemplary embodiment, there is provided a display controlling method of a user terminal device which includes a display configured to be divided into a first area and a second area larger than the first area with reference to a folding line, and a cover which is disposed on a rear side of the display and includes a plurality of light emitting parts, which includes, in response to the display being folded along the folding line such that the first area and the second area face each other, displaying an object on an exposure area which is exposed part of the second are, and turning on a part of an area of the cover based on the object displayed.

The turning on a part of an area may include displaying one or more visual indicators on the cover corresponding to the object displayed.

According to an aspect of another exemplary, there is provided a display device including a display divided into a first area and a second area that is greater than the first area, wherein the display is configured to fold in both directions along an axis dividing the first area and the second area; a cover located on a surface opposite to a surface of the display; a detector configured to detect a user interaction on the display and the cover; and a controller configured to control the display to display one or more user interfaces on the first area and the second area.

The detector may be configured to detect a first folding state when the display is folded such that the first area faces the second area, and detect a second folding state when the display is folded such that the cover opposite the first area faces the cover opposite the second area; and wherein the controller is configured to: display a first screen on the first area or the second area; and in response to simultaneously detecting a touch on the first area and the second area while the display is in the second folding state, control the display to change the first screen to a second screen.

The controller may be configured to: in response to simultaneously detecting a user interaction on the display and a user interaction on the cover while the display is unfolded, control the display to display a currently executed one or more applications overlapping on the display.

As described above, according to various exemplary embodiments, a user may perform various functions of a user terminal device through a UI displayed on the exposure area even when the display is folded, and may be provided with a variety of information.

BRIEF DESCRIPTION OF THE DRAWINGS

The above and/or other aspects of one or more certain exemplary embodiments will be more apparent with reference to the accompanying drawings, in which:

FIGS. 8A to 16B are views illustrating an exemplary embodiment where a user terminal device performs various functions according to a folding interaction and an unfolding interaction according to various exemplary embodiments;

DETAILED DESCRIPTION

One or more exemplary embodiments may vary and may be provided in different types of exemplary embodiments. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed. While describing exemplary embodiments, if a specific description regarding a known technology might obscure the gist of an inventive concept, the specific description may be omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it expressly says otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In an exemplary embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor except for 'modules' or 'units' that should be realized in a specific hardware.

Figure 1:
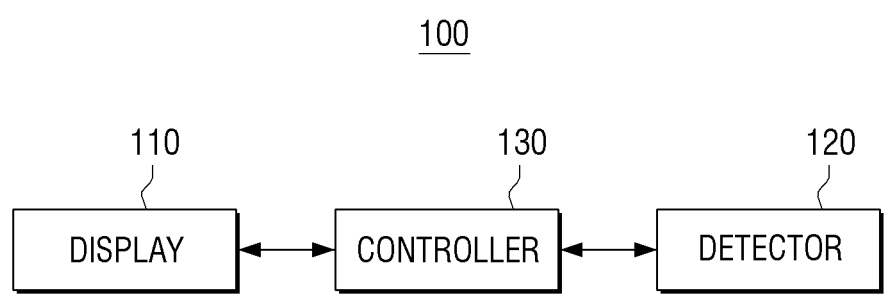
FIG. 1 is a block diagram illustrating configuration of a user terminal device according to an exemplary embodiment.

An exemplary embodiment will now be described in detail with accompanying drawings. FIG. 1 is a block diagram illustrating configuration of a user terminal device 100 according to an exemplary embodiment. As illustrated in FIG. 1, the user terminal device 100 includes a display 110, a detector 120, and a controller 130. The user terminal device 100 may be realized as various types of devices such as a TV, monitor, PC, laptop PC, mobile phone, tablet PC, PDA, MP3 player, kiosk, electronic album, table display device, LCD display, LED display, OLED display, camera, watch, wearable device, etc. If a user terminal device is realized as portable device such as mobile phone, tablet PC, touchscreen, PDA, MP3 player, laptop PC, watch, wearable device, etc., the user terminal device may be referred to a mobile device. Throughout this specification, for convenience and not for any limiting purposes, it may be referred to as a user terminal device.

The display 110 displays various image data and UIs. In particular, the display 110 may be realized as a touch screen as it is combined with a touch detector. In addition, the display 110 may include a hinge or folding line so that the display 110 may be folded.

In particular, the display 110 consists of a first area and a second area which is larger than the first area with reference to the hinge or folding line. If the display is folded such that the first area comes in touch with the second area with reference to the hinge or folding line, the display 110 may display on an exposure area of the second area, the area being exposed while the display 110 is folded, at least one of a UI including information regarding the user terminal device 100 and a UI for controlling the user terminal device 100.

The detector 120 detects a user interaction. In particular, the detector 120 may include a touch detector which detects a user's touch interaction. In addition, the detector 120 may include a folding detector which detects a folding interaction where the display 110 is folded with reference to the hinge or folding line and an unfolding interaction where the display 110 is unfolded with reference to the hinge or folding line.

The controller 130 controls overall operations of the user terminal device 100. In particular, if the display is folded with reference to the hinge or folding line, the controller 130 may control the display 110 to display a predetermined UI on an exposure area of the second area. In this case, the predetermined UI may include at least one of a UI representing state information of the user terminal device 100 and a UI for controlling the user terminal device 100. In addition, the exposure area represents an area of the second area, which is exposed to the outside when the first area completely comes into contact with the second area.

In particular, if a folding interaction of folding the display 110 with reference to the hinge or folding line is detected through the detector 120 while the user terminal device 100 executes a specific application, the controller 130 may control the display 110 to display a UI for controlling the specific application in the exposure area of the second area. For example, if a folding interaction of folding the display 110 with reference to the hinge or folding line is detected through the detector while the user terminal device 100 executes a music application, the controller 130 may control the display 110 to display a UI for controlling reproduction of music on the exposed area.

In addition, if a predetermined user interaction (for example, a touch interaction of touching the exposed area) occurs while the display 110 is folded, the controller 130 may control the display 110 to display a UI for releasing the lock state of the user terminal device 100 on the exposure area of the second area.

If a predetermined user interaction (for example, a touch interaction of touching the exposed area) occurs while the display 110 is folded, the controller 130 may control the display 110 to display a UI for changing an audio, video, or other setting of the user terminal device on the exposed area. For example, a touch interaction of touching the exposure area is detected while the display 110 is folded, the controller 130 may control the display 110 to display a UI for changing the audio setting of the user terminal device on the exposed area.

In addition, if a message is received from outside of the device while the display 110 is folded, the controller 130 may control the display 110 to display a UI for informing that the message is received on the exposed area. In this case, the UI displayed on the exposure area may include information regarding a sender and the message.

If the UI informing that a message is received is displayed on the exposure area while the display 110 is folded and an unfolding interaction of unfolding the display to a predetermined angle is detected while the UI is touched, the controller 130 may control the display 110 to display a message window for responding to the received message.

However, the device is not limited to using a predetermined angle. It may be a range of angles. It may also be an angle or a range of angles that may be set by a user.

In addition, the controller 130 may control the display 110 to display a plurality of icons on the exposure area while the display 110 is folded. If one of the plurality of icons is touched through the detector 120 while the plurality of icons are displayed on the exposure area while the display 110 is folded and an unfolding interaction of unfolding the display 110 is detected through the detector 120 while one of the plurality of icons is touched, the controller 130 may control the display 110 to display a screen corresponding to the touched icon. For example, if an unfolding interaction of unfolding the display 110 is detected while a message icon from among the plurality of icons is touched, the controller 130 may control the display 110 to display a message window corresponding to the message icon. Of course, the device is not limited to a message icon. It could be any number of icons, e.g., a music icon, a telephone icon, a document icon, etc.

In addition, if a message is received from outside while the user terminal device executes a specific application in a folding state, the controller 130 may control the display 110 to display a UI informing that the message is received on the exposed area. If an unfolding interaction of unfolding the display 110 is detected through the detector 120 while the UI is touched, the controller 130 may control the display 110 to display a message window for responding to the message. If an unfolding action of unfolding the display is detected through the detector 120 while the UI is not touched, the controller 130 may control the display 110 to display an execution screen for the specific application.

If a UI for releasing a lock state of the user terminal device 100 is displayed on the exposure area while the display 110 is folded, a lock release command is input through the UI and then, an unfolding interaction of unfolding the display 110 is detected through the detector 120, the controller 130 may control the display 110 to display a home screen. However, if a lock release command is not input through the UI, and an unfolding interaction of unfolding the display 110 is detected through the detector 120, the controller 130 may control the display 110 to display the UI for releasing the lock state of the user terminal device 100 on full screen.

In addition, if a call request is received from outside while the display 110 is folded, the controller 130 may control the display 110 to display a UI on the exposed area for informing that a call request is received from outside. If an unfolding interaction of unfolding the display to a first angle range is detected, the controller 130 may control the display 110 to display at least one icon for controlling a telephone call function. If an unfolding interaction of unfolding the display to a second angle that is greater than the first angle scope is detected, the controller 130 may accept the call request and control the display 110 to display a telephone call screen.

If a call request is received from outside while the display executes a specific application as it is being folded, the controller 130 may control the display 110 to display a UI for informing that a call request is received on the exposed area. If an unfolding interaction of unfolding the display 110 is detected through the detector 120, the controller 130 may accept the call request and control the display 110 to display a telephone call screen. When a telephone call is completed, the controller 130 may control the display 110 to display the execution screen of the specific application again.

If a first folding interaction of folding the display to the first angle is detected while the display 110 displays the execution screen of a specific application, the controller 130 may control the display 110 to display part of the execution screen of the specific application on at least part of the second area. If a second folding interaction of folding the display 110 such that the first area and the second area of the display 110 come in contact with each other is detected, the controller 130 may control the display 110 to display a brief information providing screen of the specific application on the exposed area.

In the above-described one or more exemplary embodiments, a user may perform various functions of a user terminal device through a UI displayed on the exposure area even when the display 110 is in a folding state and thus, the user may be provided with various information and options for interaction.

Figure 2:
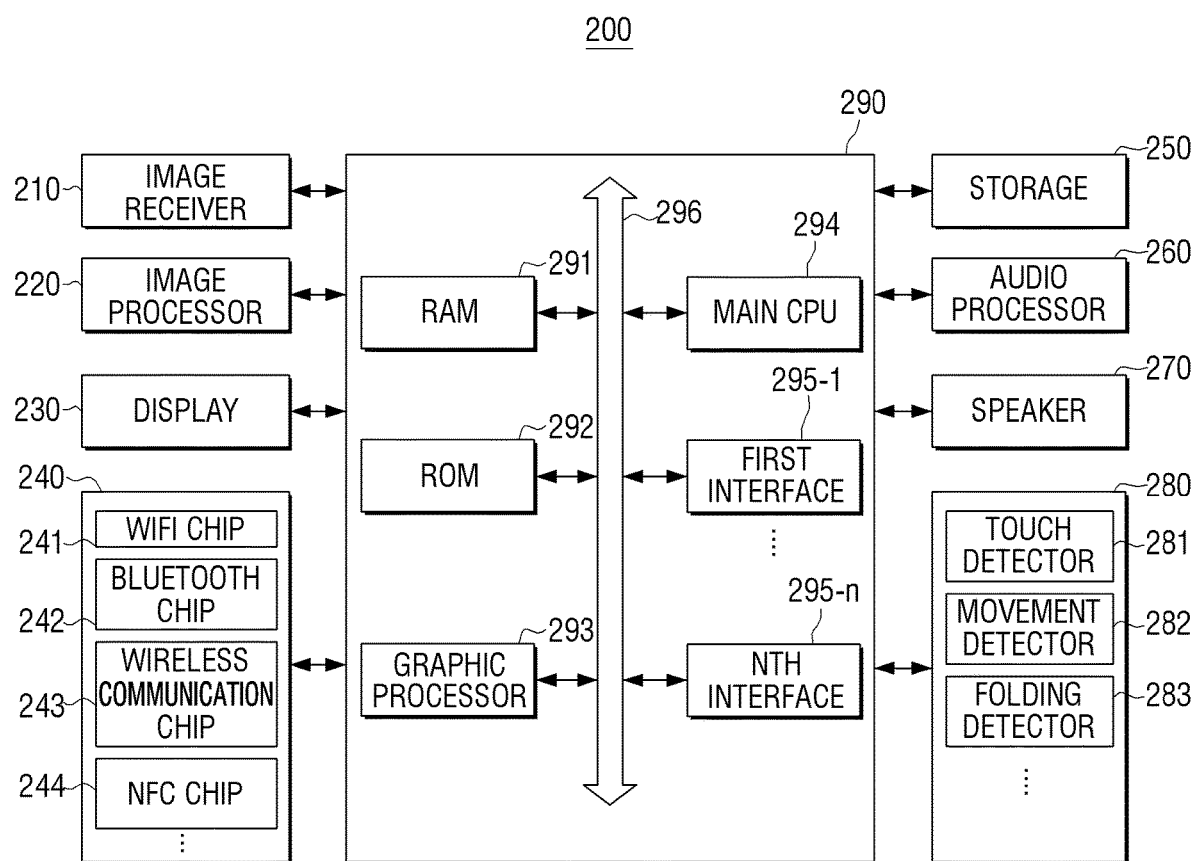
FIG. 2 is a block diagram illustrating a detailed configuration of a user terminal device according to an exemplary embodiment.

One or more exemplary embodiments will be described in greater detail with reference to FIGS. 2 to 23B. FIG. 2 is a block diagram illustrating configuration of a user terminal device 200 in detail according to an exemplary embodiment. As illustrated in FIG. 2, the user terminal device includes an image receiver 210, an image processor 220, a display 230, a communicator 240, a storage 250, an audio processor 260, a speaker 270, a detector 280, and a controller 290.

Meanwhile, FIG. 2 illustrates various components comprehensively, assuming that the user terminal device 200 is an apparatus having various functions such as contents providing function, display function, etc. Accordingly, depending on one or more exemplary embodiments, a part of the components illustrated in FIG. 2 may be omitted or changed, or other components may be further added.

The image receiver 210 receives image data through various sources. For example, the image receiver 210 may receive broadcasting data from an external broadcasting station, VOD data in real time from an external server, or image data from an external apparatus.

The image processor 220 processes image data received from the image receiver 210. The image processor 220 may perform various image processing with respect to image data, such as decoding, scaling, noise filtering, frame rate conversion, resolution conversion, etc.

The display 230 displays at least one of a video frame which is generated as the image processor 220 processes image data received from the image receiver 220 and various screens generated by a graphic processor 293.

Figure 3A:
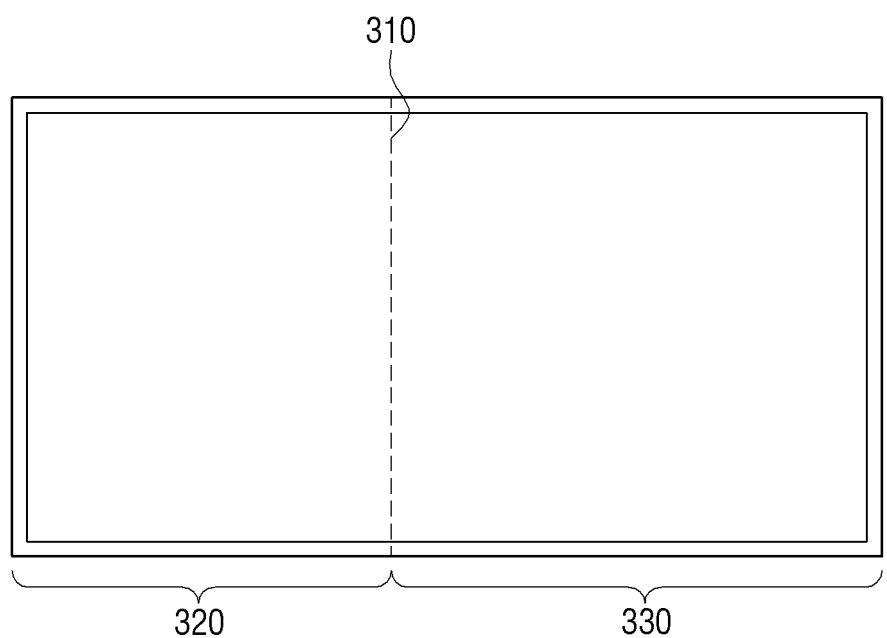
FIGS. 3A to 3E are views illustrating a user terminal device with a rectangular display panel according to an exemplary embodiment.
Figure 3B:
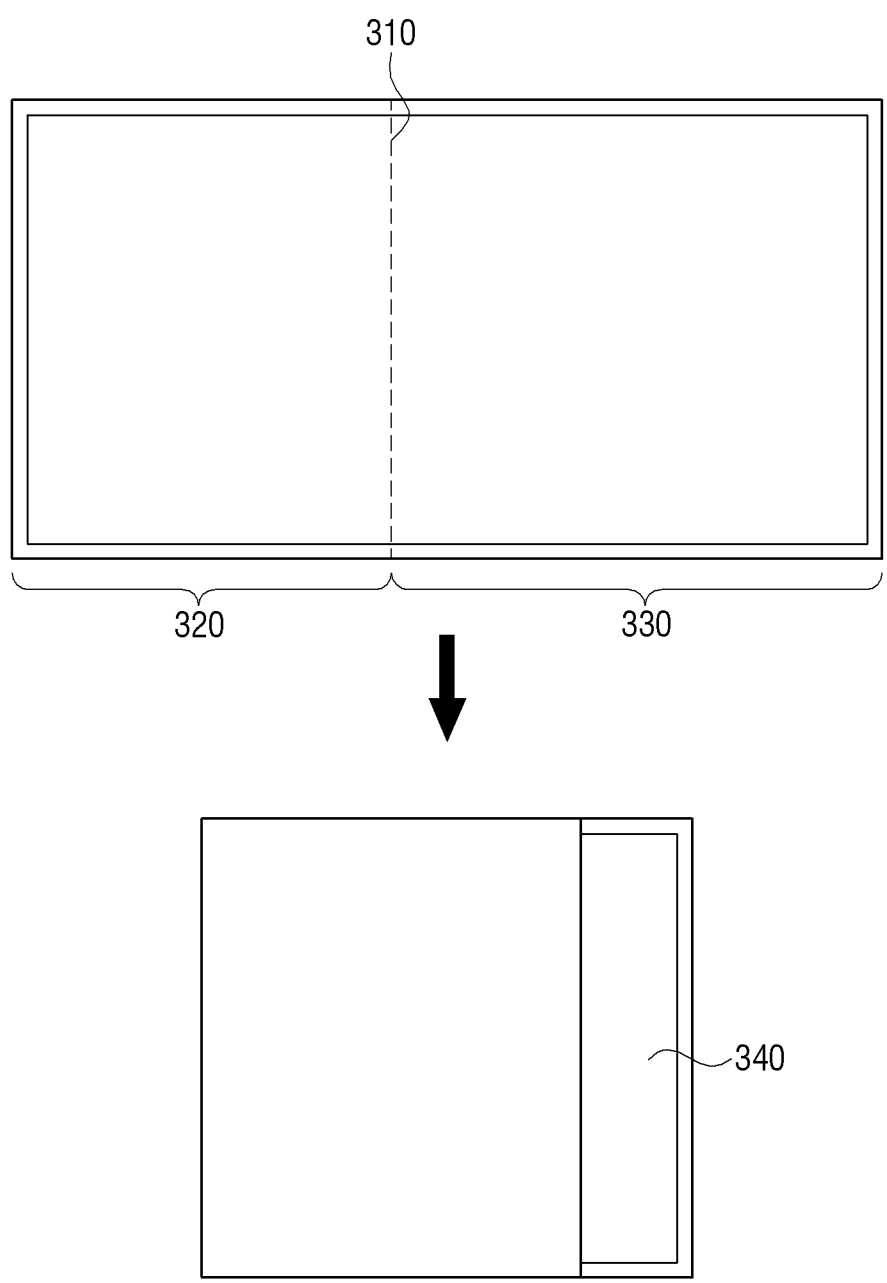
Figure 3C:
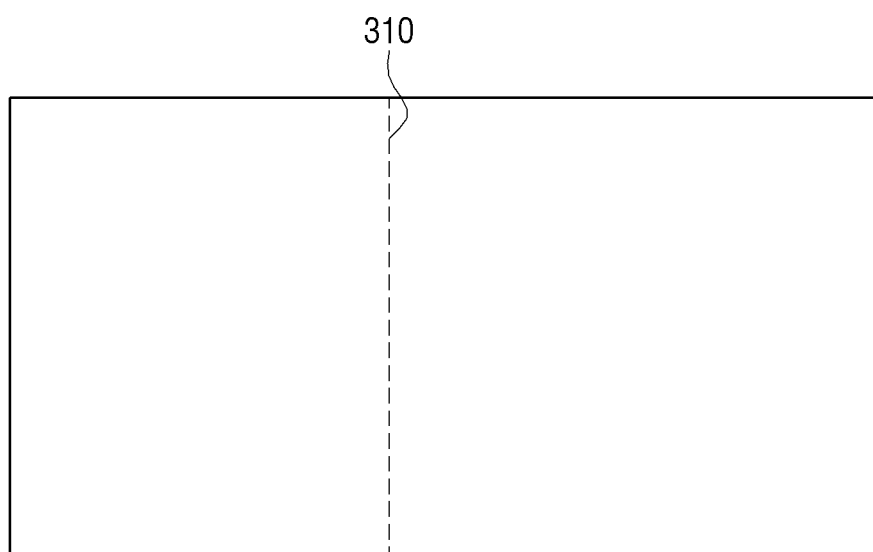
Figure 3C:
Figure 3C:
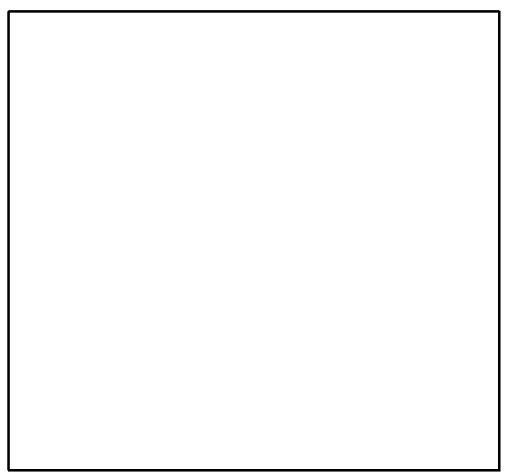

In particular, as illustrated in FIG. 3A, the display 230 may consist of a first area 320 and a second area 330 which is larger than the first area 320 with reference to a hinge or folding line 310. As illustrated in FIG. 3B, if the display 230 is folded with reference to the folding line 310, the display 230 may include an exposure area 340 which is the exposed part of the second area 330. Meanwhile, FIG. 3C is a view illustrating a cover which is on the rear side of the user terminal device 200 when the user terminal device 200 is folded.

Figure 3D:
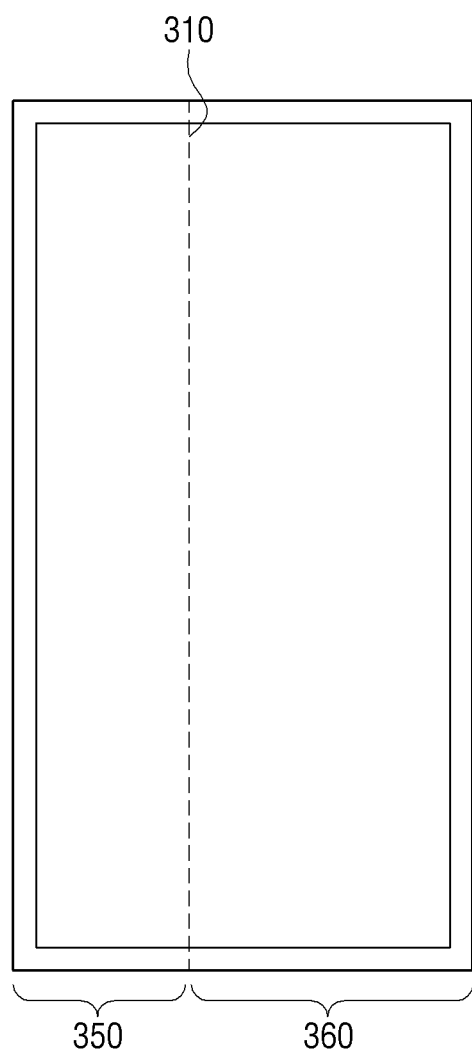
Figure 3E:
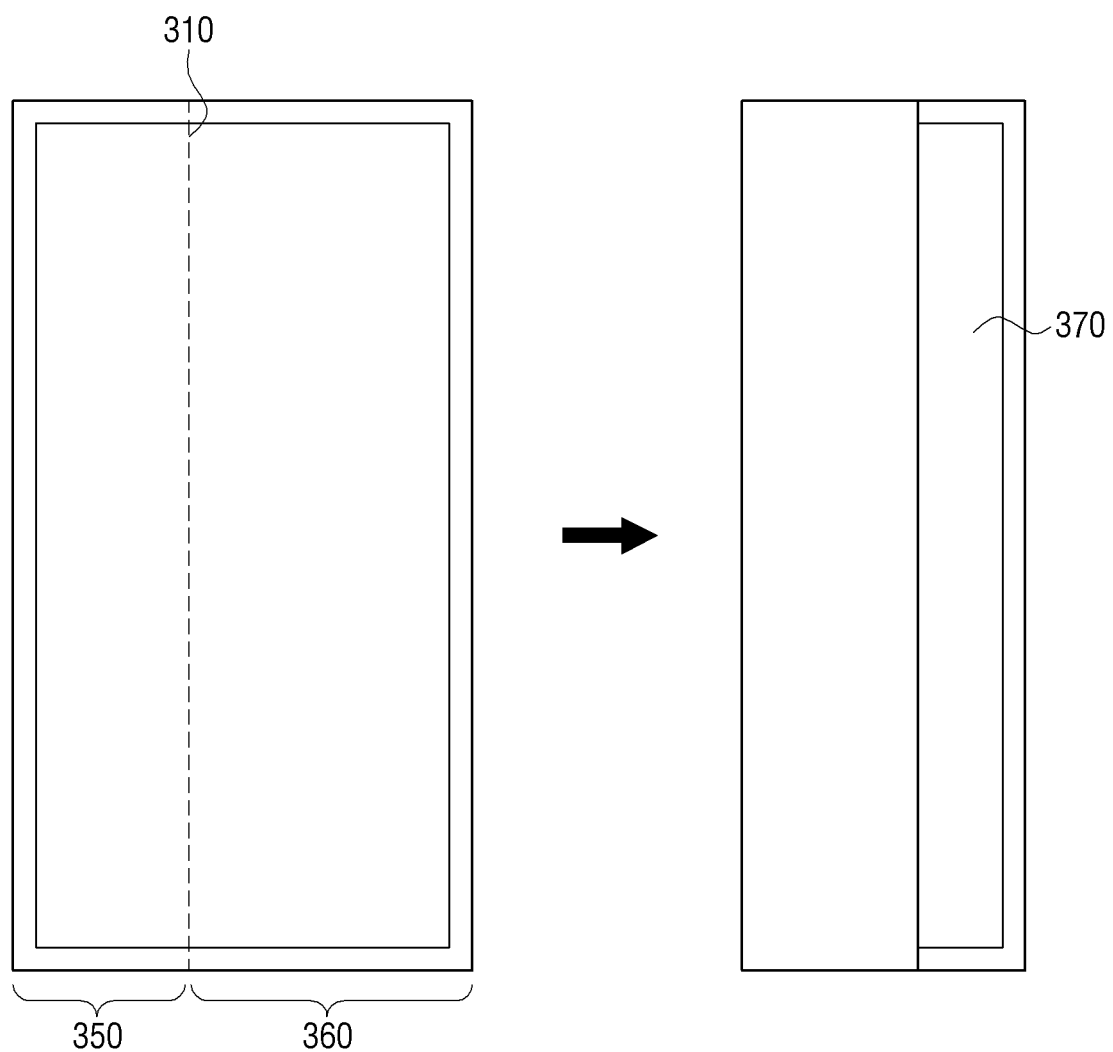

Meanwhile, in the above-described exemplary embodiment, the length of the hinge or folding line 310 is in parallel with a short side, but this is only an example. As illustrated in FIG. 3D, the length of the hinge 310 may be in parallel with a long side. In this case, the display 230 may consist of a first area 350 and a second area 360 with reference to the hinge or folding line 310. As illustrated in FIG. 3E, if the display 230 is folded with reference to the hinge or folding line 310, the display 230 may include an exposure area 370 of the second area 360, which is exposed to outside.

Meanwhile, in the above-exemplary embodiments, the folding line 310 may be a line which is generated by a physical hinge. In addition, if the display 230 is a flexible display, the folding line 310 may be a line which can be folded by a user.

The communicator 240 performs communication with various types of external apparatuses according to various types of communication methods. The communicator 240 may include a WiFi chip 241, a Bluetooth chip 242, a wireless communication chip 243, and a Near Field Communication (NFC) chip 244. The controller 290 performs communication with various external apparatuses using the communicator 240.

In particular, the WiFi chip 241 and the Bluetooth chip 242 perform communication according to a WiFi method and a Bluetooth method, respectively. In the case of the WiFi chip 241 or the Bluetooth chip 242, various connection information such as SSID and a session key may be transmitted/received first for communication connection and then, various information may be transmitted/received. The wireless communication chip 243 represents a chip which performs communication according to various communication standards such as IEEE, Zigbee, 3$^{rd}$ Generation (3G), 3$^{rd}$ Generation Partnership Project (3GPP), Long Term Evolution (LTE) and so on. The NFC chip 244 represents a chip which operates according to an NFC method which uses 13.56 MHz band among various RF-ID frequency bands such as 135 kHz, 13.56 MHz, 433 MHz, 860-960 MHz, 2.45 GHz, and so on.

Figure 4:
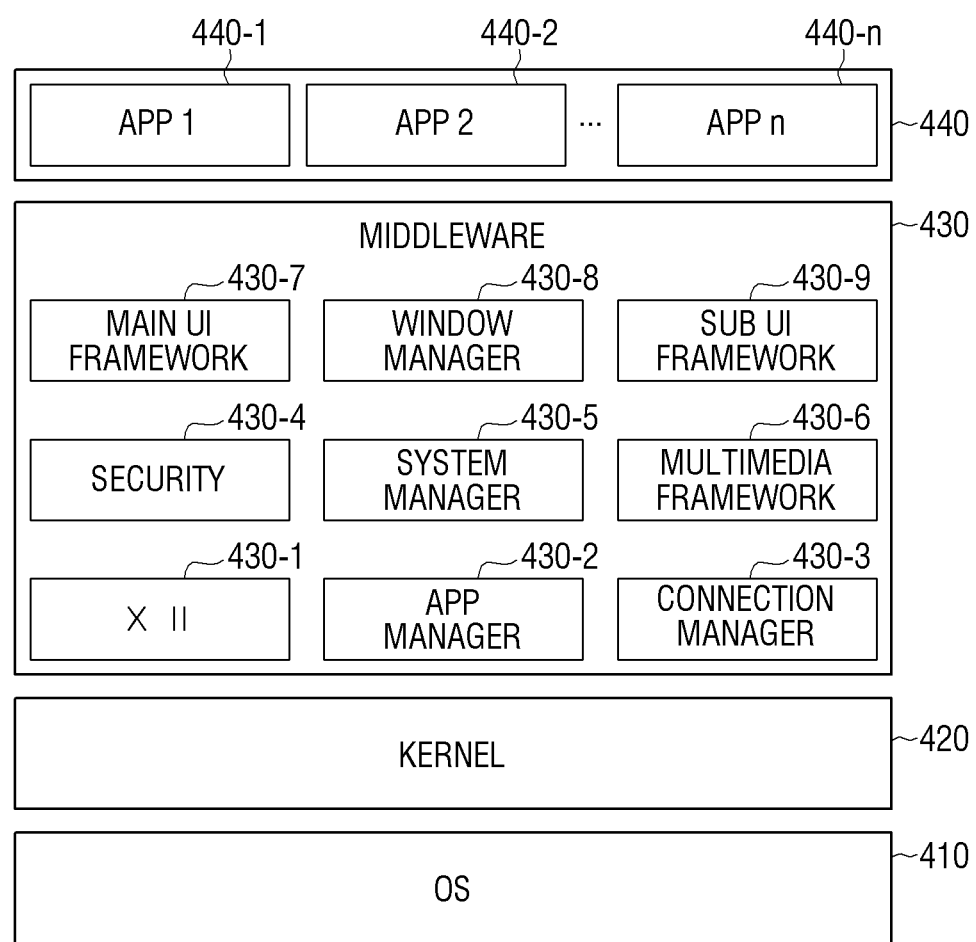
FIG. 4 is a view illustrating a configuration of software stored in a storage according to an exemplary embodiment.

The storage 250 may store various programs and data necessary to operate the user terminal device 200. Specifically, the storage 250 may store programs and data to configure various screens to be displayed on a main area and a sub area. FIG. 4 is a view provided to explain the structure of software stored in the user terminal device 200. According to FIG. 4, the storage 250 may store an Operating System (OS) 410, a kernel 420, middleware 430, an application 440, etc.

The OS 410 controls and manages overall operations of hardware. In other words, the OS 410 manages hardware and is responsible for basic functions such as memory and security.

The kernel 420 serves as a path transmitting various signals detected at the display 230, such as a touch signal, to the middleware 430.

The middleware 430 includes various software modules for controlling the operation of the user terminal device 200. According to FIG. 4, the middleware 430 includes an X11 module 430-1, an APP manager 430-2, a connection manager 430-3, a security module 430-4, a system manager 430-5, a multimedia framework 430-6, a UI framework 430-7, a window manager 430-8, and a writing recognition module 430-9.

The X11 module 430-1 receives various event signals from various hardware provided in the user terminal device 200. Herein, the event may vary, ranging from an event of setting of a system alarm, an event of executing or terminating a specific program, etc.

The APP manager 430-2 manages the execution state of various applications 440 which are installed in the storage 250. When an application execution event is detected from the X11 module 430-1, the APP manager 430-2 calls and executes an application corresponding to the event.

The connection manager 430-3 supports wired or wireless network connection. The connection manager 430-3 may include various detailed modules such as a DNET module, a UPnP module, etc.

The security module 430-4 supports certification, permission, secure storage, etc. with respect to hardware.

The system manager 430-5 monitors the state of each element of the user terminal device 200, and provides the monitoring result to other modules. For example, if there is not enough battery left, an error occurs, or connection is cut off, the system manager 430-5 may provide the monitoring result to a main UI framework 430-7 or a sub UI framework 430-9 and output an alarm message or an alarm sound.

The multimedia framework 430-6 may be stored in the user terminal device 200, or may reproduce multimedia contents provided from an external source. The multimedia framework 430-6 may include a player module, a camcorder module, a sound processing module, etc. Accordingly, the multimedia framework 430-6 may reproduce various multimedia contents, and generate and reproduce screens and sounds.

The main UI framework 430-7 provides various UIs to be displayed on a main area of the display 230, and the sub UI framework 430-9 provides various UIs to be displayed on a sub area. The main UI framework 430-7 and the sub UI framework 430-9 may include an image compositor module to configure various objects, a coordinates composite module to calculate a coordinates where an object is to be displayed, a rendering module to render the configured object on the calculated coordinates, a 2D/3D UI toolkit to provide a tool for configuring a UI in 2D or 3D form, etc.

The window manager 430-8 may detect a touch event using a user's body part or pen or other input events. When such an event is detected, the window manager 430-8 transmits an event signal to the main UI framework 430-7 or the sub UI framework 430-9 so that an operation corresponding to the event is performed.

In addition, if a user touches and drags a screen, various program modules such as a writing module for drawing a line according to a drag trace and an angle calculation module for calculating a pitch angle, a roll angle, a yaw angle, etc. based on a sensor value sensed by a movement detector 282 may be stored.

The application module 440 includes applications 440-1~440-n for supporting various functions. For example, program modules for providing various services, such as a navigation program module, a game module, an electronic book module, a calendar module, an alarm management module, a music module, an electronic banking module, a stock module, a calculator module, an electronic mail module, a spreadsheet module, a word processor module, etc., may be included. Such applications may be set as default or may be set temporarily by a user when necessary. If an object is selected, the main CPU 294 may execute an application corresponding to the selected object using the application module 440.

The software structure displayed in FIG. 4 is only an example and thus, an exemplary embodiment is not necessarily limited thereto. Thus, part of the structure may be omitted or changed, or new structure may be added, if necessary. For example, the storage 250 may additionally provide various programs such as a sensing module for analyzing signals sensed by various sensors, a messaging module including a messenger program, a Short Message Service (SMS) & Multimedia Message Service (MMS) program, an e-mail program, etc., a call info aggregator program module, a VoIP module, a web browser module, etc.

Referring back to FIG. 2, the audio processor 260 processes audio data of image contents. The audio processor 260 may perform various processing such as decoding, amplification, noise filtering, compression, equalization, noise cancellation, echo or reverb removal or addition, etc., with respect to audio data. The audio data processed by the audio processor 260 may be output to the audio output unit 270 (e.g., audio outputter).

The audio output unit 270 outputs not only various audio data which is processed in many ways such as decoding, amplification, and noise filtering by the audio processor 260 but also various alarm sounds or voice messages. In particular, the audio output unit 270 may be realized as a speaker, but this is only an example. The audio output unit 270 may be realized as an output terminal which may output audio data.

The detector 280 detects various user interactions. In particular, the detector 280 may include a touch detector 281, a movement detector 282, and a folding detector 283 as illustrated in FIG. 2.

Specifically, the touch detector 281 may detect a user's touch interaction using a touch panel attached to the rear side of a display panel. The movement detector 282 may detect a movement (for example, a rotation movement, a vertical movement, or a horizontal movement, etc.) of the user terminal device 100 using at least one of an accelerator sensor, a geomagnetic sensor, and a gyro sensor. The folding detector 283 may detect at least one of whether the user terminal device 200 is folded with reference to the hinge or folding line 310 and the angle at which the terminal device 200 is folded using a bending sensor (for example, a light sensor, a fiber optic sensor, a conductive ink-based sensor, a conductive fabric sensor, etc.).

Meanwhile, the touch detector 281 might activate only a touch sensor disposed on the exposure area while the display 230 is folded, and inactivate a touch sensor disposed on the other areas.

The controller 290 controls overall operations of the user terminal device 200 using various programs stored in the storage 250.

As illustrated in FIG. 2, the controller 290 includes a RAM 291, a ROM 292, a graphic processor 293, a main CPU 294, a first to an nth interface 295-1~295-n, and a bus 296. In this case, the RAM 291, the ROM 292, the graphic processor 293, the main CPU 294, the first to the nth interface 295-1~295-n, etc. may be interconnected through the bus 296.

The ROM 292 stores a set of commands for system booting. If a turn-on command is input and thus, power is supplied, the main CPU 294 copies O/S stored in the storage 250 in the RAM 291 according to a command stored in the ROM 292, and boots a system by executing the O/S. When the booting is completed, the main CPU 294 copies various application programs stored in the storage 250 in the RAM 291, and executes the application programs copied in the RAM 291 to perform various operations.

The graphic processor 293 generates a screen including various objects such as an icon, an image, a text, etc. using a computing unit (e.g., computer) and a rendering unit (e.g., renderer). The computing unit computes property values such as coordinates, shape, size, and color of each object to be displayed according to the layout of the screen using a control command received from the detector 280. The rendering unit generates a screen with various layouts including objects based on the property values computed by the computing unit. The screen generated by the rendering unit is displayed in a display area of the display 230.

The main CPU 294 accesses the storage 250, and performs booting using the O/S stored in the storage 250. The main CPU 294 performs various operations using various programs, contents, data, etc. stored in the storage 250.

The first to the nth interface 295-1~295-n are connected to the above-described various elements. One of the above interface may be a network interface which is connected to an external apparatus via network.

In particular, the controller 290 may provide various functions using an exposure area which is exposed to outside when the display 110 is folded.

<A UI Provided on the Exposure Area>

If the display 230 is folded with reference to the hinge or folding line 310 such that the first area 320 and the second area 330 come in contact with each other, the controller 290 may control the display 230 to display a predetermined UI on the exposure area 340 of the second area 320, which is exposed to the outside. In this case, the predetermined UI may include at least one of a UI including the state information of the user terminal device 200 and a UI for controlling the user terminal device 200.

Figure 5A:
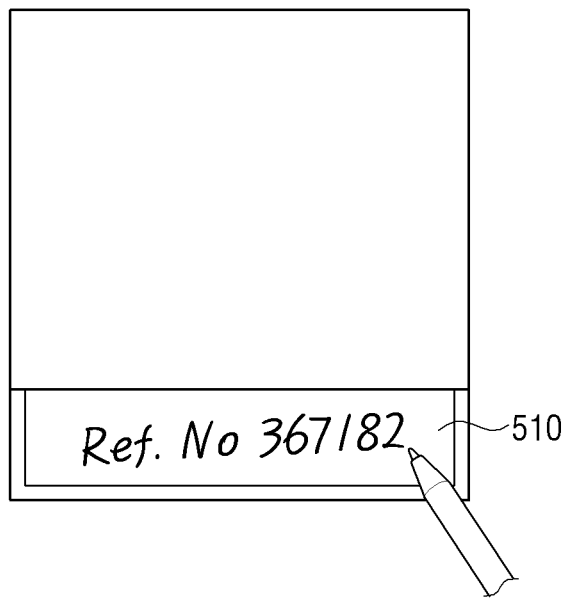
FIGS. 5A to 7B are views illustrating a UI displayed on an exposure area according to various exemplary embodiments.

In an exemplary embodiment, if a folding interaction of folding the display 230 with reference to the hinge or folding line 310 such that the first area 320 and the second area 330 come in contact with each other is detected, the controller 290 may control the display 230 to display a UI 510 providing a memo function on the exposure area as illustrated in FIG. 5A. In this case, if a user input, e.g., a finger, pen, or stylus, is detected through the UI 510 which provides a memo function, the controller 290 may control the display 230 to display an image according to the user input.

Figure 5B:
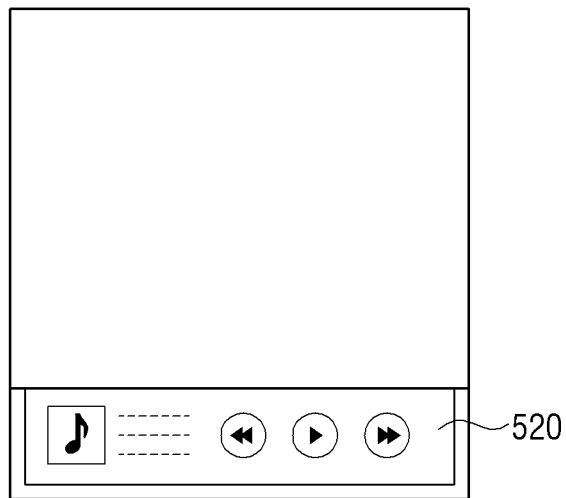

In addition, the controller 290 may control the display 230 to display a UI for controlling a specific application on the exposure area. Specifically, if a folding interaction of folding the display 230 with reference to the hinge or folding line 310 such that the first area 320 and the second area 330 come in contact with each other is detected while a specific application is executed, the controller 290 may control the display 230 to display a UI for controlling the specific application on the exposure area. For example, if a folding interaction of folding the display 230 with reference to the hinge or folding line 310 such that the first area 320 and the second area 330 come in contact with each other is detected while a music application is executed, the controller 290 may control the display 230 to display a UI 520 controlling the music application on the exposure area as illustrated in FIG. 5B. In this case, the UI 520 for controlling a music application may include information regarding currently-played music, a play/stop icon, a skip icon, a rewind icon, a next song, a past song, thumbs up, thumbs down, etc.

Figure 5C:
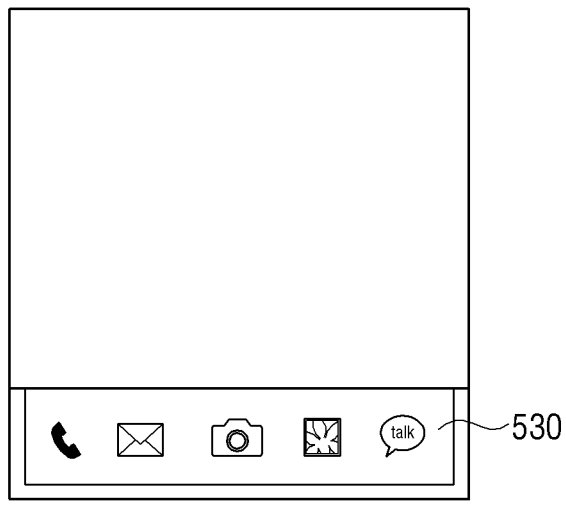

In addition, the controller 290 may control the display 230 to display a UI including a shortcut or hot key icon for checking the current state of the user terminal device 200 on the exposure area. For example, if a predetermined user interaction (for example, an interaction of touching or tapping the exposure twice in a row) is detected while the display 230 is folded, the controller 290 may control the display 230 to display a UI 530 including a shortcut icon for checking the current state of the user terminal device 200 on the exposure area as illustrated in FIG. 5C. In this case, the shortcut or hot key icon for checking the current state of the user terminal device 200 may include a shortcut or hot key icon for checking a battery state, a shortcut icon for checking a network state, a shortcut or hot key icon for checking display brightness setting, etc.

Figure 5D:
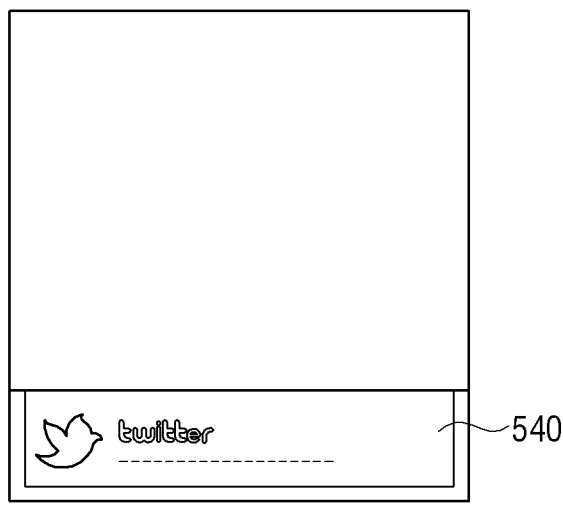

In addition, the controller 290 may control the display 230 to display a UI informing that a message or data is received from outside on the exposure area. For example, if an SNS message or SMS message is received from the outside through the communicator 240 while the display 230 is folded, the controller 290 may control the display 230 to display a UI 540 informing that the SNS message or SMS message is received on the exposure area as illustrated in FIG. 5D. In this case, the UI 540 informing that an SNS message or SMS message is received may include at least one of information regarding a sender and information regarding the SNS message or SMS message.

Further, the controller 290 may control the display 230 to display various types of UIs for releasing a lock state of the user terminal device 200 on the exposure area.

Figure 6A:
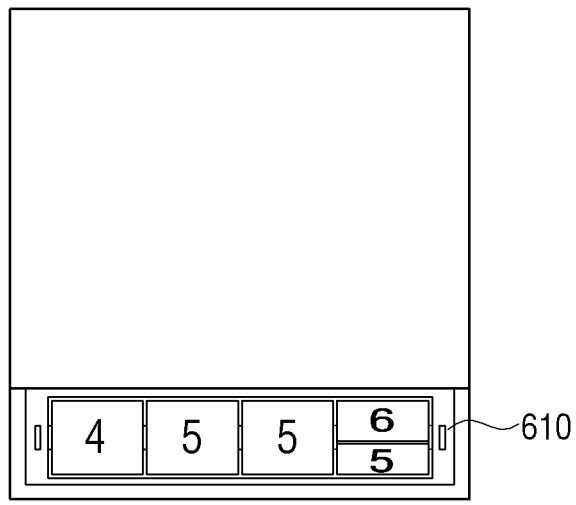

Specifically, as illustrated in FIG. 6A, the controller 290 may control the display 230 to display a UI 610 for inputting a pin number to release the lock state of the user terminal device 200 on the exposure area. In this case, the UI 610 for inputting a pin number may change the pin number by a touch interaction of swiping up and down. If a predetermined pin number is input on the UI 610 displayed on the exposure area, the controller 290 may release the lock state of the user terminal device 200. Additionally, the user may set the pin number through user input.

Figure 6B:
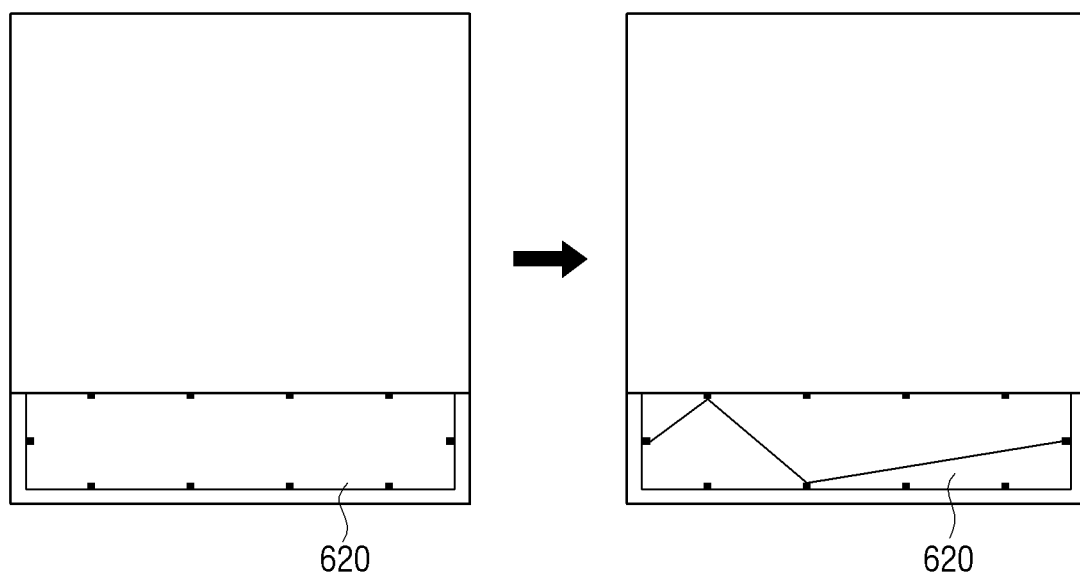

In addition, as illustrated in FIG. 6B, the controller 290 may control the display 230 to display a UI 620 including a plurality of dots on a corner of the exposure area to release the lock state of the user terminal device 200 on the exposure area. In this case, if a touch interaction of connecting dots in a predetermined pattern is detected on the UI 620, the controller 290 may release the lock state of the user terminal device 200. Additionally, the user may set the pin number through user input.

Figure 6C:
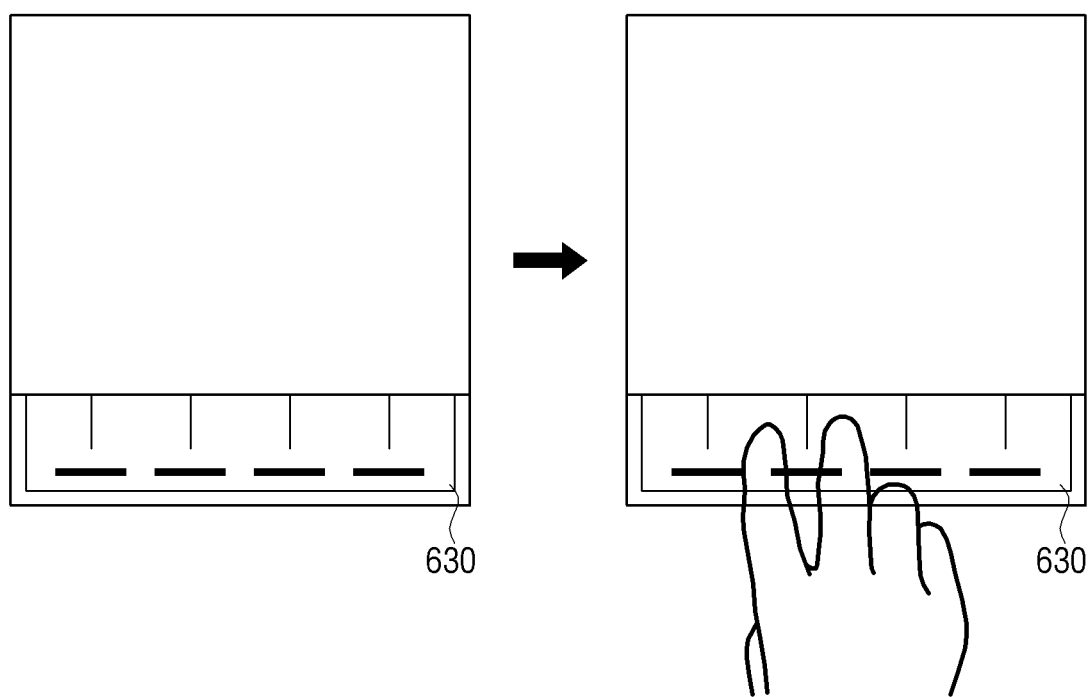

As illustrated in FIG. 6C, the controller 290 may control the display 230 to display a UI 630 in the form of a keyboard, e.g., piano, to release the lock state of the user terminal device 200 on the exposure area. In this case, if a touch interaction of touching the keyboard, i.e., piano, in a predetermined rhythm is detected on the UI 630, the controller may release the lock state of the user terminal device 200.

Figure 6D:
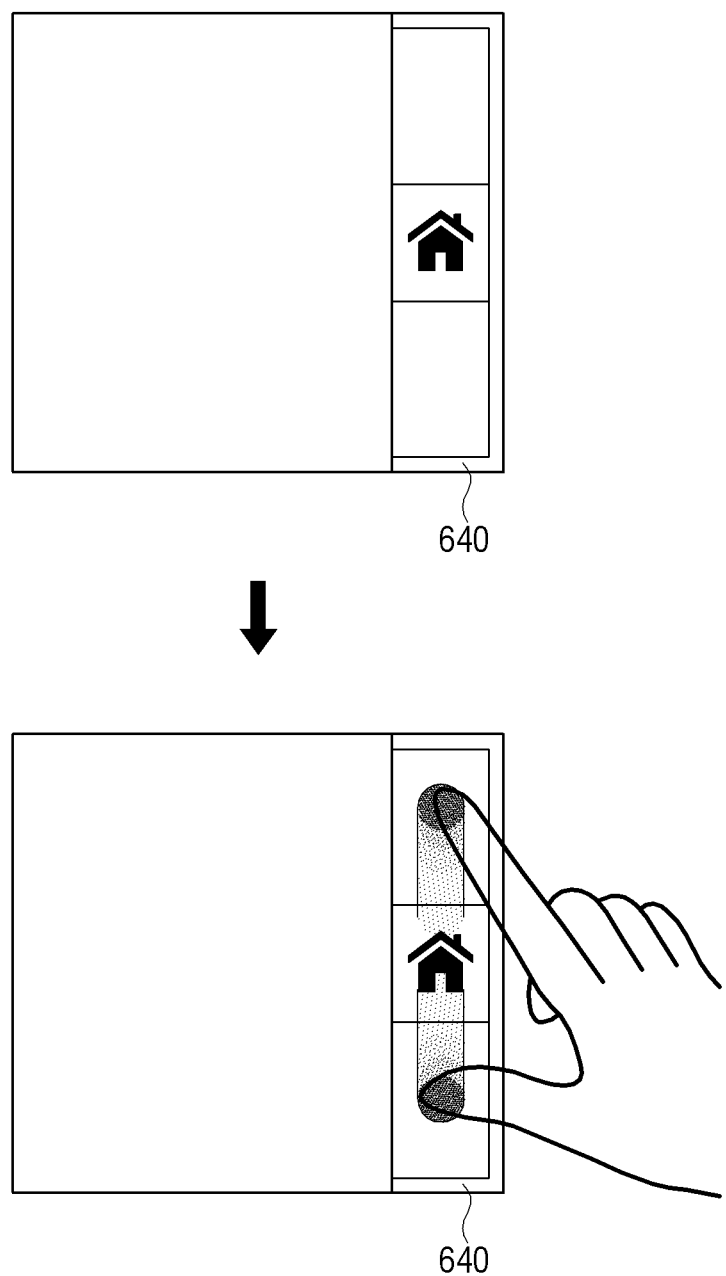

In addition, as illustrated in FIG. 6D, the controller 290 may control the display 230 to display a UI 640 including a home icon to release the lock state of the user terminal device on the exposure area. In this case, if a touch interaction of pinching out with reference to the home icon included in the UI 640 is detected, the controller 290 may release the lock state of the user terminal device 200.

The controller 290 may control the display 230 to display a UI for changing the setting of the user terminal device 200 on the exposure area.

Figure 7A:
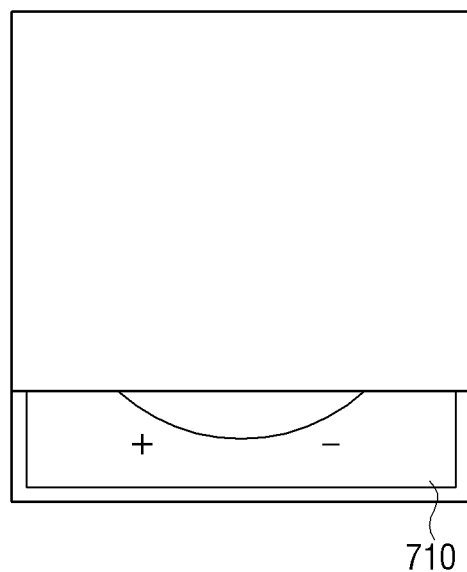

Specifically, as illustrated in FIG. 7A, the controller 290 may control the display 230 to display a UI 710 in the form of an arc for adjusting the volume of the user terminal device 200. Meanwhile, in the above exemplary embodiment, the UI displayed on the exposure area adjusts the volume, but this is only an example. A UI for adjusting another setting of the user terminal device 200 (for example, display brightness, etc.) may be displayed.

Figure 7B:
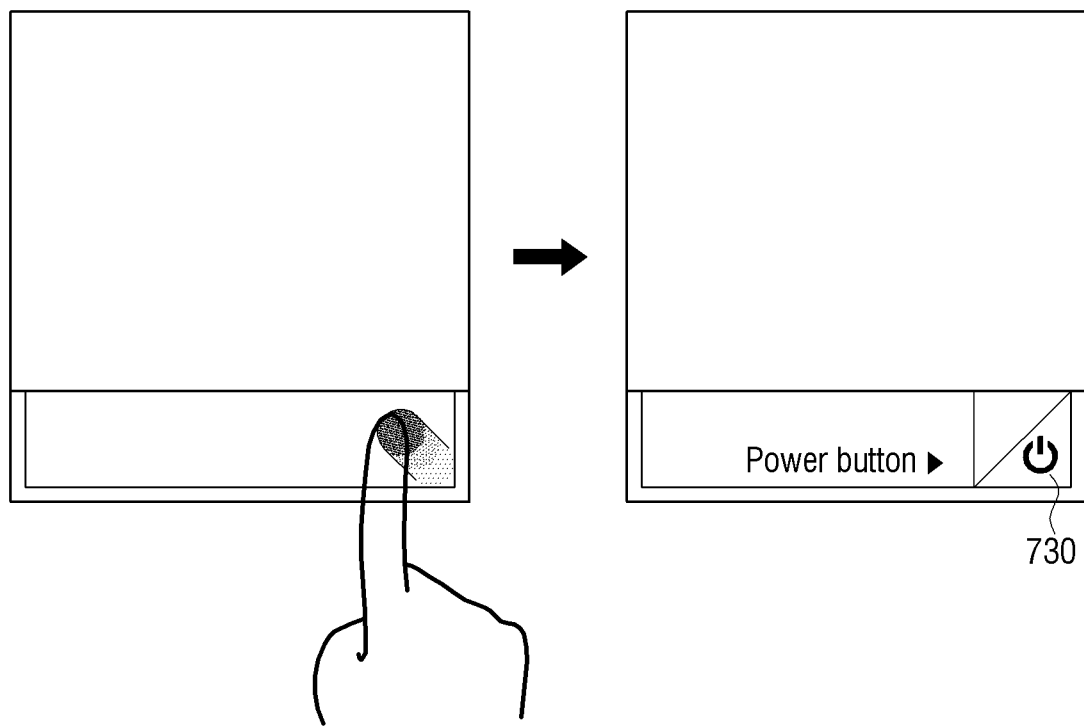

In addition, as illustrated in FIG. 7B, if a touch interaction of dragging one of a plurality of vertexes included in the exposure area in a diagonal direction is detected, the controller 290 may control the display 230 to display a UI 720 for turning off the power of the user terminal device 200 at the corner area corresponding to the vertex where the touch interaction is detected.

<A Folding Interaction and an Unfolding Interaction>

If a plurality of icons are displayed on the exposure area while the display 230 is folded, and an unfolding interaction of unfolding the display 230 while one of the plurality of icons is touched, the controller 290 may control the display 230 to display a screen corresponding to the touched icon on full screen.

Figure 8A:
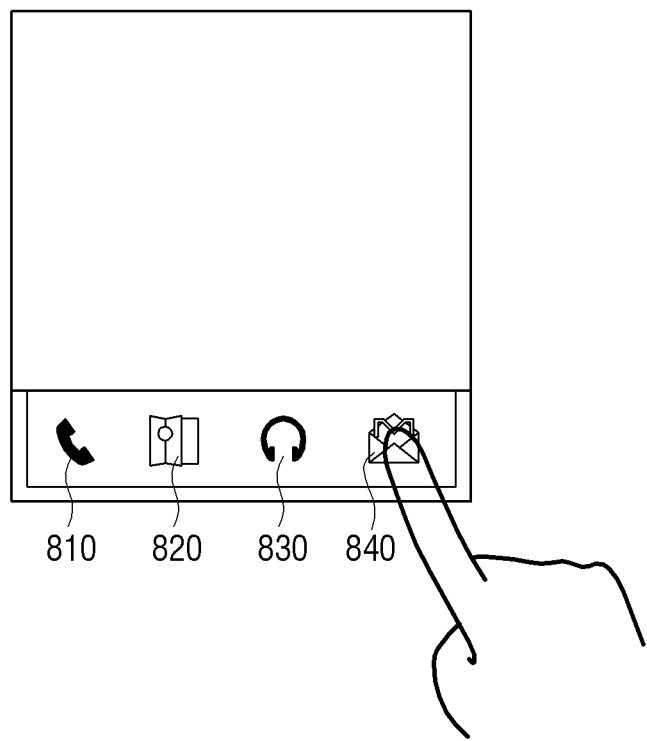

Specifically, as illustrated in FIG. 8A, the display 230 displays the first to the fourth icons 810 to 840 while the display 230 is folded. If an unfolding interaction of unfolding the display 230 is detected while the fourth icon 840 out of the first to the fourth icon 810 to 840 is touched, the controller 290 may control the display 230 to display a message window 850 corresponding to the fourth icon 840 on full screen as illustrated in FIG. 8B.

Meanwhile, in the above exemplary embodiment, an unfolding interaction is detected while the fourth icon 840 is touched, but this is only an example. If an unfolding interaction is detected while another icon is touched, a screen corresponding to the other touched icon may be displayed on the full screen of the display 230. For example, if an unfolding interaction is detected while the first icon 810 is touched, the controller 290 may control the display 230 to display an execution screen of a call application corresponding to the first icon 810 (for example, a recent call list screen, an address book screen, a call sending screen, etc.) on full screen. In addition, if an unfolding interaction is detected while the second icon 820 is touched, the controller 290 may control the display 230 to display a web browser screen corresponding to the second icon 820 on full screen. If an unfolding interaction is detected while the third icon 830 is touched, the controller 290 may control the display 230 to display an execution screen of a music application corresponding to the third icon 830 (for example, a music play screen, a music list screen, etc.) on full screen.

In addition, if the exposure area is touched while the display 230 is folded and then, an unfolding interaction of unfolding a hinge angle of the display 230 as much as a predetermined angle is detected, the controller 290 may control the display 230 to display a screen for executing a specific function.

Figure 9A:
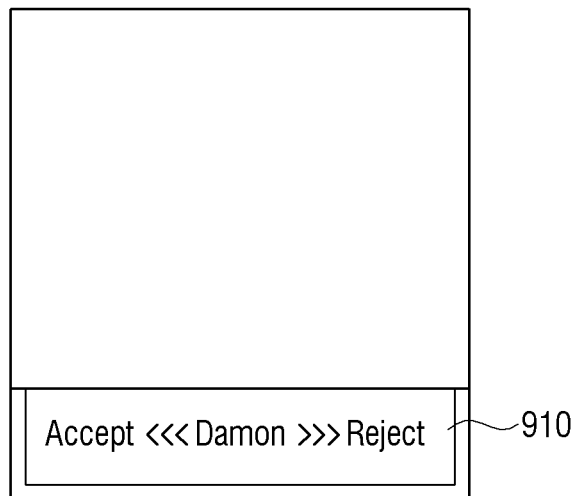
Figure 9B:
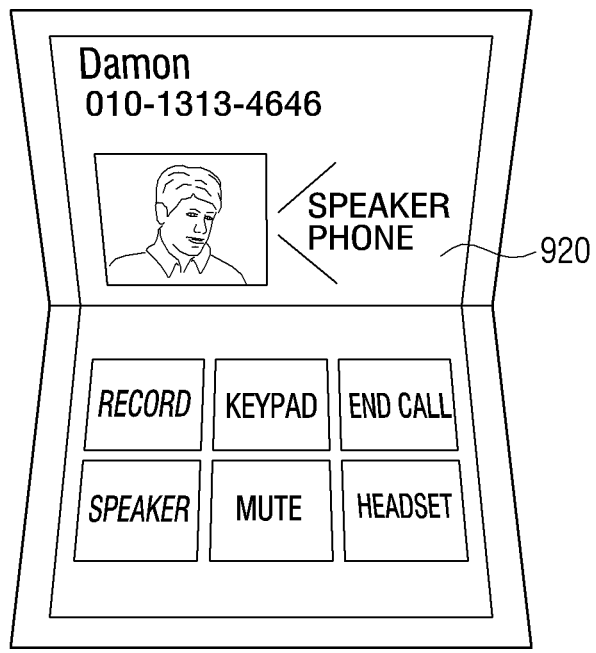

Specifically, if a call request is received while the display 230 is folded, the controller 290 may control the display 230 to display a UI 910 informing that a call request is received on the exposure area as illustrated in FIG. 9A. If an unfolding interaction of unfolding a hinge angle of the display 230 as much as a predetermined angle (for example, 70° to 120°) is detected while the UI 910 informing that a call request is received is touched, the controller 290 may accept the call request, execute a speaker phone function, and control the display 230 to display an execution screen 920 including various icons as illustrated in FIG. 9B.

Figure 10A:
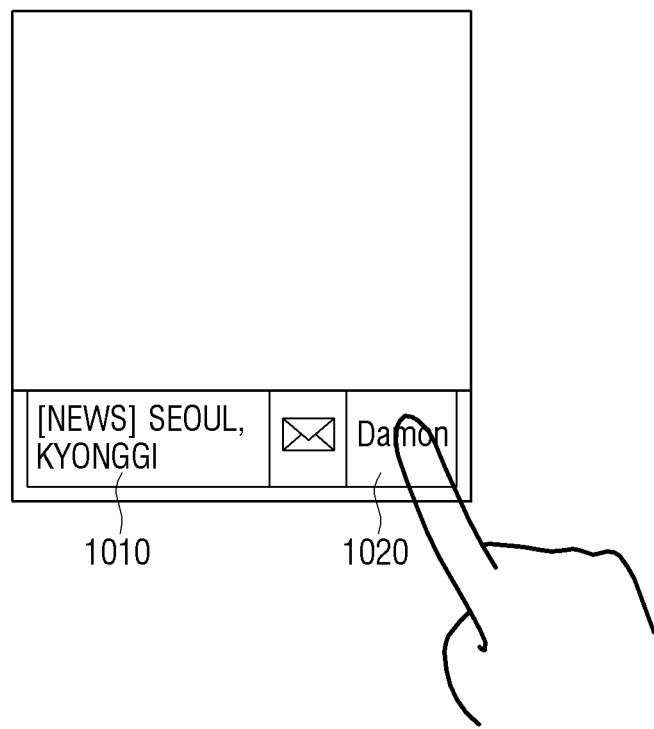
Figure 10B:
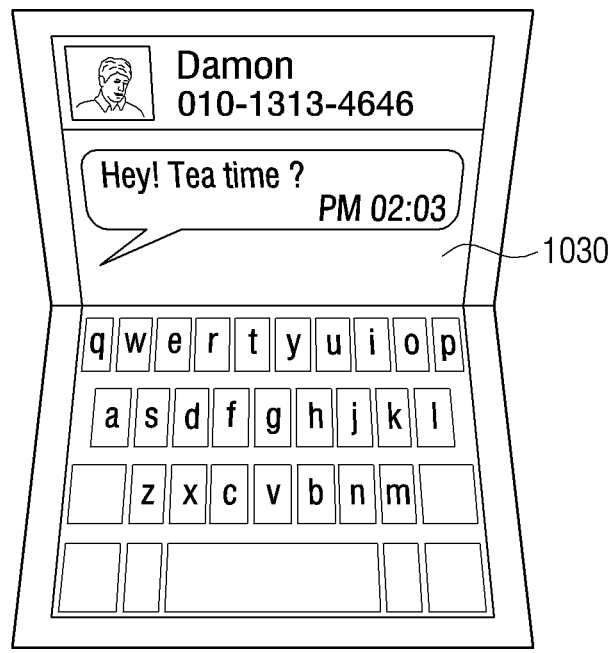

Specifically, if a message is received from outside while news information 1010 is displayed at the same as the display 230 is folded, the controller 290 may control the display 230 to display a UI 1020 informing that the message is received along with the news information 1010 on the exposure area as illustrated in FIG. 10A. If an unfolding interaction of unfolding a hinge angle of the display 230 as much as a predetermined angle (for example, 70° to 120°) is detected while the UI 1020 informing that a message is received is touched, the controller 290 may control the display 230 to display a message window 1030 for writing a reply to the received message as illustrated in FIG. 10B.

In addition, the controller 290 may control the display 230 to display different screens when the exposure area is touched and then, an unfolding interaction is detected and when an unfolding interaction is detected.

Figure 11A:
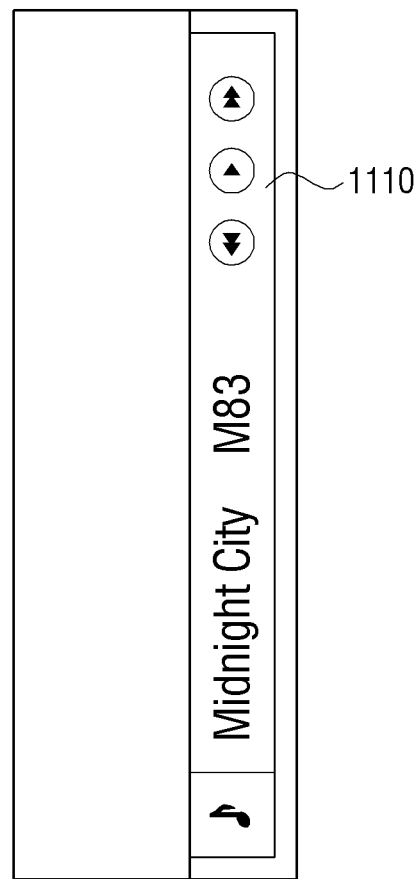

Specifically, the controller 290 may control the display 230 to display a UI 1110 corresponding to a music application on the exposure area as illustrated in FIG. 11A.

Figure 11B:
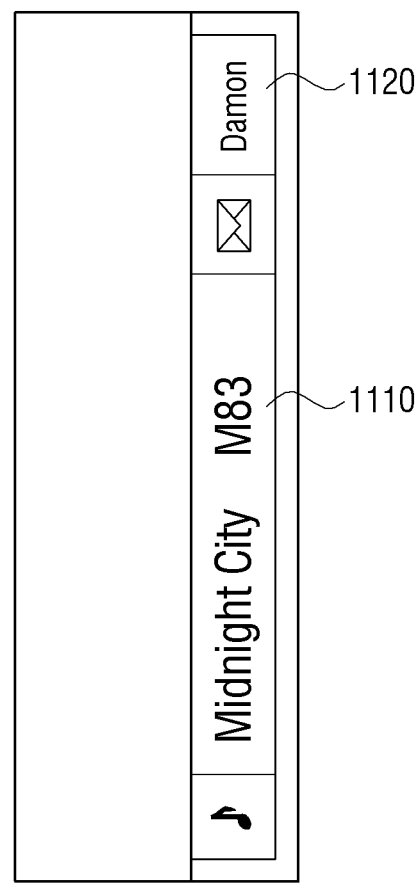

If a message is received from outside while the UI 1110 corresponding to a music application is displayed on the exposure area, the controller 290 may control the display 230 to display a UI 1120 informing that the message is received along with the music application UI 1110 on the exposure area as illustrated in FIG. 11B.

Figure 11C:
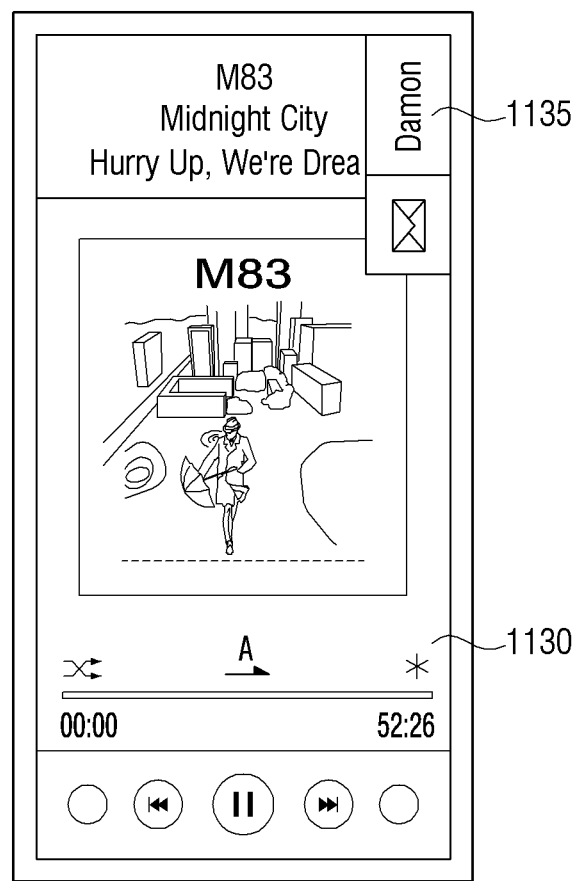

In this case, if an unfolding interaction of unfolding the display 230 is detected while the exposure area is not touched, the controller 290 may control the display 230 to display an execution screen 1130 of the existing music application as illustrated in FIG. 11C. In this case, a UI 1135 informing that a message is received may be displayed on one area of the execution screen 1130 of the music application for a predetermined time.

Figure 11D:
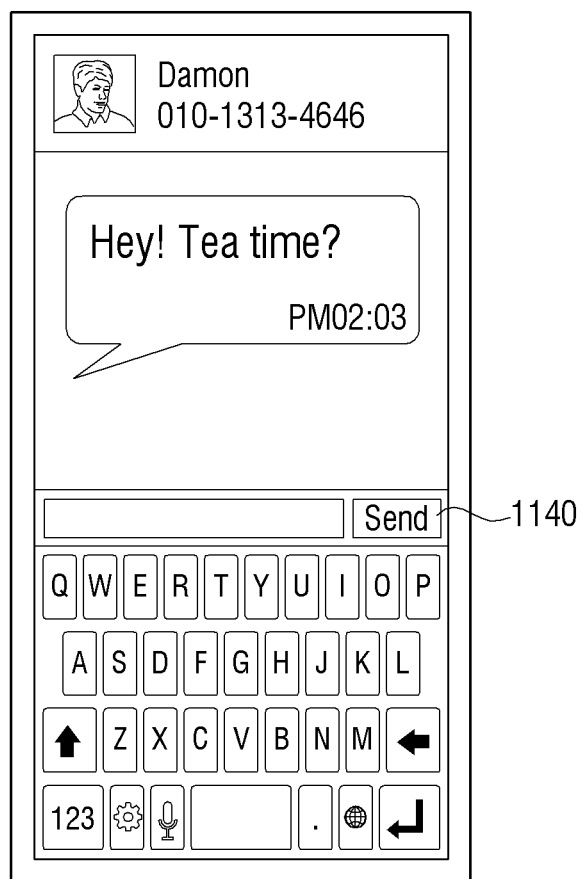

However, if an unfolding interaction of unfolding the display 230 is detected while the UI 1120 informing that a message is received is displayed on the exposure area, the controller 290 may control the display 230 to display a message window 1140 for writing a reply to the received message as illustrated in FIG. 11D.

In addition, the controller 290 may control the display 230 to display different screens according to the order of detecting an unfolding interaction and a touch interaction for lock-releasing.

Figure 12A:
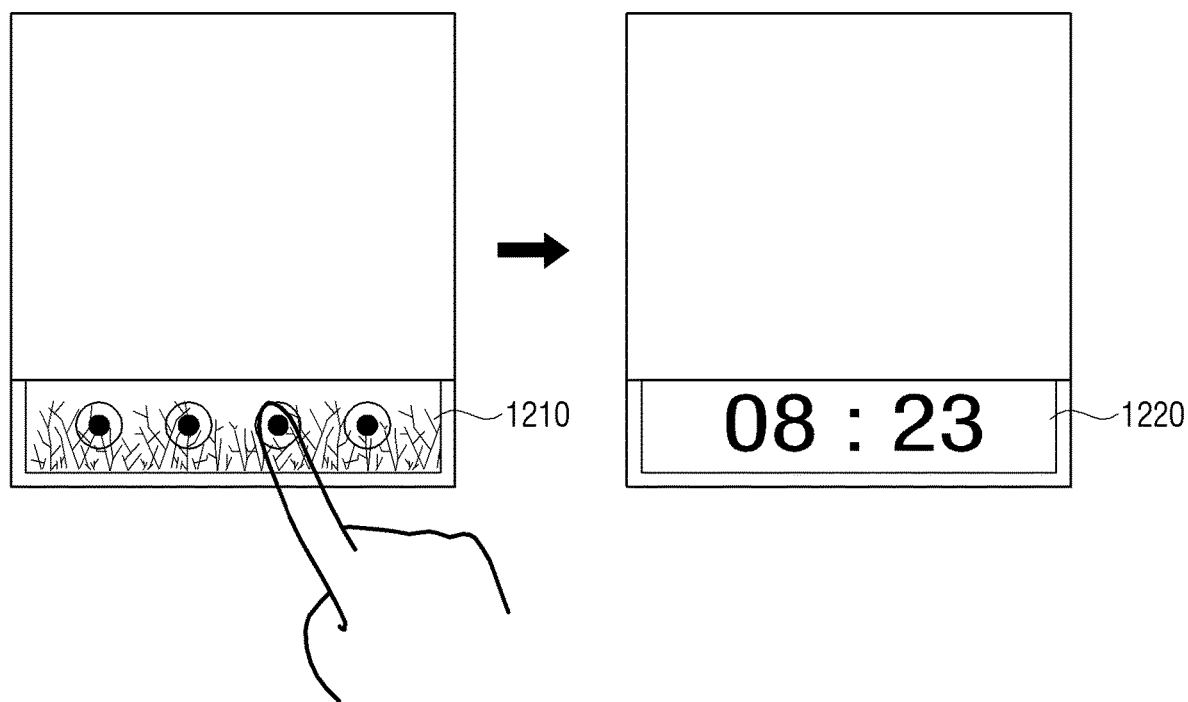

Specifically, as illustrated in the left side of FIG. 12A, if a touch interaction for lock-releasing is detected while a UI 1210 for releasing the lock of the user terminal device 200 is displayed on the exposure area, the controller 290 may release the lock state of the user terminal device 200, and as illustrated in the right side of FIG. 12A, may control the display 230 to display a first home screen 1220 including time information on the exposure area.

Figure 12B:
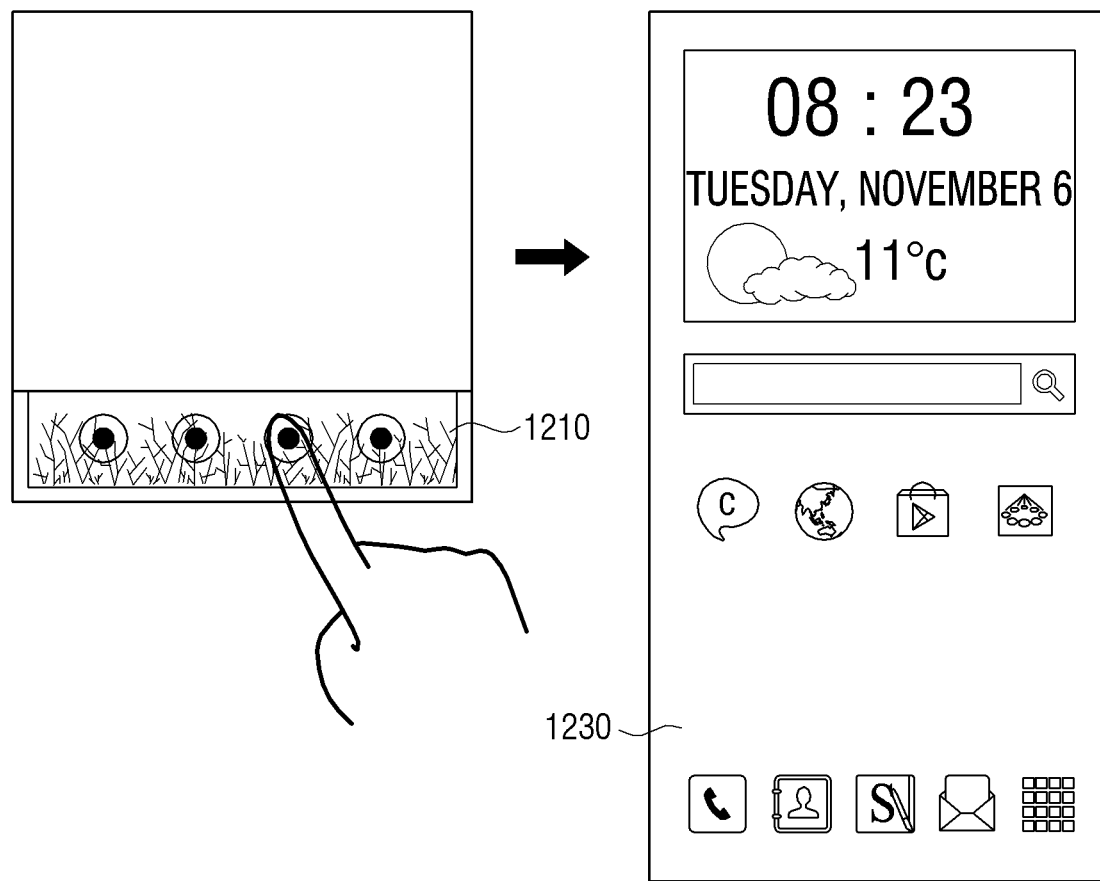

In addition, as illustrated in the left side of FIG. 12B, if a touch interaction for lock-releasing is detected while the UI 1210 for releasing the lock of the user terminal device 200 is displayed on the exposure area, and an unfolding interaction is detected, the controller 290 may release the lock state of the user terminal device 200, and as illustrated in the right side of FIG. 12B, may control the display 230 to display a second home screen 1230 on full screen.

Figure 12C:
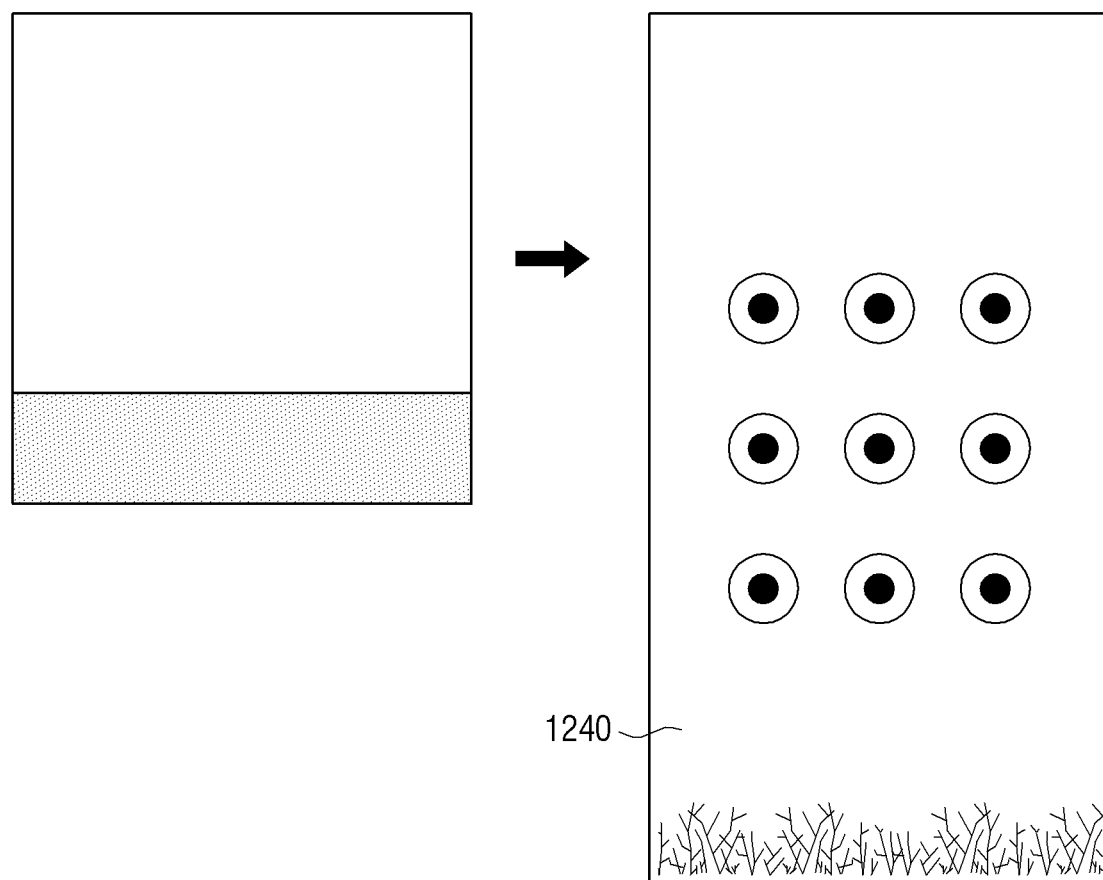

As illustrated in the left side of FIG. 12C, if an unfolding interaction is detected while an image is not displayed on the exposure area, the controller 290 may control the display 230 to display a UI 1240 for releasing the lock of the user terminal device on full screen as illustrated in the right side of FIG. 12C. If a touch interaction for lock-releasing is detected on the UI 1240 for releasing the lock of the user terminal device 200, which is displayed on full screen, the controller 290 may release the lock state of the user terminal device 200, and as illustrated in the right side of FIG. 12B, may control the display 230 to display the second home screen 1230 on full screen.

In addition, the controller 290 may control the display 230 to display distinctively a screen which is displayed when only an unfolding interaction is detected while a UI corresponding to a specific application is displayed on the exposure area and a screen which is displayed when an unfolding interaction is detected after the exposure area is touched.

Figure 13A:
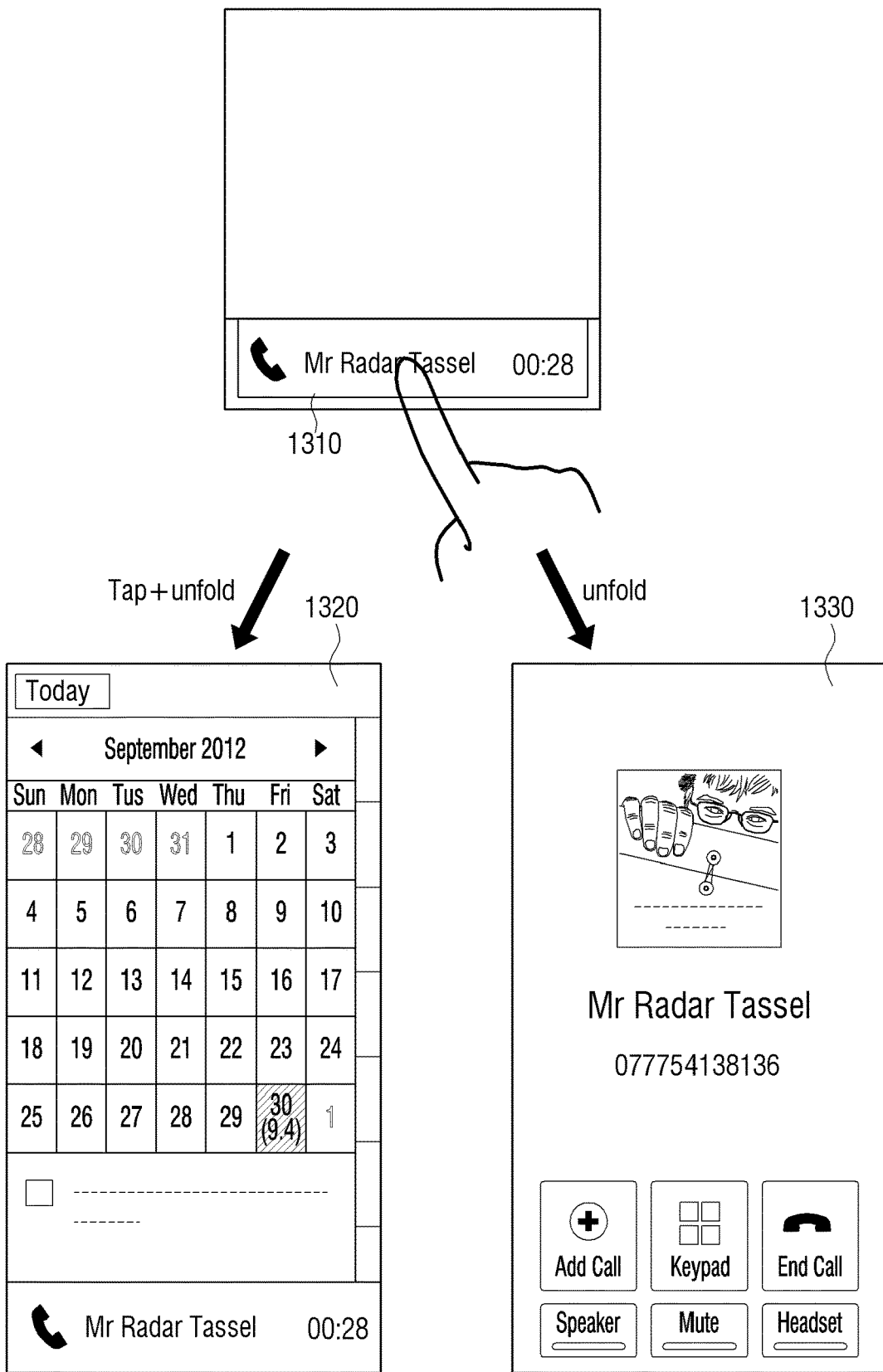

Specifically, if a call request is received from outside while the display 230 is folded, the controller 290 may control the display 230 to display a UI 1310 informing a call request is received on the exposure area as illustrated in the left side of FIG. 13A. If the UI 1310 displayed on the exposure area is touched and then, an unfolding interaction of unfolding the display 230 is detected, the controller 290 may control the display 230 to display an execution screen 1320 of a calendar application which is related to a call request function on full screen (in another example, an execution screen of a memo application) as illustrated in the lower left side of FIG. 13A. On the other hand, if an unfolding interaction of unfolding the display 230 is detected while the UI 1310 displayed on the exposure area is not touched, the controller 290 may control the display 230 to display a call screen 1330 on full screen as illustrated in the lower right side of FIG. 13A.

Figure 13B:
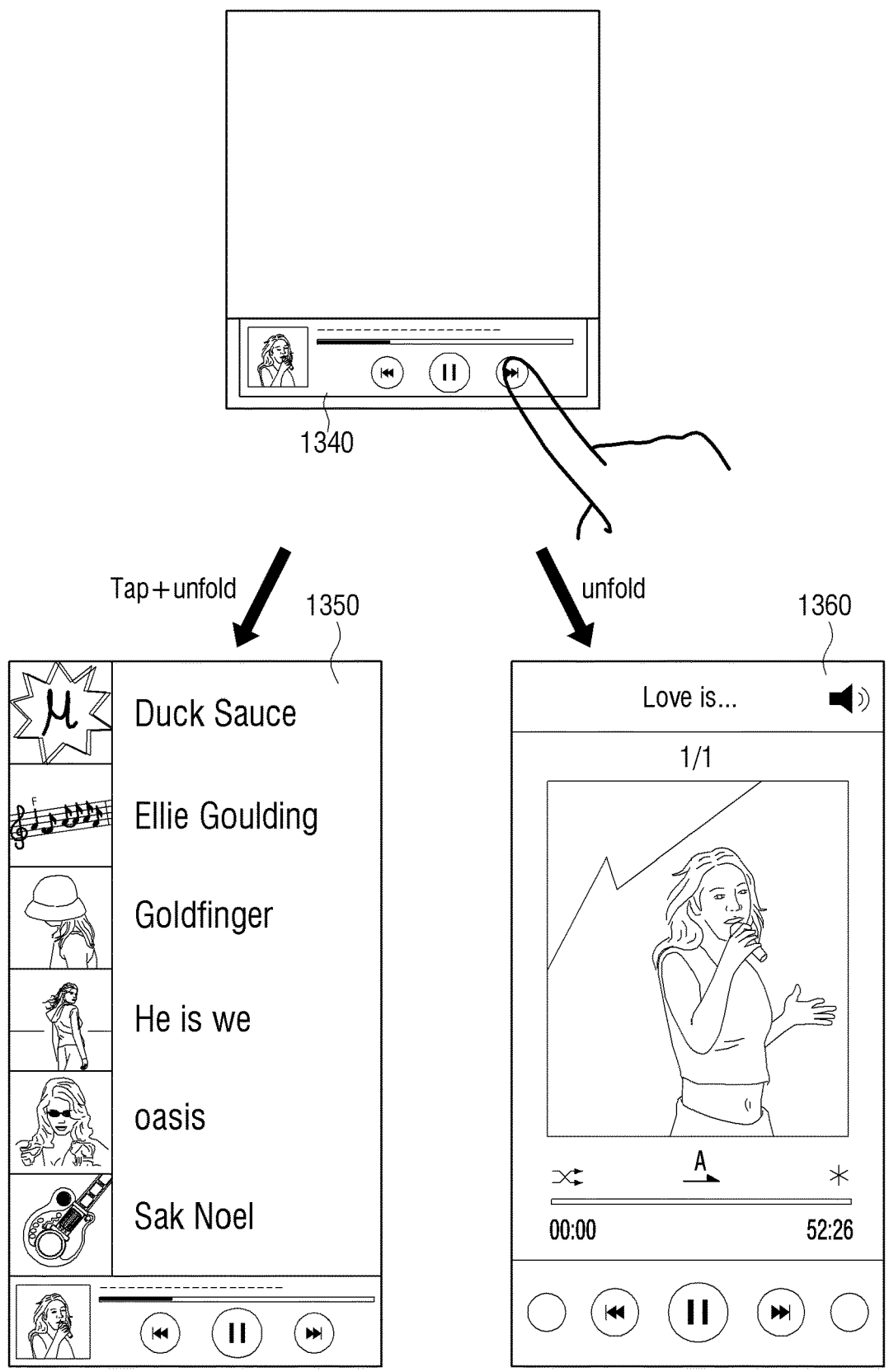

If a folding interaction of folding the display 230 is detected while a music application is executed, the controller 290 may control the display 230 to display a UI 1340 for controlling the music application on the exposure area as illustrated in the upper portion of FIG. 13B. If the UI 1340 displayed on the exposure area is touched and then, an unfolding interaction of unfolding the display 230 is detected, the controller 290 may control the display 230 to maintain music play and display a play list 1350 on full screen as illustrated in the lower left side of FIG. 13B. On the other hand, if an unfolding interaction of unfolding the display 230 is detected while the UI 1340 displayed on the exposure area is not touched, the controller 290 may control the display 230 to display a music player screen 1360 on full screen as illustrated in the lower right side of FIG. 13B.

If a first unfolding interaction of unfolding a hinge angle of the display 230 as much as a predetermined angle is detected, the controller 290 may control the display 230 to display at least one icon for executing a specific function. If a second unfolding interaction of unfolding the display 230 completely while at least one icon is touched, the controller 290 may execute a function corresponding to the touched icon.

Figure 14A:
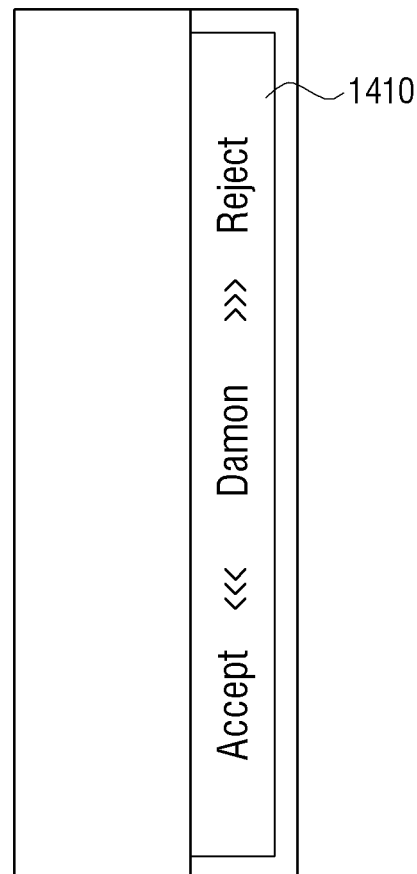

According to an exemplary embodiment, if a call request is received from outside while the display 230 is folded, the controller 290 may control the display 230 to display a UI 1410 informing that a call request is received on the exposure area as illustrated in FIG. 14A.

Figure 14B:
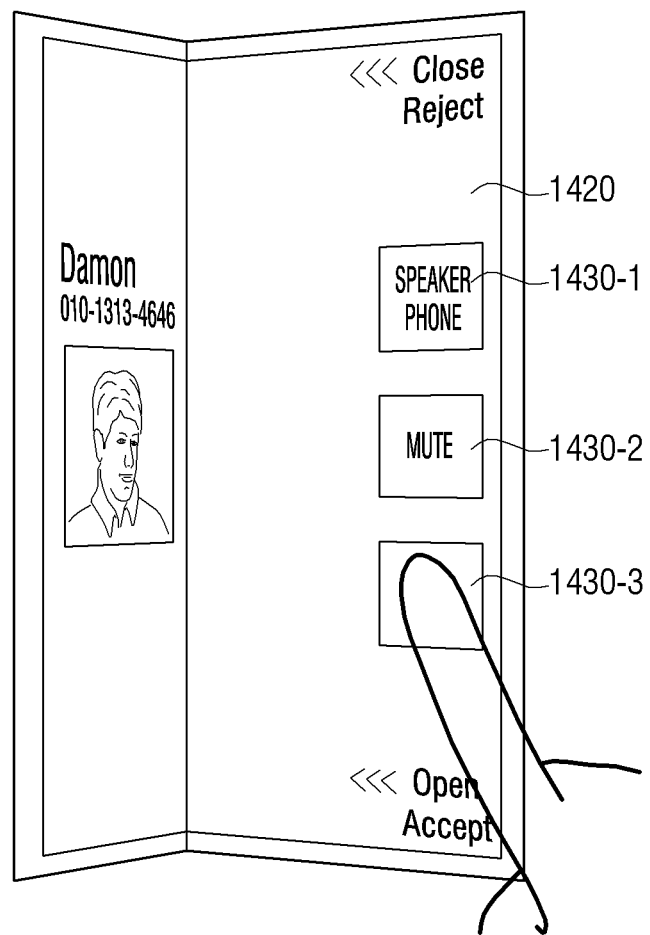

If the first unfolding interaction of unfolding a hinge angle of the display 230 as much as a predetermined angle (for example, 30° to 150°) is detected while the UI 1410 informing that a call request is received is displayed, the controller 290 may control the display 230 to display a UI 1420 including a plurality of icons 1430-1 to 1430-3 for performing various functions in relation with making a call as illustrated in FIG. 14B.

Figure 14C:
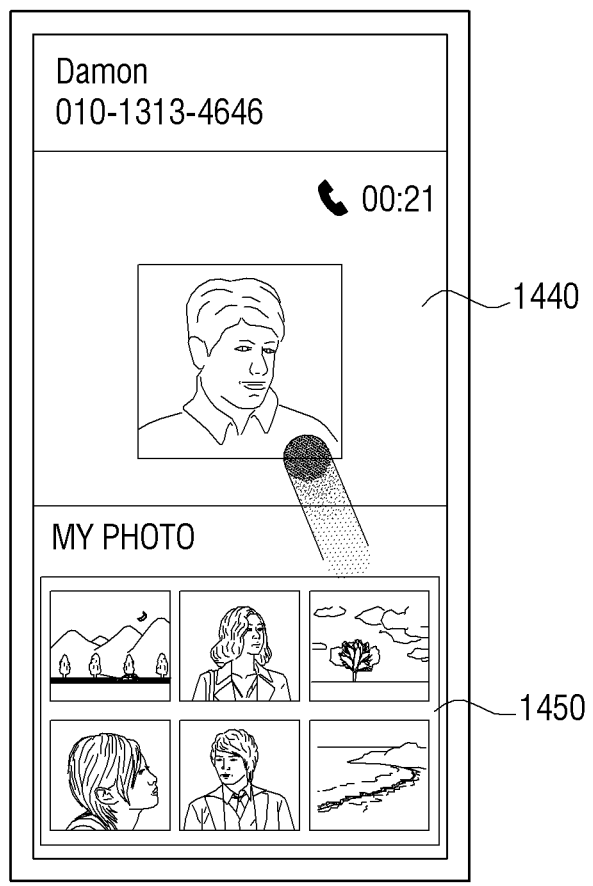

If an unfolding interaction of unfolding the display 230 completely (that is, unfolding the display 230 such that a hinge angle of the display 230 becomes 180°) is detected while a photo sharing icon is touched from among the plurality of icons 1430-1 to 1430-3, the controller 290 may accept a call request, and as illustrated in FIG. 14C, may control the display 230 to display a call screen 1440 on the upper area and a list 1450 for selecting a photo to be shared. In this case, if a touch interaction of dragging one of a plurality of photos included in the list 1450 to the call screen 1440 is selected, the controller 290 may control the communicator 240 to transmit the photo where the touch interaction is detected to a receiver.

If an unfolding interaction is detected, the controller 290 may control the display 230 to display a plurality of guidance messages according to a hinge angle of the display 230 while the unfolding interaction is detected. In this case, the guidance messages may include a guidance message for informing an incoming text message, a guidance message for informing an absence call, a guidance message for informing an incoming an SNS message or SMS message, a guidance message for informing update of applications, etc.

Figure 15A:
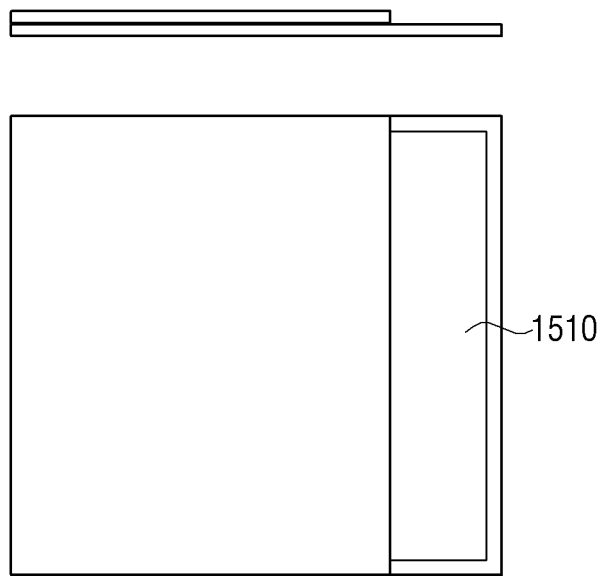

Specifically, as illustrated in FIG. 15A, the controller 290 may control the display 230 to display one guidance message while the display 230 is folded. Subsequently, if an unfolding interaction of unfolding the display 230 is detected, the controller 290 may control the display 230 to display the different number of guidance messages according to a hinge angle of the display 230. For example, if a hinge angle of the display 230 is within a first angle range (for example, between 5° and 15°), the controller 290 may control the display 230 to display two guidance messages (possibly overlapping) 1510, 1520. If a hinge angle of the display 230 is within a second angle range (for example, between 15° and 25°), the controller 290 may control the display 230 to display three guidance messages (possibly overlapping) 1510, 1520, 1530. That is, the controller 290 may increase the number of guidance messages displayed as a hinge angle of display 230 becomes greater.

Figure 15B:
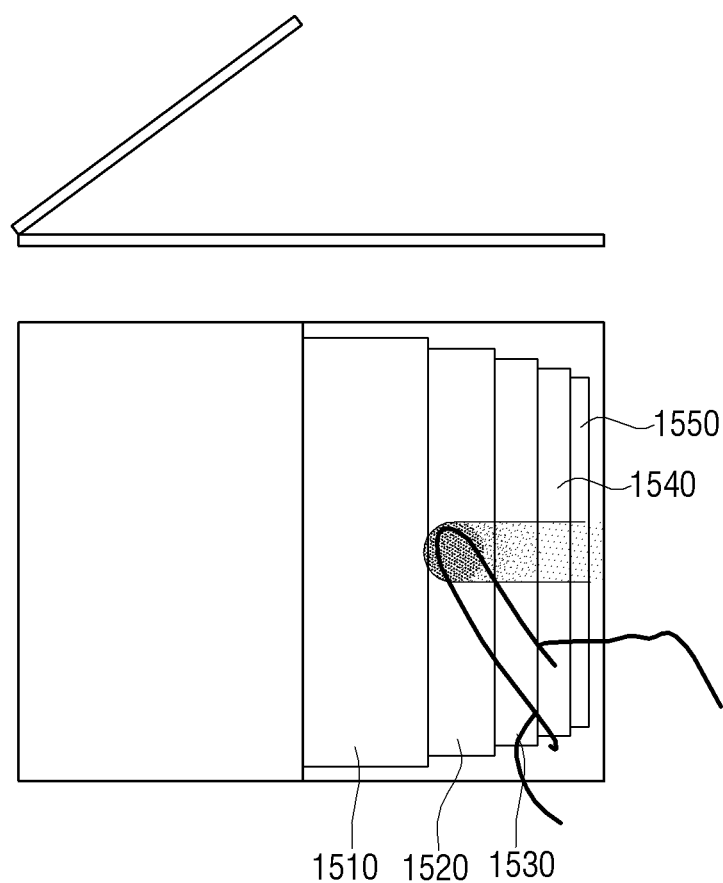

If a hinge angle of the display 230 is within a fourth angle range (for example, between 35° and 45°), the controller 290 may control the display 230 to display five guidance messages (possibly overlapping) 1510 to 1550 as illustrated in FIG. 15B. In this case, as illustrated in FIG. 15B, the first guidance message 1510 which is updated most recently may be disposed on the top.

Figure 15C:
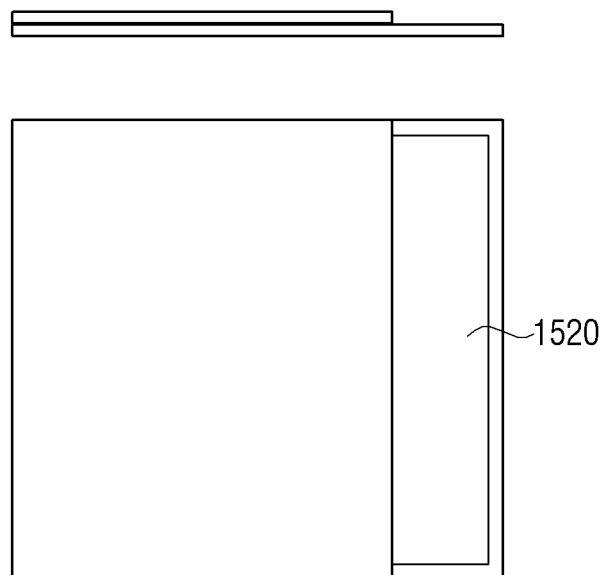

As illustrated in FIG. 15B, if a folding interaction of folding the display 230 again is detected when the second guidance message 1520 is touched while the five guidance messages 1510 to 1520 are displayed, the controller 290 may control the display 230 to display the second guidance message 1520 on the exposure area as illustrated in FIG. 15C.

Figure 15D:
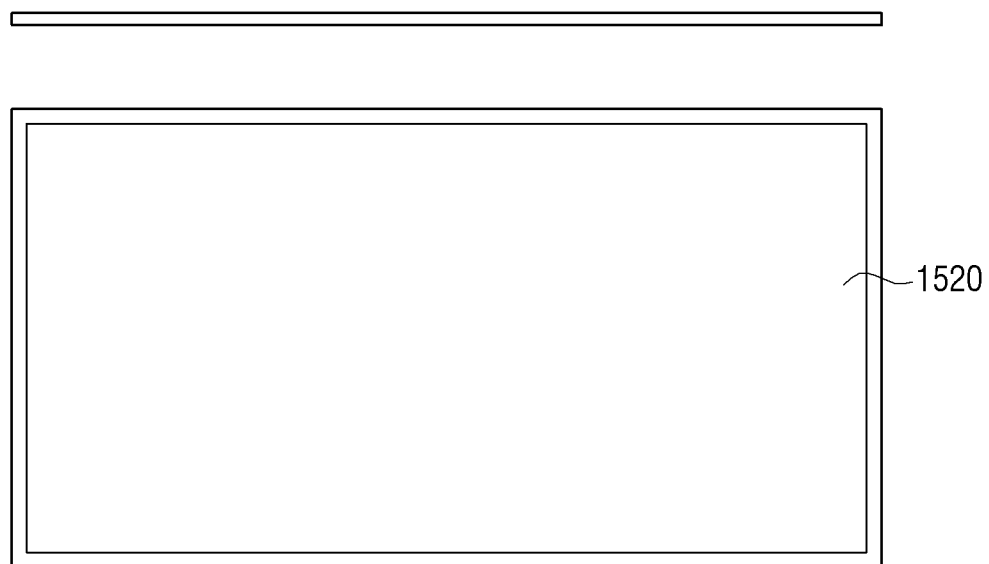

In addition, as illustrated in FIG. 15B, if an unfolding interaction of unfolding the display 230 completely is detected when the second guidance message 1520 is touched while the five guidance messages 1510 to 1550 are displayed, the controller 290 may control the display 230 to display a screen corresponding to the second guidance message 1520 on full screen as illustrated in FIG. 15D.

Further, the controller 290 may perform different functions according to the direction of a touch interaction which is detected on the exposure area while the display 230 is folded.

Figure 16A:
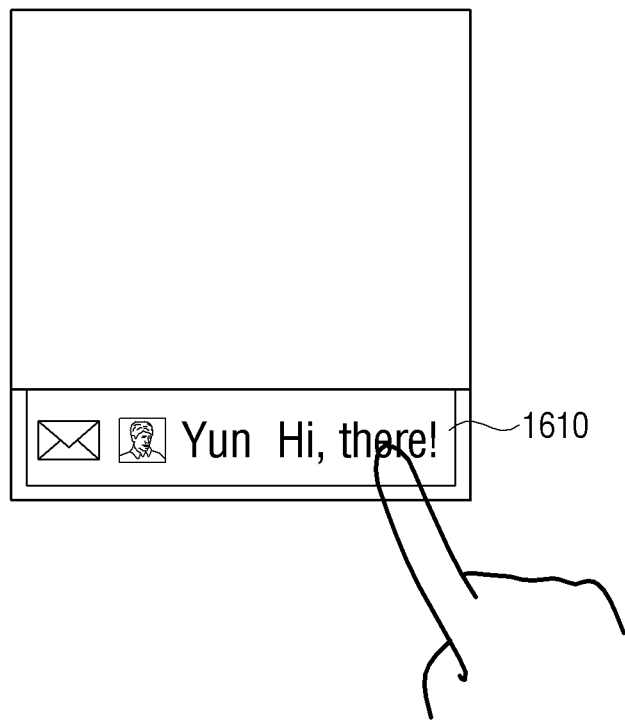
Figure 16B:
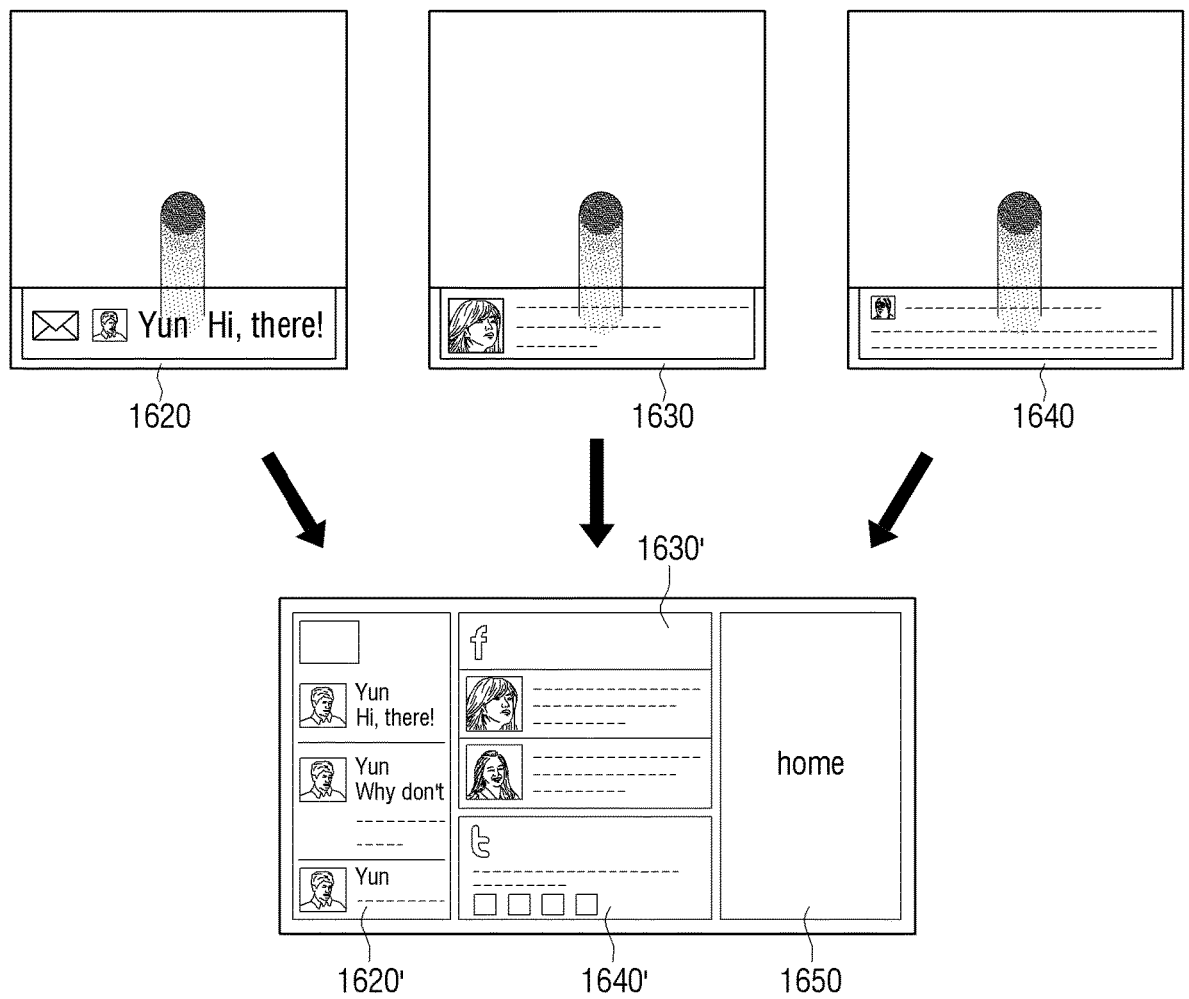

Specifically, if a message is received from outside while the display 230 is folded, the controller 290 may control the display 230 to display a UI 1610 informing that the message is received on the exposure area as illustrated in FIG. 16A.

In this case, if a touch interaction in the left-and-right direction is detected on the UI 1610 informing that a message is received, the controller 290 may control the display 230 to display a UI informing the previous message or the next message on the exposure area according to the touch interaction.

If a touch interaction in the down direction is detected on the UI 1610 informing that a message is received, the controller 290 may delete a currently-received message.

If a touch interaction in the up direction is detected on the UI 1610 informing that a message is received, the controller 290 may store the received messages. Specifically, as illustrated in the upper left side of FIG. 16B, if a touch interaction in the up direction is detected on a UI 1620 informing that a first message is received, a touch interaction in the up direction is detected on a UI 1630 informing a second message is received, a touch interaction in the up direction is detected on a UI 1640 informing that a third message is received and then, an unfolding interaction of unfolding the display 230 is detected, the controller 290 may control the display 230 to display a screen 1620' including the first message, a screen 1630' including the second message, a screen 1640' including the third message and a home screen 1650 as illustrated in the lower right side of FIG. 16B.

<Maintain the Current Function Despite the Change in the Shape of the Display 230>

The controller 290 may maintain the current function even if the shape of the display 230 changes according to a folding interaction or an unfolding interaction, and control the display 230 to display a screen corresponding to the current function.

Figure 17A:
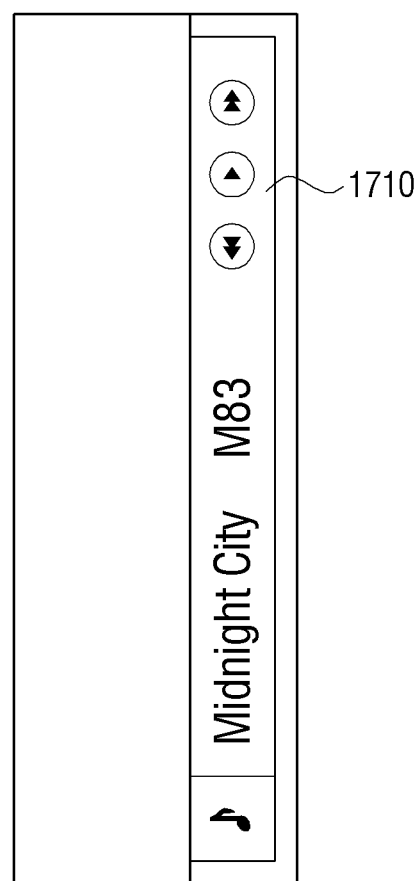
FIGS. 17A to 23B are views illustrating an exemplary embodiment where a user terminal device maintains a function when a folding interaction and an unfolding interaction are detected according to various exemplary embodiments.
Figure 17B:
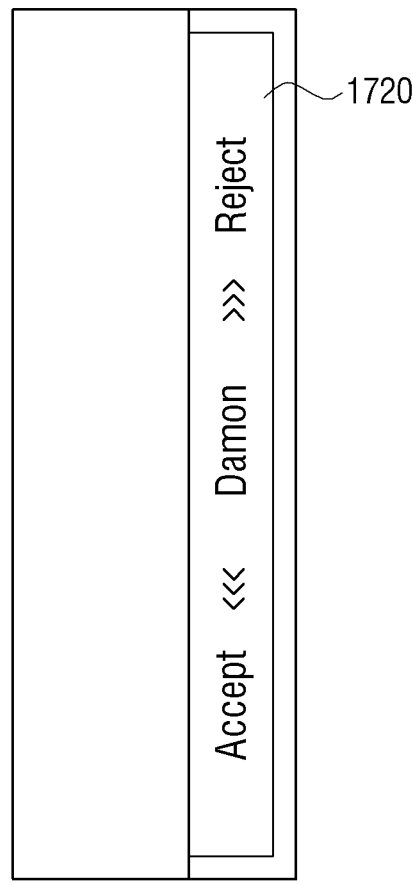
Figure 17C:
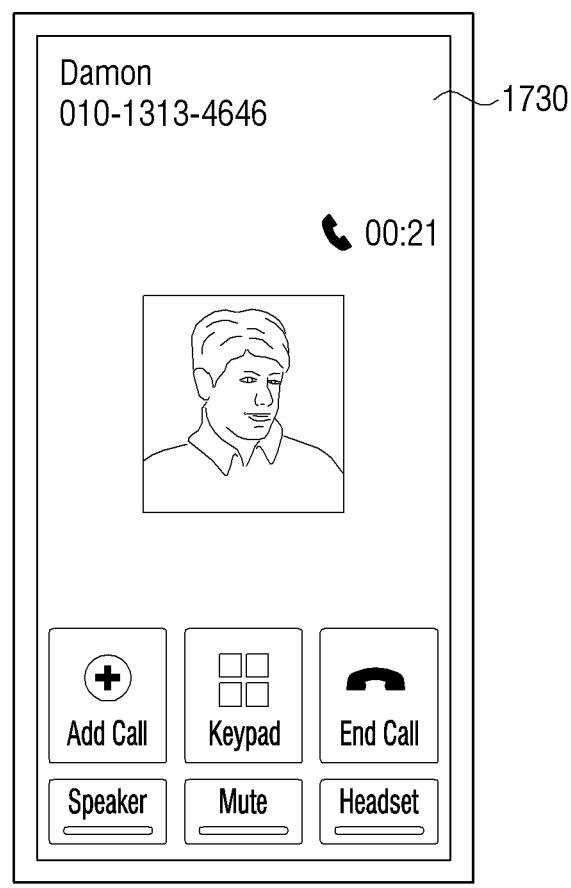
Figure 17D:
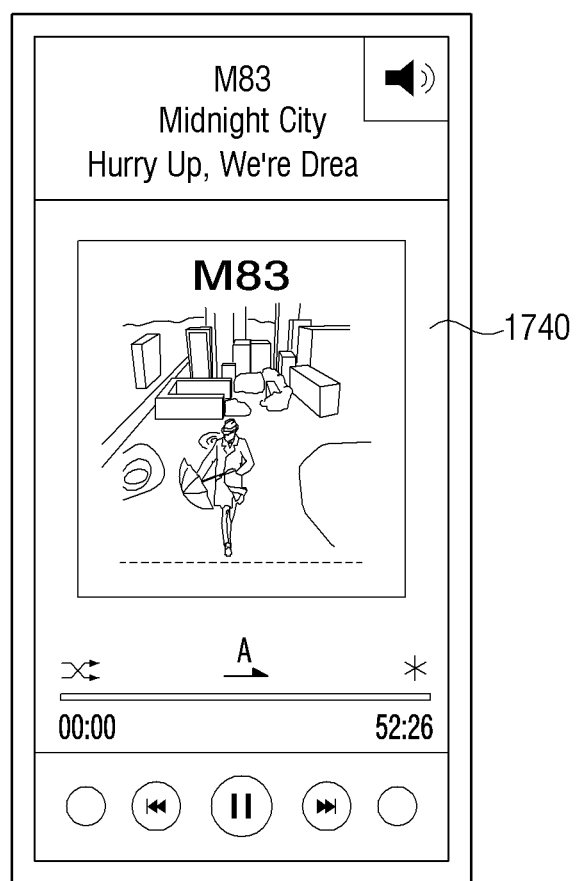
Figure 17E:
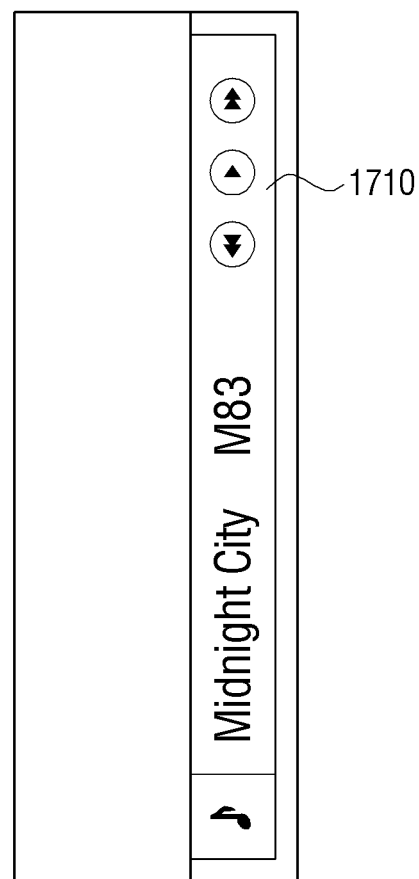

According to an exemplary embodiment, if a folding interaction of folding the display 230 is detected while a music application is executed, the controller 290 may control the display 230 to display a UI 1710 corresponding to the music application on the exposure area as illustrated in FIG. 17A. If a call request is received while the UI 1710 corresponding to the music application is displayed on the exposure area, the controller 290 may control the display 230 to display a UI 1720 informing that a call request is received on the exposure area as illustrated in FIG. 17B. If an unfolding interaction of unfolding the display 230 is detected while the UI 1720 informing that a call request is received is displayed on the exposure area, the controller 290 may control the display 230 to display a call screen 1730 on full screen as illustrated in FIG. 17C. Subsequently, when the telephone call is completed, the controller 290 may control the display 230 to display an execution screen 1740 of the music application on full screen as illustrated in FIG. 17D. If a folding interaction of folding the display 230 is detected again, the controller 290 may control the display 230 to display the UI corresponding to the music application on the exposure area as illustrated in FIG. 17E.

Figure 18A:
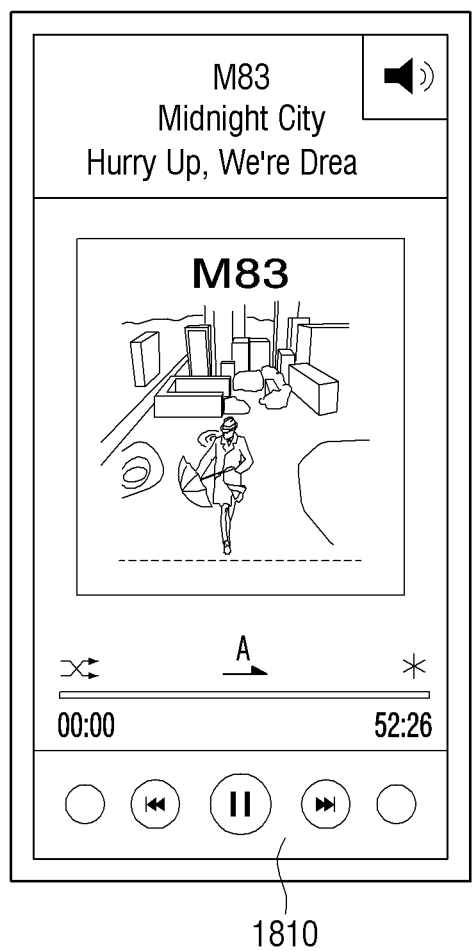
Figure 18B:
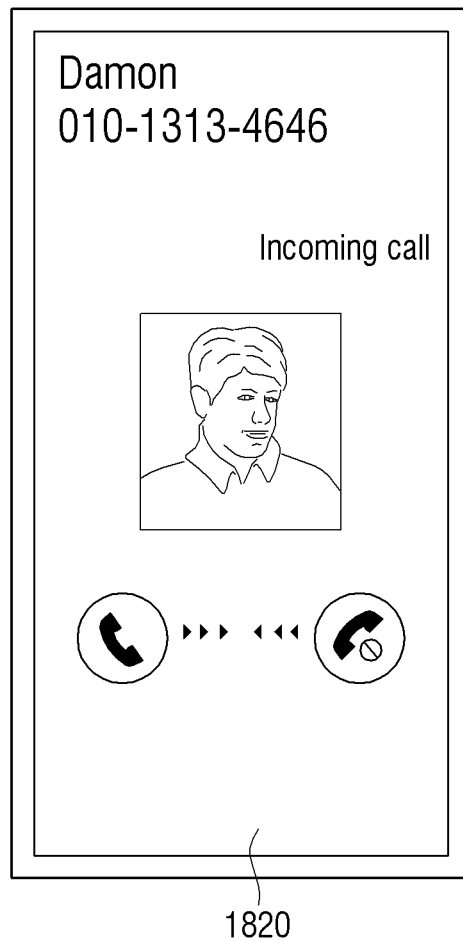
Figure 18C:
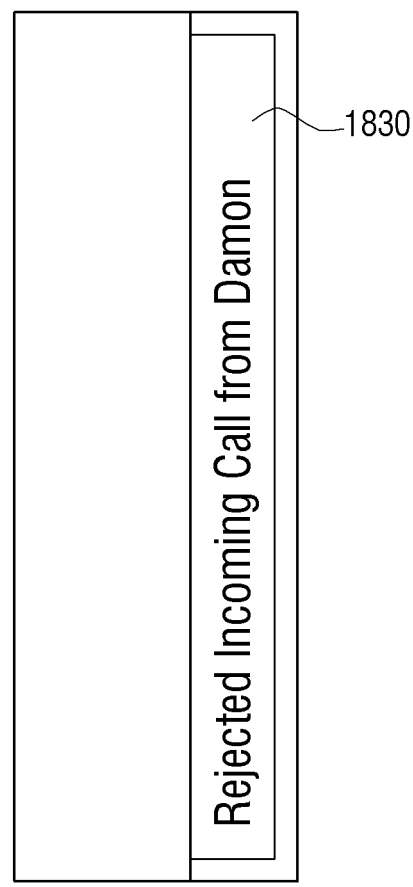
Figure 18D:
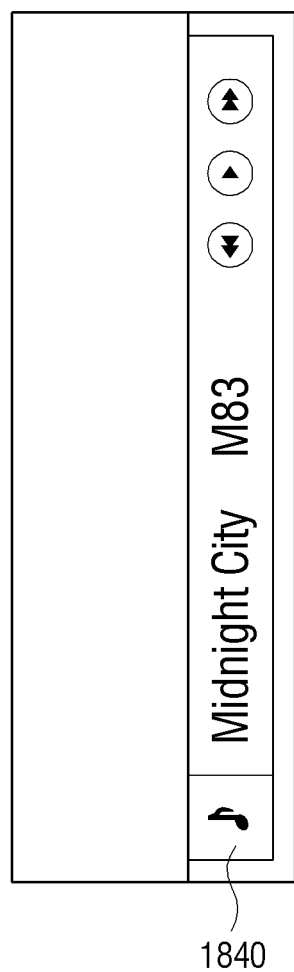
Figure 18E:
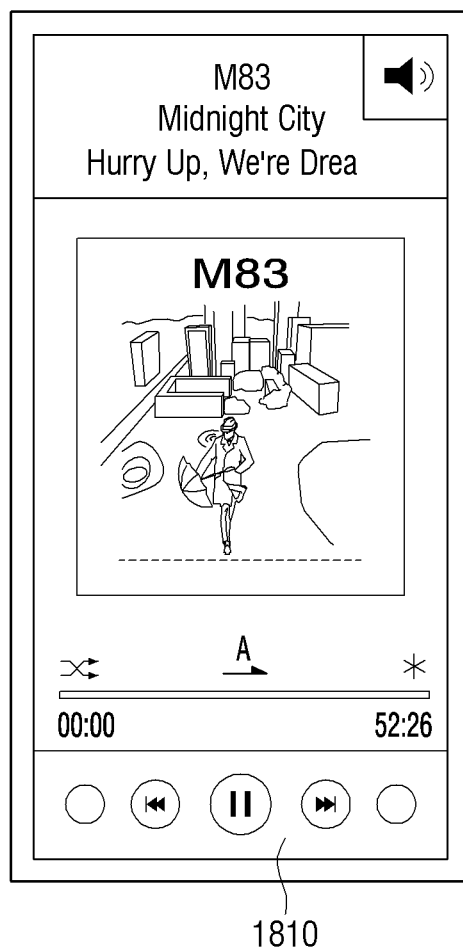

According to another exemplary embodiment, as illustrated in FIG. 18A, the controller 290 may control the display 230 to display an execution screen 1810 of a music application on full screen while the music application is executed. If a call request is received from outside, the controller 290 may control the display 230 to display a screen 1820 for confirming whether to accept the call request as illustrated in FIG. 18B. If a folding interaction of folding the display 230 is detected while the screen 1820 for confirming whether to accept the call request is displayed, the controller 290 may control the display 230 to display a UI 1830 informing that a call request is rejected on the exposure area as illustrated in FIG. 18C. When the telephone call is completed, the controller 290 may control the display 230 to display a UI 1840 corresponding to the music application on the exposure area as illustrated in FIG. 18D. Subsequently, if an unfolding interaction of unfolding the display 230 is detected again, the controller 290 may control the display 230 to display the execution screen 1810 of the music application on full screen as illustrated in FIG. 18E.

The controller 290 may determine a display area which can be watched by a user according to a hinge angle of the display 230, and control the display 230 to display a screen including different amount of information on the determined display area. In this case, the hinge angle of the display 230 may be matched with the watchable display area and then stored.

Figure 19A:
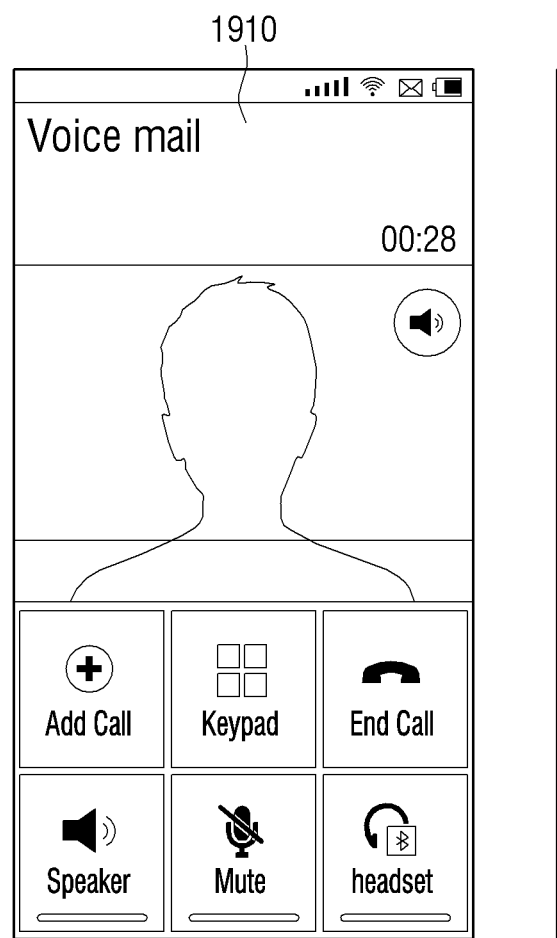

According to an exemplary embodiment, if the display 230 is unfolded while a telephone call is performed, the controller 290 may control the display 230 to display a first telephone call screen 1910 on full screen as illustrated in FIG. 19A.

Figure 19B:
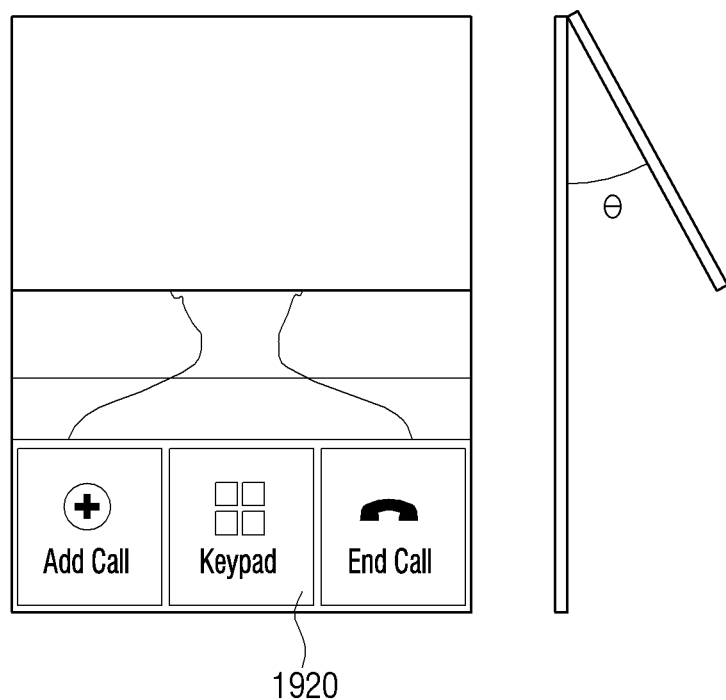

If a hinge angle of the display 230 is folded as much as θ while a telephone call is performed, the controller 290 may determine a display area corresponding to the hinge angle, and as illustrated in FIG. 19B, may control the display 230 to display a second telephone call screen 1920 on the determined display area. In this case, the second telephone call screen 1920 may include the amount of information and icons which are smaller than those included in the first telephone call screen 1910.

Figure 19C:
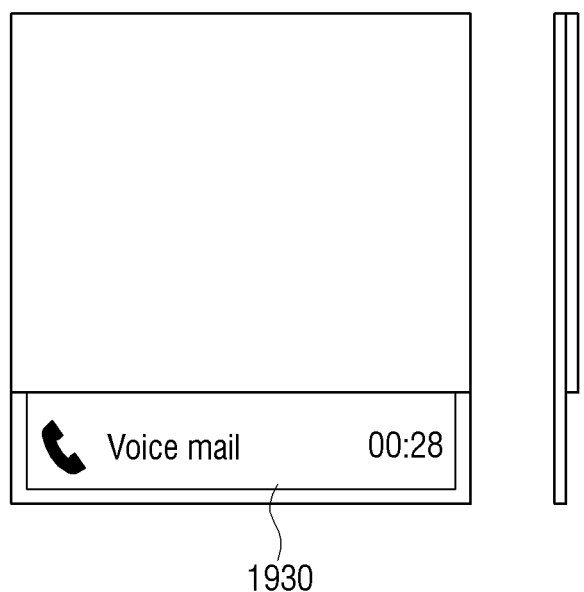

In addition, if the display 230 is folded while a telephone call is performed, the controller 290 may control the display 230 to display a UI 1930 informing that a telephone call is being performed on the exposure area as illustrated in FIG. 19C.

Figure 20A:
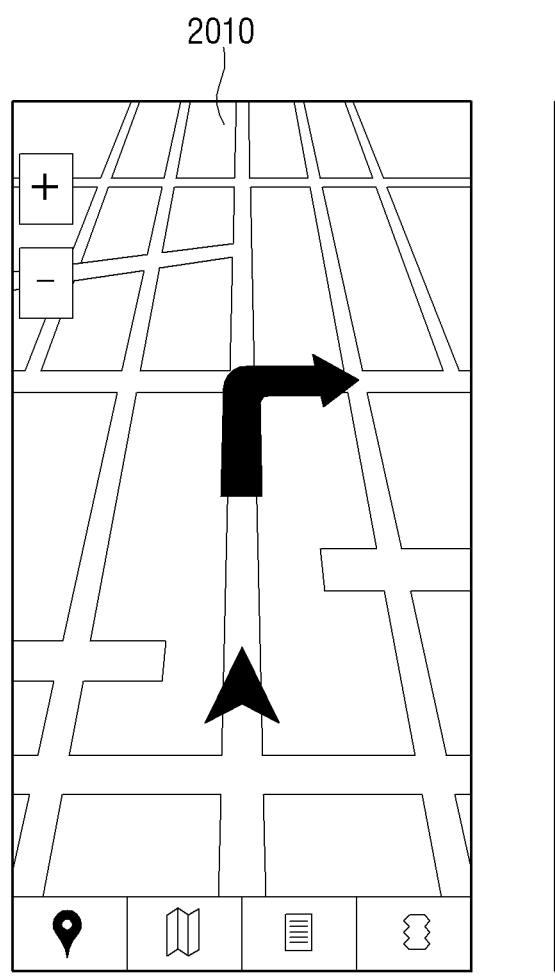

According to another exemplary embodiment, if the display 230 is unfolded while a navigation application is executed, the controller 290 may control the display 230 to display a first navigation screen 2010 on full screen as illustrated in FIG. 20A.

Figure 20B:
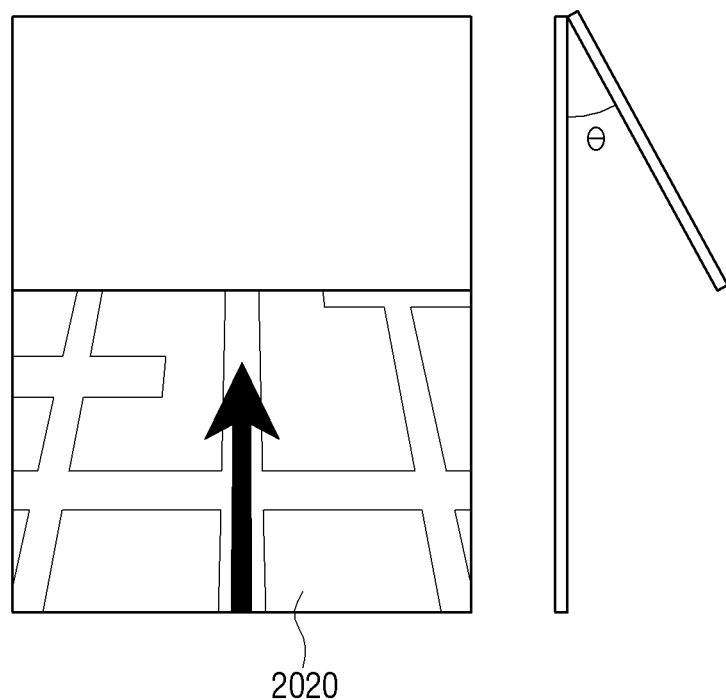

If a hinge angle of the display 230 is folded as much as θ while a navigation application is executed, the controller 290 may determine a display area corresponding to the hinge angle, and as illustrated in FIG. 20B, may control the display 230 to display a second navigation screen 2020 on the determined display area. In this case, the guiding area of the second navigation screen 2020 may smaller than the guiding area of the first navigation screen 2010.

Figure 20C:
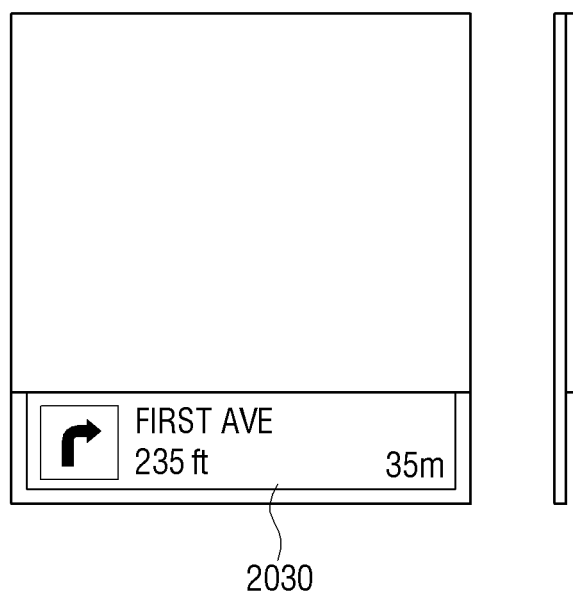

If the display 230 is folded while a navigation application is executed, the controller 290 may control the display 230 to display a third navigation screen 2030 on the exposure area as illustrated in FIG. 20C. In this case, the third navigation screen 2030 might include only direction information and distance information instead of a map screen included in the first navigation screen 2010 and the second navigation screen 2020. However, a map screen may also be included on the exposure area in third navigation screen 2030.

Whenever a folding interaction or an unfolding interaction is detected, the controller 290 may control the display 230 to reconfigure and display information such that the information corresponds to the size and direction of a screen.

Figure 21B:
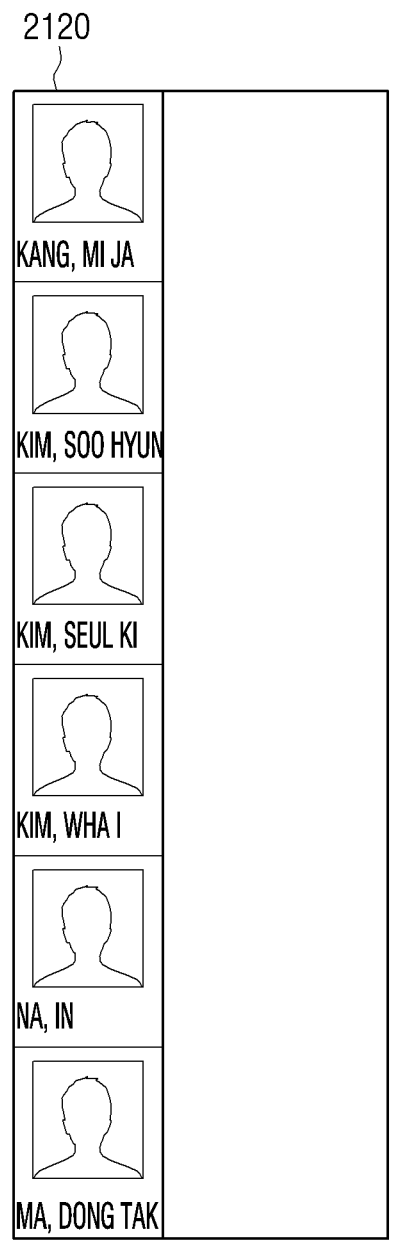

Specifically, as illustrated in FIG. 21A, if a folding interaction of folding the display 230 is detected while a first address book list 2110 is displayed on full screen, the controller 290 may control the display 230 to display a second address book list 2120 on the exposure area as illustrated in FIG. 21B. In this case, the first address book list 2110 might include user information such as image, name, telephone number, direct call icon, etc., and the second address book list 2120 might include user information such as image and name only, but the display is not limited to this.

Figure 22A:
Figure 22B:
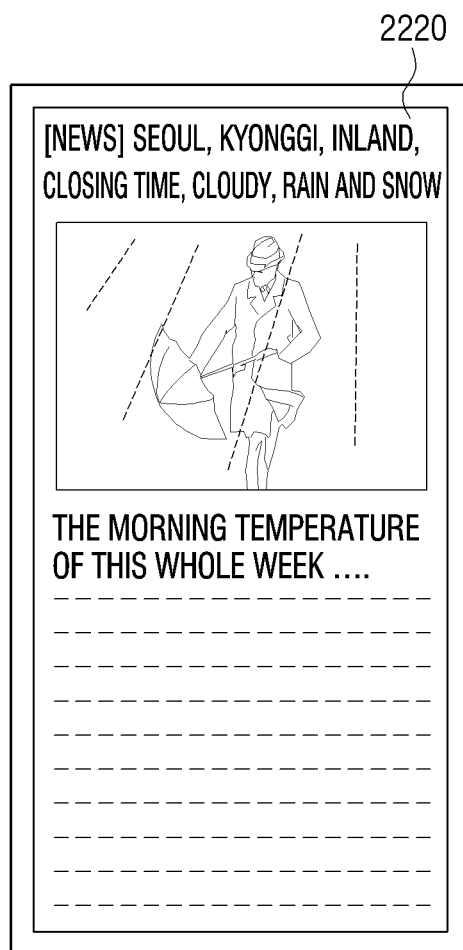

In addition, as illustrated in FIG. 22A, if an unfolding interaction of unfolding the display 230 is detected while a news title 2210 is displayed on the exposure area when the display 230 is folded, the controller 290 may control the display 230 to display a full screen 2220 including not only the news title but also the news image and the news text as illustrated in FIG. 22B.

Figure 23A:
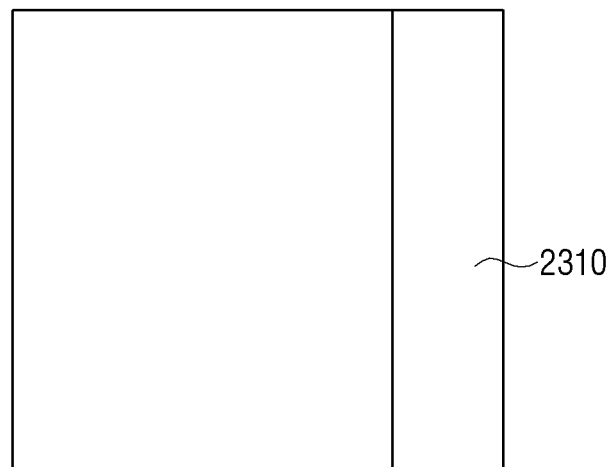
Figure 23A:
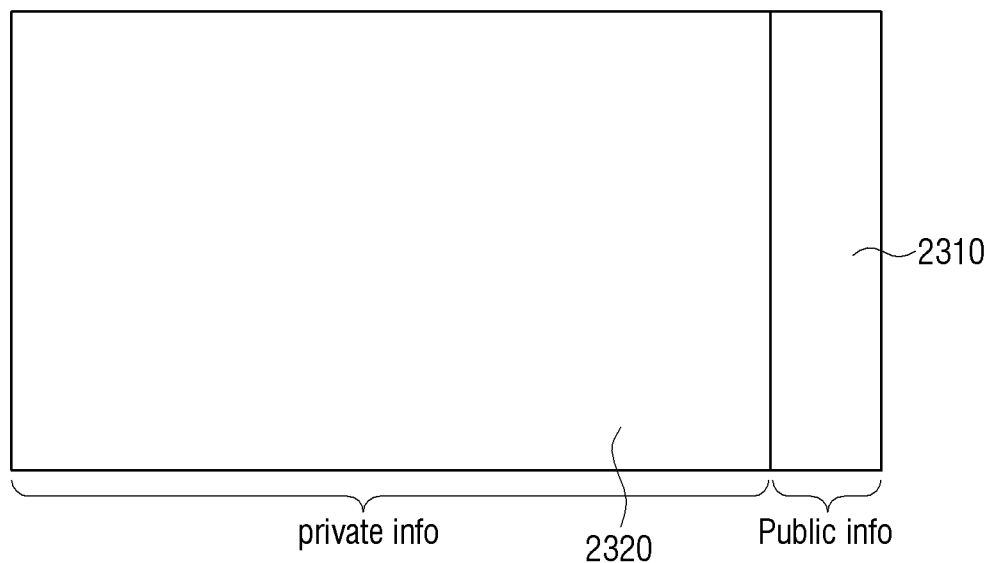
Figure 23B:
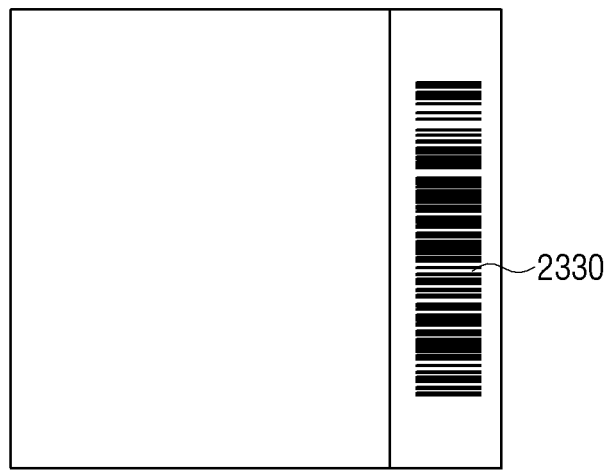
Figure 23B:
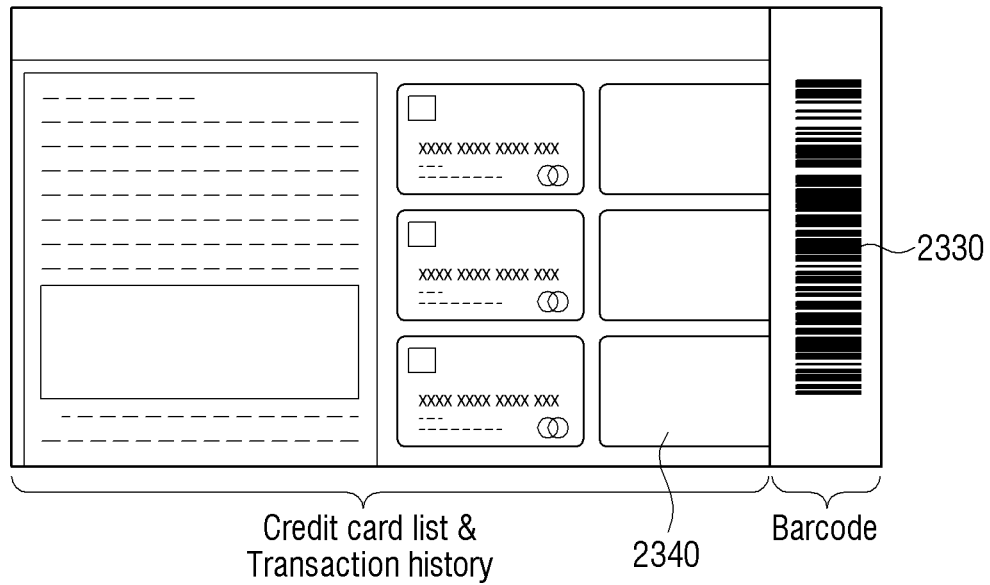

In addition, the controller 290 may control the display 230 to display different information on the exposure area and the hidden area when the display 230 is folded. In this case, as illustrated in FIG. 23A, the controller 290 may control the display 230 to display public information on an exposure area 2310 and private information on a hidden area 2320. For example, as illustrated in FIG. 23B, the controller 290 may control the display 230 to display barcode information which is public information on the exposure area 2330, and credit card list and transaction information which is private information on the hidden area 2340.

Figure 24:
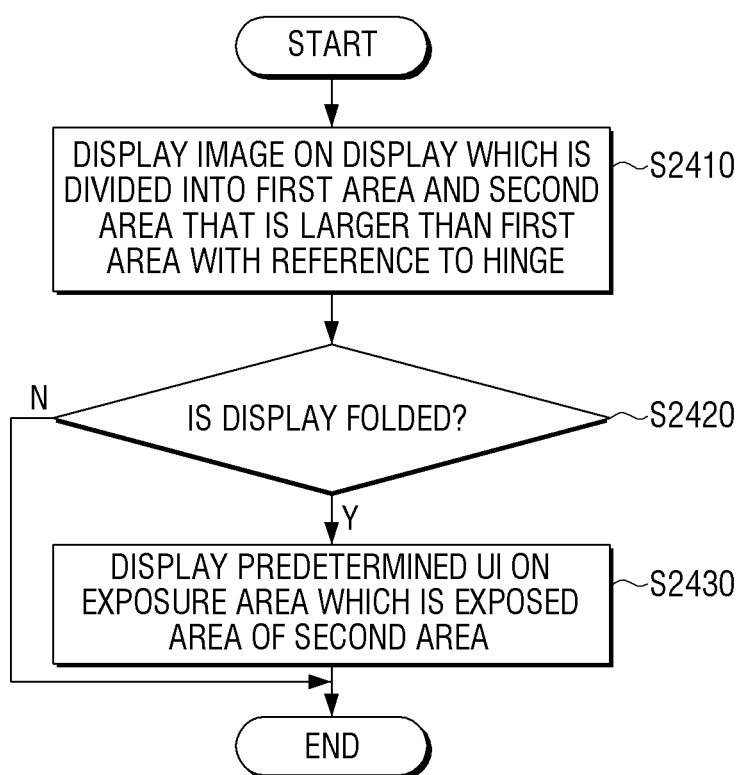
FIG. 24 is a flowchart illustrating a display method of a user terminal device according to an exemplary embodiment.

Hereinafter, a displaying method of the user terminal device 200 according to an exemplary embodiment will be described with reference to FIG. 24.

Specifically, the user terminal device 200 displays an image on the display 230 which is divided into a first area and a second area which is larger than the first area with reference to a hinge or folding line (S2410).

The user terminal device 200 determines whether the display 230 is folded or not (S2420).

If the display 230 is folded (S2420-Y), the user terminal device 200 displays a predetermined UI on the exposure area which is an exposed part of the second area (S2430). In this case, the predetermined UI may include a UI including state information of the user terminal device 200 and a UI for controlling the user terminal device 200.

As described above, a UI is displayed on the exposure area which is exposed to outside when the display 230 is folded and thus, a user may perform various functions of the user terminal device through the UI displayed on the exposure area and receive various information even if the display is folded.

<Interaction Method Based on a Folding State>

Figure 47:
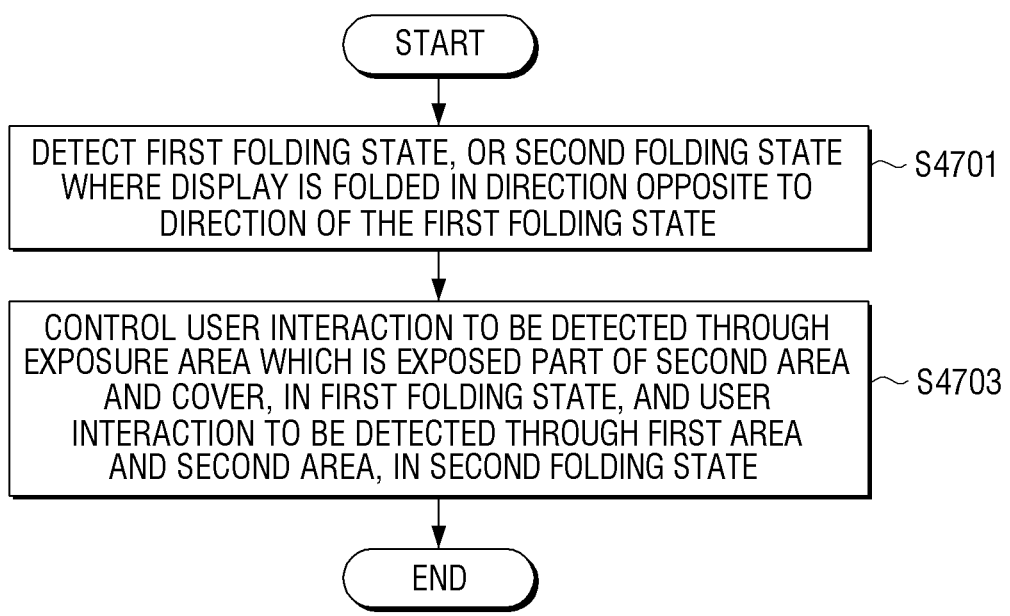
FIG. 47 is a flowchart illustrating a process of processing an interaction based on a folding state of a user terminal device.

FIGS. 25A to 25D are views provided to explain an interaction method based on a folding state of a user terminal device, and FIG. 47 is a flowchart illustrating a process of treating an interaction based on a folding state of a user terminal device.

Figure 25A:
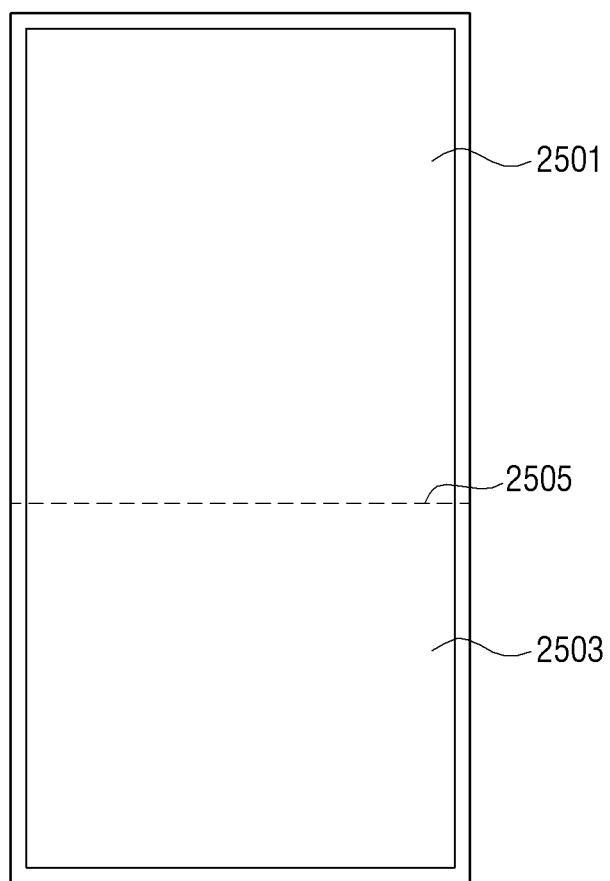
FIGS. 25A to 25D are views illustrating an interaction method based on a folding state of a user terminal device according to one or more exemplary embodiments.

Referring to FIG. 25A, a user terminal device 200 may include a display 230 divided into a first area 2503 and a second area 2501 which is larger than the first area 2503, a cover 2509 (illustrated in FIG. 25B) which is disposed on the rear side of the display 230, a detector 280 which detects a user interaction on the display 230 and the cover 2509, a controller which, if the display is folded such that the first area 2503 and the second area 2501 face each other with reference to the folding line 2505, controls the detector to detect a user interaction through an exposure area 2507 (FIG. 25B) which is an exposed part of the second area 2501, and the cover 2509, and, if the display is folded such that the back covers face each other with reference to the folding line, controls the detector to detect a user interaction through both the first area and the second area.

The user terminal device 200 may detect a first folding state of the display 230 and a second folding state where the display is folded in an opposite direction to the first folding state (S4701, FIG. 47).

The user terminal device 200 may, in the first folding state (FIG. 25B), enable a user interaction to be detected through an exposure area 2507, which is an exposed part of the second area 2501, and the cover 2509, and, in the second folding state (FIGS. 25C and 25D), enable a user interaction to be detected through the first area 2503 and the second area 2501 (S4703).

The display 230 of the user terminal device 200 may include a folding state and an unfolding state. A screen may be displayed on the display 230. The display may include a folding line 2505. The folding line 2505 may be an imaginary line or a line which is generated on the display 230, and the display 230 may be folded with reference to the folding line 2505.

The display 230 may be divided into a first area 2503 and a second area 2501 with reference to a folding line. The second area 2501 may be larger in size and area than the first area 2503.

Figure 25B:
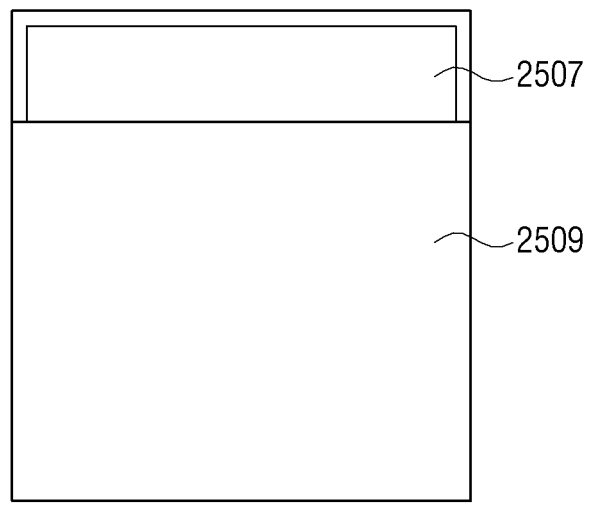

A cover 2509 may be disposed on the rear side of the display 230. FIG. 25B illustrates a cover 2509. The cover may include a touch sensor. The cover 2509 may detect a user interaction through the touch sensor.

The display 230 may be folded in a first folding state or a second folding state. The first folding state refers to a state where the displays are folded such that first area and the second area face each other.

Referring to FIG. 25B, the display is folded in the first folding state. In the first folding state, a user interaction may be detected through an exposure area 2507 which is an exposed part of the second area, and the cover 2509. That is, when the display is folded such that the first area 2503 and the second area 2501 face each other, a portion 2507 of the second area may be exposed to outside.

The second folding state may be a state where the display 230 is folded in an opposite direction to a direction where the display is folded in the first folding state. In the second folding state, the display may be folded such that the covers disposed on the rear side of the display unit 230 face each other. Also, in the second folding state, the display 230 may be folded such that the first area 2503 and the second area 2501 are headed in opposite directions with respect to each other.

Figure 25C:
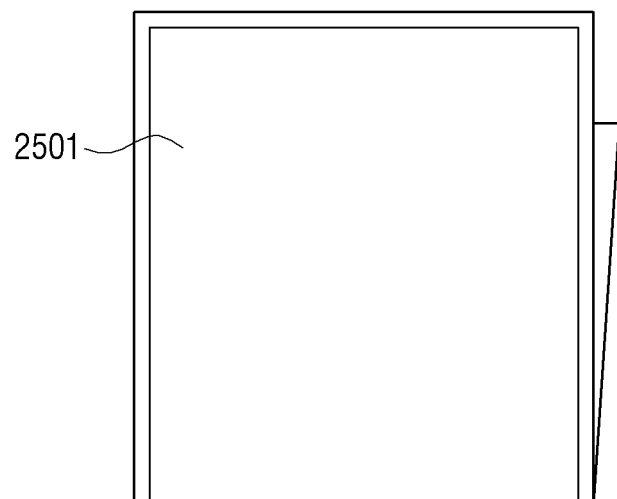
Figure 25D:
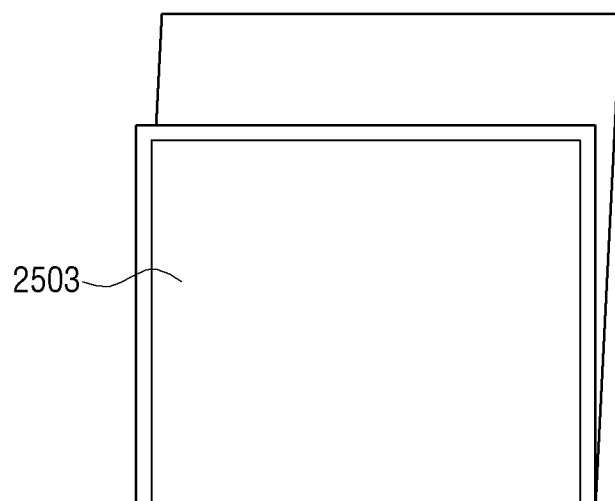

FIGS. 25C and 25D illustrate the display 230 which is folded in the second folding state. In the second folding state, the first area 2503 and the second area 2501 of the display 230 may be exposed to the outside. Also, in the second folding state, a user interaction may be detected through the first area 2503 and the second area 2501 of the display 230.

Also, in the second folding state, a user interaction might not be detected areas except for the first area 2503 and the second area 2501. That is, in the second folding state, a user interaction may be detected on the first area 2503 and the second area 2501 but might not be detected on the cover 2509 disposed on the rear side of the display 230.

User Terminal Device

Figure 26A:
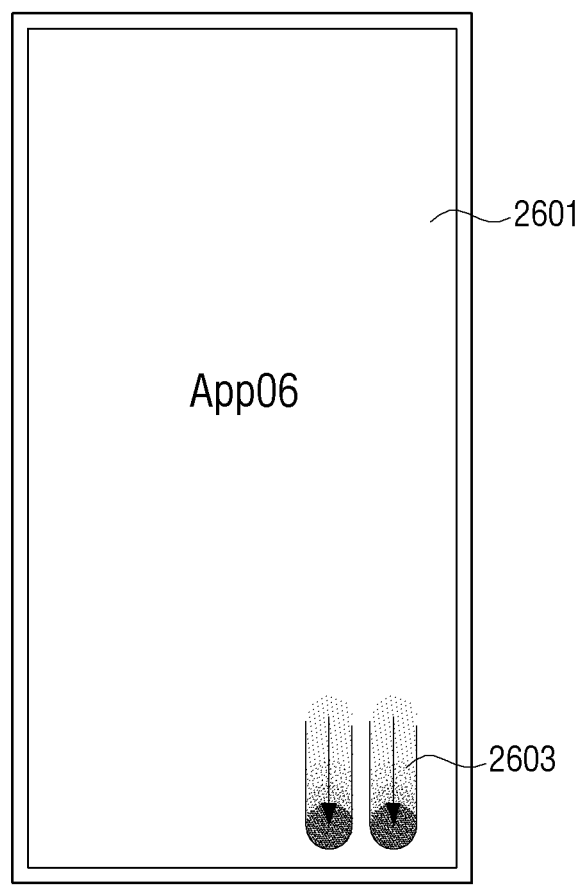
FIGS. 26A to 26C are views illustrating that a user interaction is detected on a cover while a display of the user terminal device is unfolded, and a screen corresponding to the user interaction is displayed, according to one or more exemplary embodiments.
Figure 26B:
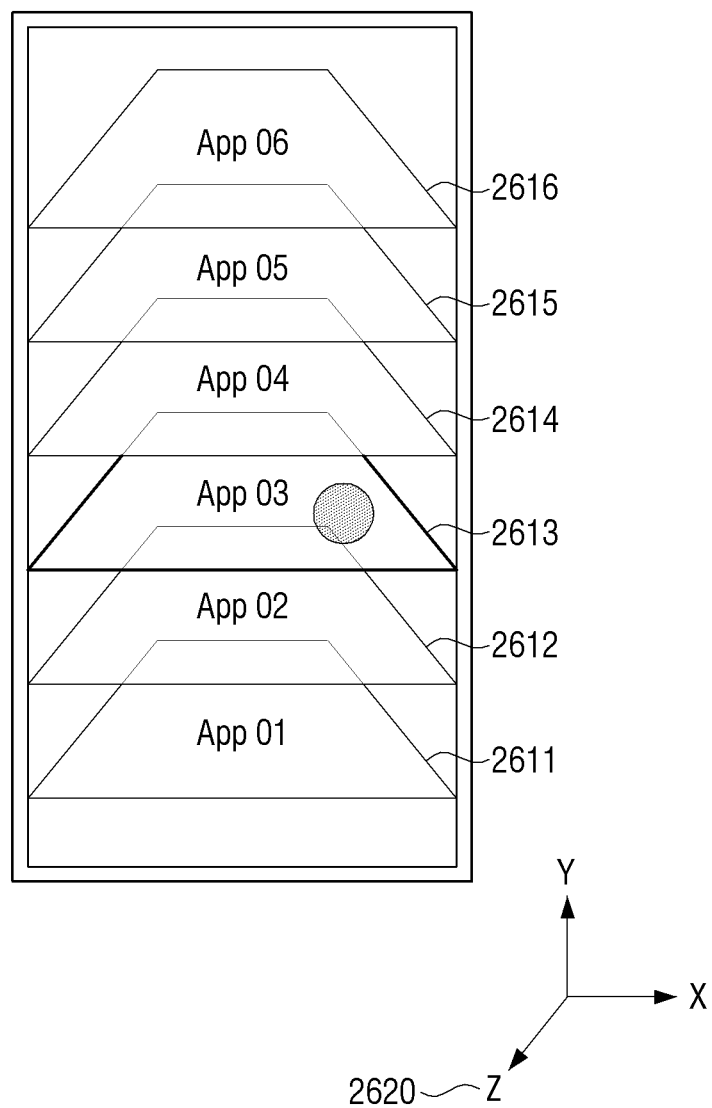
Figure 26C:
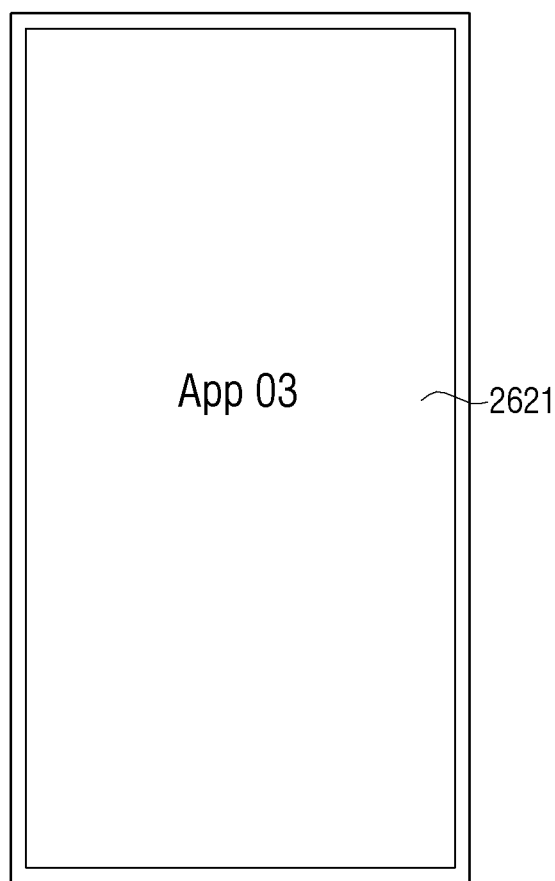
Figure 48:
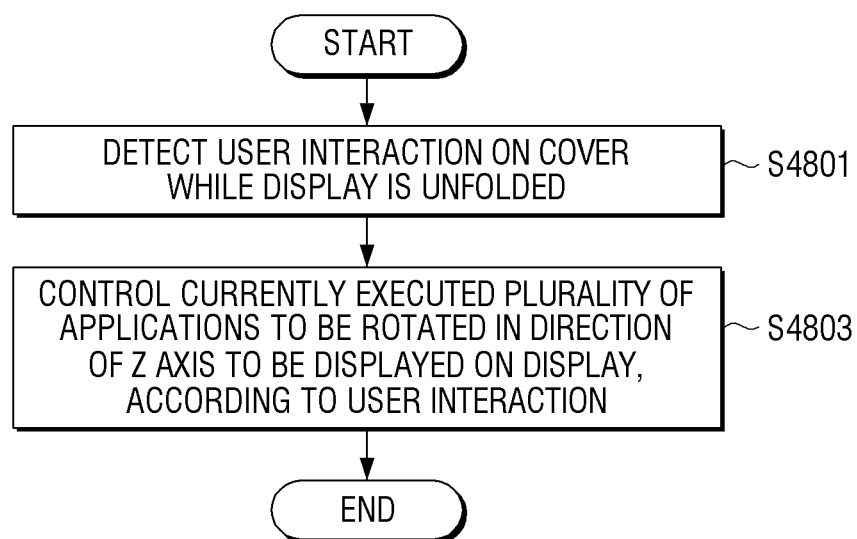
FIG. 48 is a flowchart illustrating a process performed, when a user interaction is detected on a cover while a display of a user terminal device is unfolded according to various exemplary embodiments.

FIGS. 26A to 26C are views illustrating an exemplary embodiment where a user interaction is detected on the back cover while the display 230 of the user terminal device is unfolded, and a screen corresponding to the interaction is displayed on the display. FIG. 48 is a flowchart illustrating a process performed when a user interaction is detected while the display 230 of the user terminal device 200 is unfolded.

FIG. 26A illustrates that an application 2601 being executed when the display 230 is unfolded is displayed. The controller 290 may control the display 230 to display the application being executed. A plurality of applications may be executed in the user terminal device 200, and at least one of the plurality of applications may be displayed on the display 230.

FIG. 48 illustrates that, if a plurality of applications are executed in the user terminal device 200, and if a user interaction is detected on the cover disposed on the rear side of the display 230 while the display 230 is unfolded (S4801, FIG. 48), the user terminal device 200 may control the currently executed plurality of applications to be rotated in a direction of a Z axis based on the user interaction to be displayed on the display 230 (S4803).

The user interaction may be detected on the cover disposed on the rear side of the display 230. The user interaction may be detected on the display 230.

FIG. 26B illustrates that, a plurality of applications 2611, 2612, 2613, 2614, 2615, 2616 may be displayed on the display 230. If a user interaction 2603 is detected on the cover, while one application 2601 among currently executed applications is displayed when the display is unfolded as shown in FIG. 26A, a plurality of applications 2611, 2612, 2613, 2614, 2615, 2616 may be displayed on the display as illustrated in FIG. 26B. Here, the plurality of applications 2611, 2612, 2613, 2614, 2615, 2616 may be applications which are being executed in the user terminal device 200. The plurality of applications 2611, 2612, 2613, 2614, 2615, 2616 being executed in the user terminal device may be rotated in a direction of Z axis 2620 and be displayed on the display 230.

The plurality of applications 2611, 2612, 2613, 2614, 2615, and 2616 being executed in a user terminal device 200 may be displayed to be in a trapezoid shape and may be seen as a three-dimensional structure. A Z-axis direction 2620 may be a direction perpendicular to the surface of the display.

If the plurality of applications 2611, 2612, 2613, 2614, 2615, 2616 are displayed on the display 230, and a user selects any one of the applications by interacting with the cover or the display, the selected application may be displayed on the display 230.

FIG. 26C illustrates that one application 2621 selected from among the plurality of applications 2611, 2612, 2613, 2614, 2615, 2616 are displayed on the display.

If the plurality of applications 2611, 2612, 2613, 2614, 2615, and 2616 are displayed on the display, and a user interaction of selecting one of the plurality of applications is detected, the controller 290 may control the display 230 to display one application on the display, in response to the user interaction.

Figure 49:
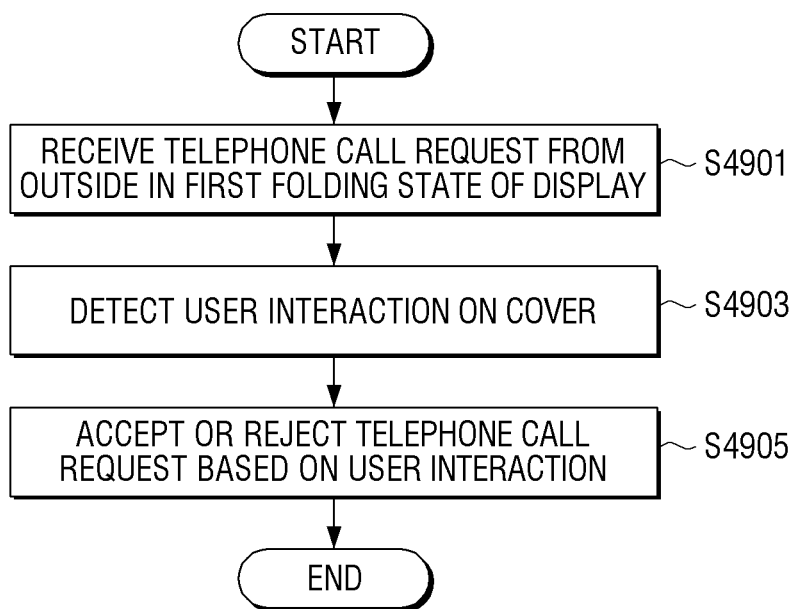
FIG. 49 is a flowchart illustrating a process performed, when a telephone call request is received while a display of a user terminal device is in a first folding state, according to various exemplary embodiments.

FIGS. 27A to 28B are views illustrating one or more exemplary embodiments that if a telephone call request is received in a first folding state, possibilities of action are displayed on an exposure area, and FIG. 49 is a flowchart illustrating a process performed when a telephone call request is received while a display of a user terminal device is in a first folding state.

Figure 27A:
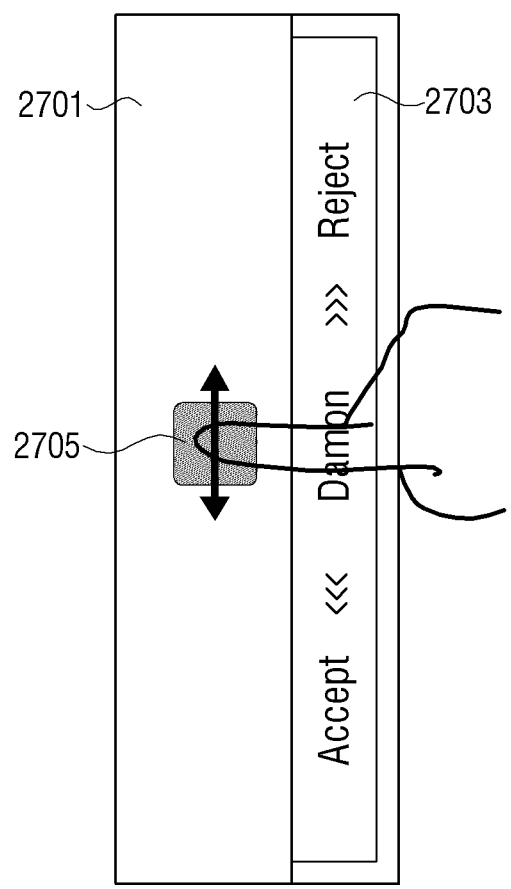
FIGS. 27A to 28B are views illustrating that, if a telephone call request is received in a first folding state of a display of a user terminal device, possibilities of action are displayed on an exposure area, according to various exemplary embodiments.

FIG. 27A illustrates that the display 230 is folded in a vertical direction and in a first folding state. In the first folding state, the second area of the display 230 is covered with a cover 2701. If the user terminal device 200 receives a call request from outside while the display is in the first folding state (S4901, FIG. 49), the controller 290 may control the display 230 to display a UI informing that a call request is received from outside, on an exposure area 2703 which is an exposed part of the second area.

The detector 280 may detect a user interaction 2705 on the cover (S4903, FIG. 49) and output an electronic signal. The controller 290 may accept or reject a telephone call request according to the user interaction, e.g., swiping right or swiping left (S4905, FIG. 49). Specifically, the controller 290 may accept or rejection a telephone call request according to an electronic signal outputted from the detector 280.

The user interaction 2705 may be a dragging gesture or a flicking gesture. A UI displayed on an exposure area 2703 may be a list of possible actions which indicate a user interaction's direction.

For example, as illustrated in FIG. 27A, if a telephone call request is received while the display 230 of the user terminal device 200 is folded in a first folding state, a UI of 'Accept' or 'Reject' of the telephone call request may be displayed on an exposure area 2703. If a user brings his finger into contact with a cover 2701 and drags in an 'Accept' direction, the call request is accepted, and if a user brings his finger into contact with a cover 2701 and drags in a 'Reject' direction, the call request may be rejected.

Figure 27B:
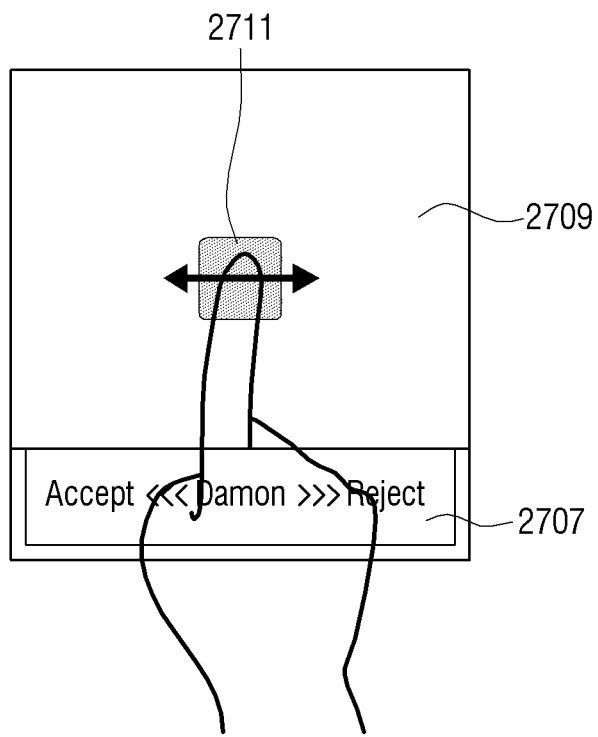

FIG. 27B illustrates that the display 230 is folded in a lateral direction and in a first folding state. In the first folding state, the second area of the display 230 is covered with the cover 2709. If the user terminal device 200 receives a call request from outside while the display 230 is in the first folding state (S4901, FIG. 49), the controller 290 may display the display 230 to display a UI informing that the telephone call request is being received from outside, on an exposure area 2707, which is an exposed portion of the second area.

The detector 280 may detect a user interaction 2711 on the cover 2709 (S4903) and output an electronic signal. The controller 290 may accept or reject a telephone call request according to the user interaction (S4905, FIG. 49). Specifically, the controller 290 may accept or reject a telephone call request according to an electronic signal outputted from the detector 280.

The user interaction 2711 may be a dragging gesture or a flicking gesture. A UI displayed on an exposure area 2707 may be an affordance which indicates a user interaction's direction.

For example, if a telephone call request is received while the display 230 of the user terminal device 200 is folded in a first folding state, a UI of 'Accept' or 'Reject' of a telephone call request may be displayed on an exposure area 2707. If a user brings his finger into contact with a cover 2709 and drags in a 'Reject' direction, the call request is accepted, and if a user brings his finger into contact with a cover 2709 and drags in an 'Accept' direction, the call request is rejected.

Figure 28A:
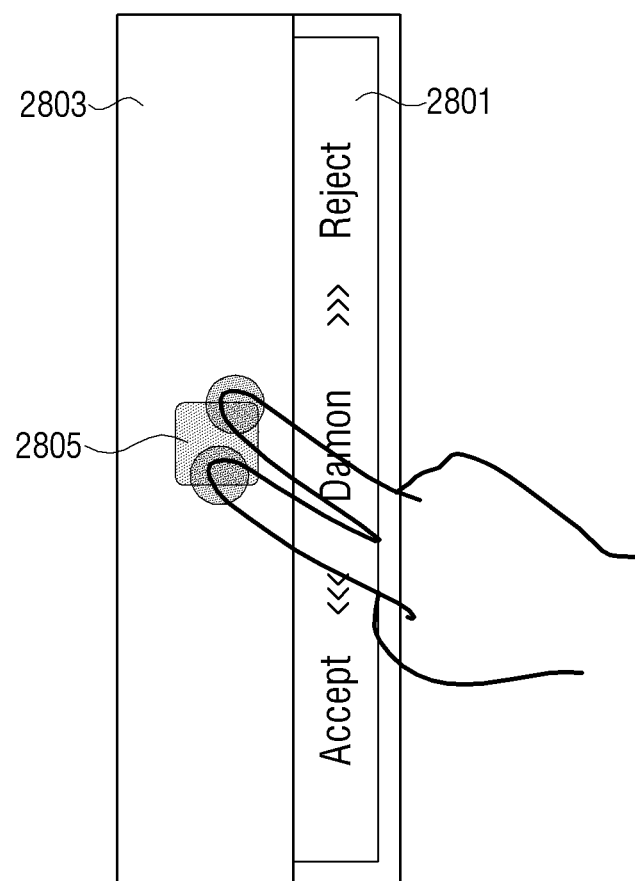

FIG. 28A illustrates that the display 230 is folded in a vertical direction and in a first folding state. In the first folding state, the second area of the display 230 is covered with a cover 2803. If a user terminal device 200 receives a telephone call request from outside while the display 230 is in a first folding state (S4901, FIG. 49), the controller 290 may the display 230 to display an UI informing that the telephone call request is received from outside, on an exposure area 2801 which is an exposed part of the second area.

The detector 280 may detect a user interaction 2805 on the cover 2803 (S4903) and output an electronic signal. The controller 290 may accept or reject a telephone call request according to the user interaction 2805 (S4905). Specifically, the controller 290 may accept or reject the telephone call request based on an electronic signal outputted from the detector.

The user interaction 2805 may be a tapping gesture. The user interaction 2805 may be a knocking gesture of knocking lightly on the user terminal device 200. A UI displayed on an exposure area 2801 may be a list of possible actions which indicates a user interaction's direction For example, if a telephone call request is received while the display of the user terminal device 200 is folded in a first folding state, a UI of 'Accept' or 'Reject' of the call request may be displayed on an exposure area 2801. If a user brings his finger into contact with a cover 2803 and drags in an 'Accept' direction, the call request is accepted, and if a user brings his finger into contact with a cover 2803 and drag in a 'Reject' direction, the call request is rejected.

Figure 28B:
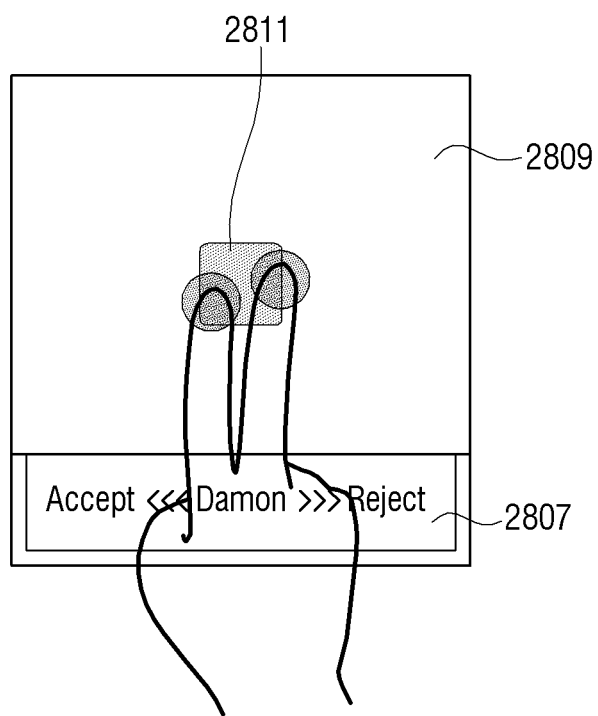

FIG. 28B illustrates that the display is folded in a lateral direction and in a first folding state. In the first folding state, the second area of the display 230 is covered with the cover 2809. If the user terminal device 200 receives a telephone call request from outside while the display 230 is in a first folding state (S4901, FIG. 49), the controller 290 may the display 230 to display an UI informing that the telephone call request is received from outside, on an exposure area 2807 which is an exposed part of the second area.

The detector 280 may detect a user interaction 2811 on the cover 2809 (S4903) and output electronic signal. The controller 290 may accept or reject a telephone call request according to the user interaction (S4905). Specifically, the controller 290 may accept or reject the telephone call request according to an electronic signal outputted from the detector 280.

The user interaction 2811 may be a tapping gesture. The user interaction 2811 may be a knocking gesture of knocking lightly on the user terminal device 200. A UI displayed on an exposure area 2807 may be an affordance which indicates a user interaction's direction.

For example, if a telephone call request is received while the display 230 of the user terminal device 200 is folded in a first folding state, a UI of 'Accept' or 'Reject' of the call request may be displayed on an exposure area 2807. If a user brings his finger into contact with a cover 2809 and drags in an 'Accept' direction, the call request may be accepted, and if a user brings his finger into contact with a cover 2809 and drag in a 'Reject' direction, the call request may be rejected.

Figure 50:
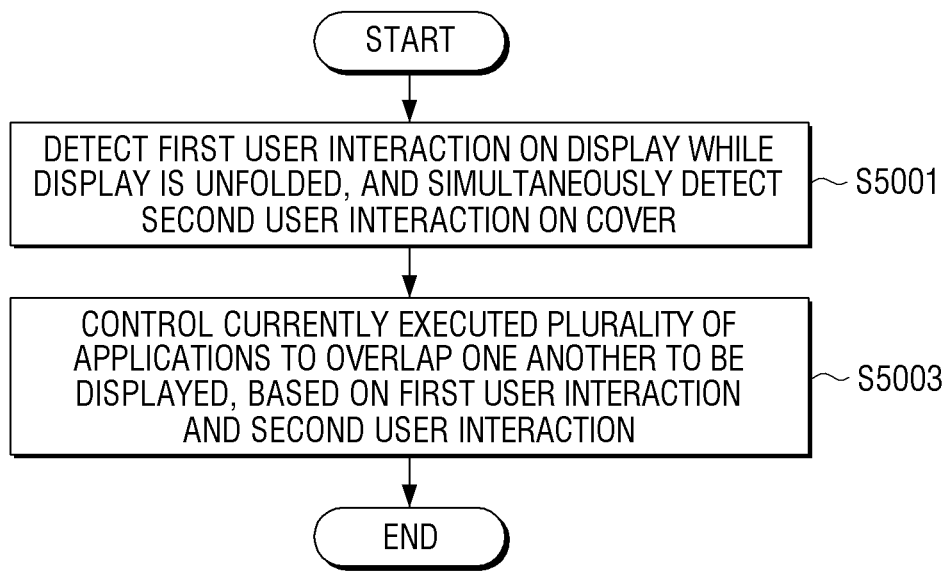
FIG. 50 is a flowchart illustrating a process performed, when a user interaction is detected simultaneously on a display and a cover while a display of a user terminal device is unfolded, according to various exemplary embodiments.

FIGS. 29A to 30B are views illustrating one or more exemplary embodiments where a user interaction is detected simultaneously on a display 2901 and a back cover while the display 2901 of the user terminal device 200 is unfolded, and a plurality of applications being executed are displayed on the display, and FIG. 50 is a flowchart illustrating a process performed if a user interaction is detected simultaneously on the display 2901 and a back cover while the display 2901 of the display 200 is unfolded.

Figure 29A:
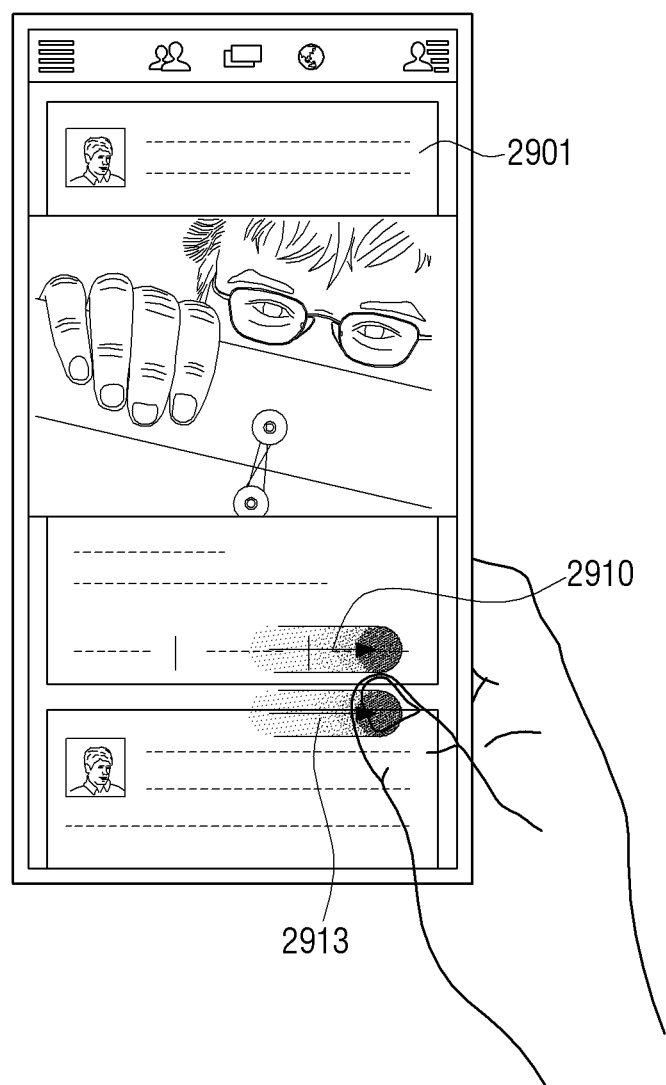
FIGS. 29A to 30B are views illustrating that a user interaction is detected simultaneously on a display and a cover while a display of a user terminal device is unfolded, and an application which is being executed is displayed on a display, according to various exemplary embodiments.

FIG. 29A illustrates that the display is unfolded, and a currently executed application is displayed on the display 2901.

A plurality of applications may be executed on the user terminal device 200. While at least one application of the plurality of applications is displayed on the display 2901, the detector 280 may detect a first user interaction 2913 on the display 2901 and detect a second user interaction 2910 on a back cover simultaneously (S5001, FIG. 50).

Here, the term "simultaneously" may be interpreted to have an overlapping section in terms of time, and the start of a first time section and the start of a second time section do not necessarily have to coincide.

The first user interaction 2913 and the second user interaction 2910 may be a dragging gesture. Also, the first user interaction 2913 and the second user interaction 2910 may be a flicking gesture.

The first user interaction 2913 and the second user interaction 2910 may be in the same direction.

The detector 280 may detect the first user interaction 2913 on the display 2901, detect the second user interaction 2910 on the cover, and output an electronic signal. The controller may control a currently executed plurality of applications to overlap one another to be displayed on the display, according to the first user interaction and the second user interaction (S5003, FIG. 50).

Specifically, the controller 290 may control a currently executed plurality of applications to overlap one another to be displayed on the display 2901, based on electronic signal outputted from the detector 280.

Figure 29B:
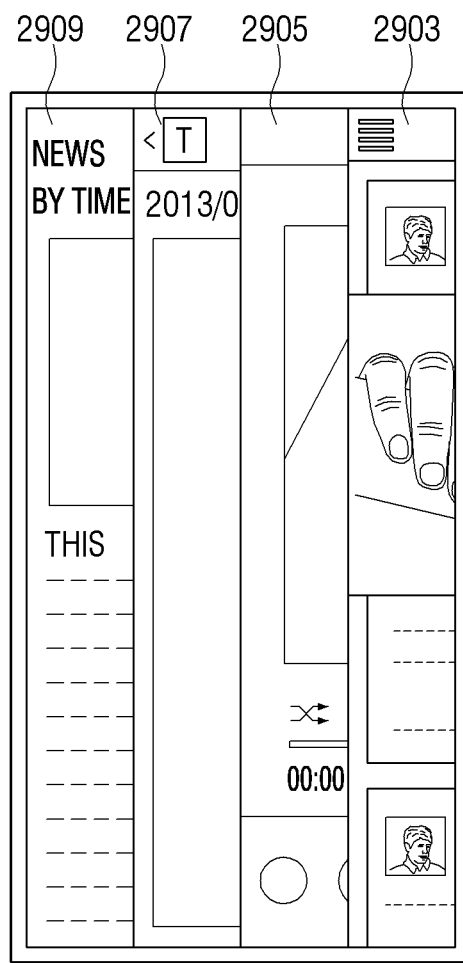

FIG. 29B illustrates that a currently executed plurality of applications 2903, 2905, 2907, 2909 are displayed on the display 2901. The plurality of applications 2903, 2905, 2907, 2909 overlap one another to be displayed. That is, the application 2907 may be over the application 2909 to overlap the application 2909, the application 2905 may be over the application 2907 to overlap the application 2907, and the application 2903 may be over the application 2905 to overlap the application 2905.

Figure 30A:
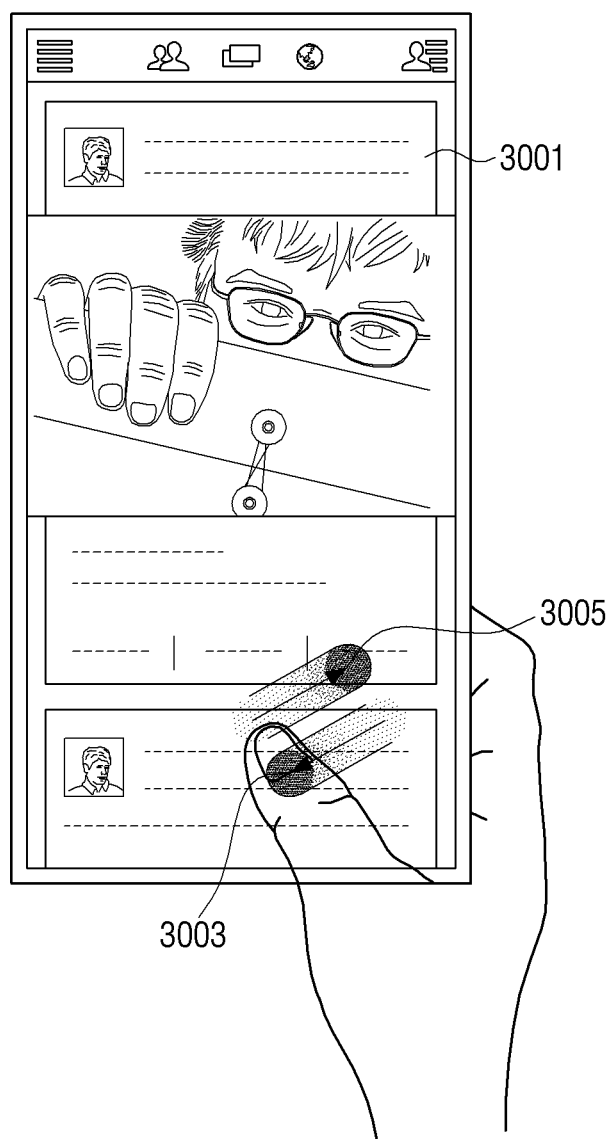

FIG. 30A illustrates that a display 3001 is unfolded, and currently executed applications are displayed on the display 3001.

A plurality of applications may be executed in a user terminal device. While one application of the plurality of applications is executed on the display 3001, the detector 280 may detect a first user interaction 3003 on the display 3001 and detect a second user interaction 3005 on a cover simultaneously (S5001).

Here, the term "simultaneously" may be interpreted to have an overlapping section in terms of time, and the start of a first time section and the start of a second time section do not necessarily have to coincide.

The first user interaction 3003 and the second user interaction 3005 may be a dragging gesture. Also, the first user interaction 3003 and the second user interaction 3005 may be a flicking gesture.

The first user interaction 3003 and the second user interaction 3005 may be in an opposite direction. The first user interaction 3003 and the second user interaction 3005 may each be in any direction.

The detector 280 may detect the first user interaction 3003 on the display 3001, detect the second user interaction 3005 on the cover, and output an electronic signal. The controller 290 may control a currently executed plurality of applications to overlap one another to be displayed on the display, according to the first user interaction and the second user interaction (S5003, FIG. 50).

Specifically, the controller 290 may control a currently executed plurality of applications to overlap one another to be displayed on a display 3001 according to the electronic signal outputted from the detector 280.

If a first interaction direction 3003 and a second interaction direction 3005 are headed in different directions, the plurality of applications may overlap one another by a predetermined angle to be displayed on the display 3001.

If a first interaction direction 3003 and a second interaction direction 3005 are headed in opposite directions, the plurality of applications may overlap one another by a predetermined angle to be displayed on the display 3001. The angle may also be set by a user.

Figure 30B:
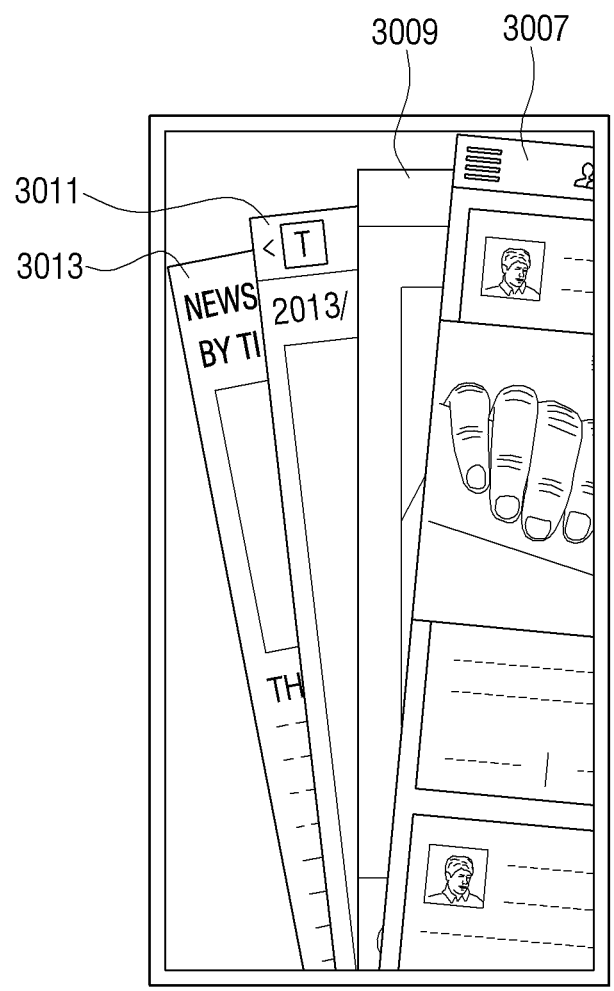

FIG. 30B illustrates that a currently executed plurality of applications 3007, 3009, 3011, and 3013 are displayed on a display 3001. The plurality of applications 3007, 3009, 3011, and 3013 overlap one another by a predetermined angle to be are displayed. That is, the application 3011 is over the application 3013 to be displayed to overlap with the application 3013, the application 3009 is over the application 3011 to be displayed to overlap with the application 3011, and the application 3007 is over the application 3009 to be displayed to overlap with the application 3009.

Figure 51:
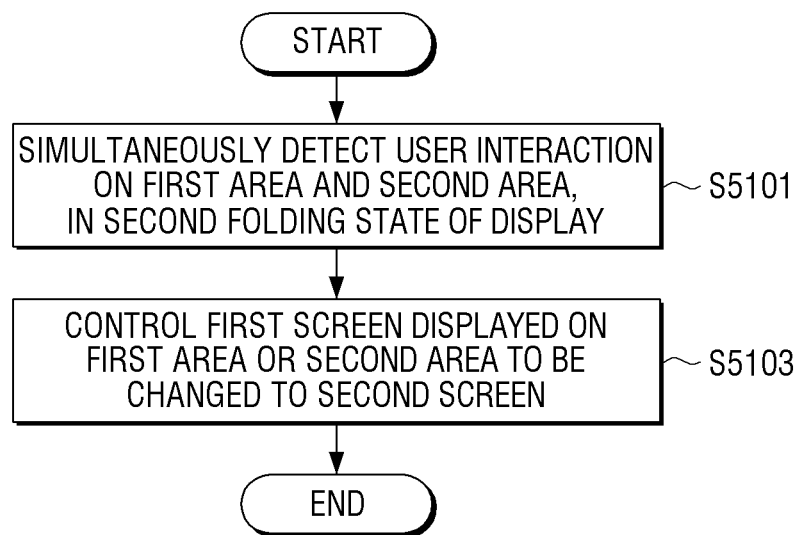
FIG. 51 is a flowchart illustrating a process performed, when a user interaction is detected simultaneously on a first area and a second area of a display while a display of a user terminal device is in a second folding state, according to various exemplary embodiments.

FIGS. 31A to 32C are drawings illustrating exemplary embodiments that user interactions are simultaneously detected on the display 230 on both first area and second area, while the display 230 is in the second folding state, and a second screen is displayed on the display 230. FIG. 51 is a flowchart illustrating a process performed when user interactions are detected simultaneously on the first and second areas of the display, while the display is folded in a second folding state.

Figure 31A:
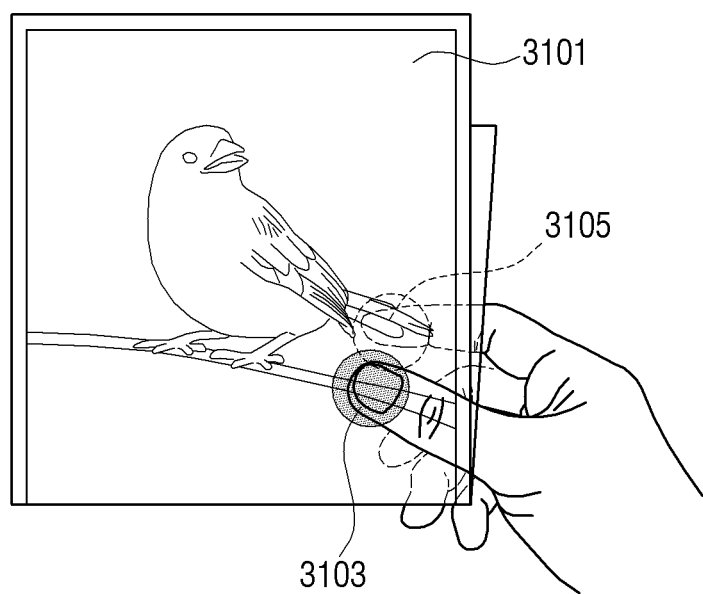
FIGS. 31A to 32C are views illustrating that a user interaction is detected on a first and a second area of a display while the display is in a second folding state, and a second screen is displayed on the display.

FIG. 31A illustrates that the display 230 is folded in a second folding state. The display 230 may be divided into a second area and a first area, and on the second area, a first screen 3101 may be displayed.

The controller 290 may detect user interactions 3105 and 3103 simultaneously on the first area and the second area in the second folding state of the display 230 (S5101), and control a first screen displayed on the first area or the second area to be changed to a second screen, in response to the user interaction 3105 and 3103 (S5103).

Here, the term "simultaneously" may be interpreted to have an overlapping section in terms of time, and the start of a first time section and the start of a second time section do not necessarily have to coincide.

The user interactions 3103 and 3105 may be a touching interaction. The second screen may be a screen which is included as a menu displayed on the first screen. Also, the second screen may be a personalized home screen. Also, the second screen may be a blank screen. The blank screen may be a screen in a state where a screen is turned off.

Figure 31B:
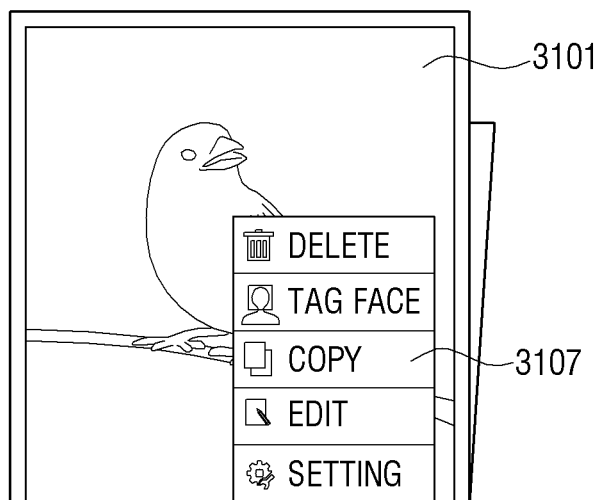

For example, as illustrated in FIG. 31B, if touch interactions 3103 and 3105 are detected simultaneously on the second area and the first area in a second folding state, the controller 290 may control a currently displayed first screen 3101 to be changed to a second screen which includes a menu screen 3107 regarding the first screen 3101.

FIG. 31B illustrates that a second screen is displayed. The second screen may include a first screen and a menu 3107 regarding the first screen 3101. The menu 3107 may be associated with the first screen.

Figure 31C:
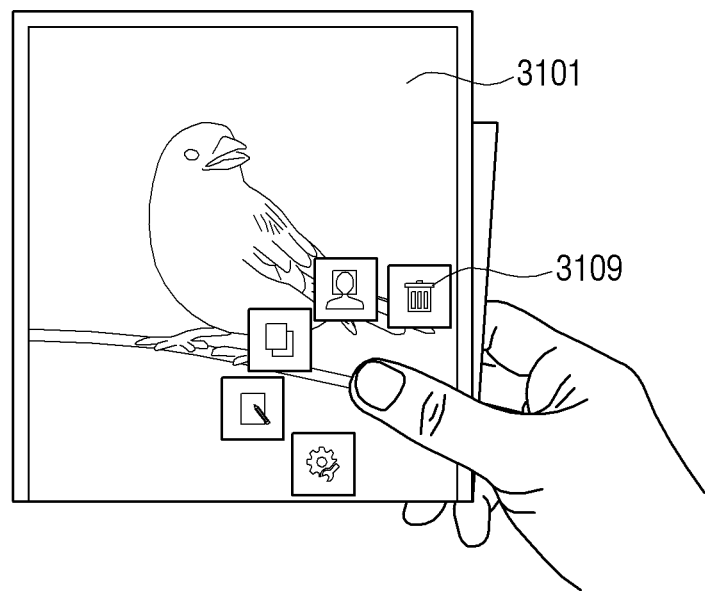

FIG. 31C illustrates that a second screen which includes another form of menus 3109 is included in a first screen 3101.

Figure 32A:
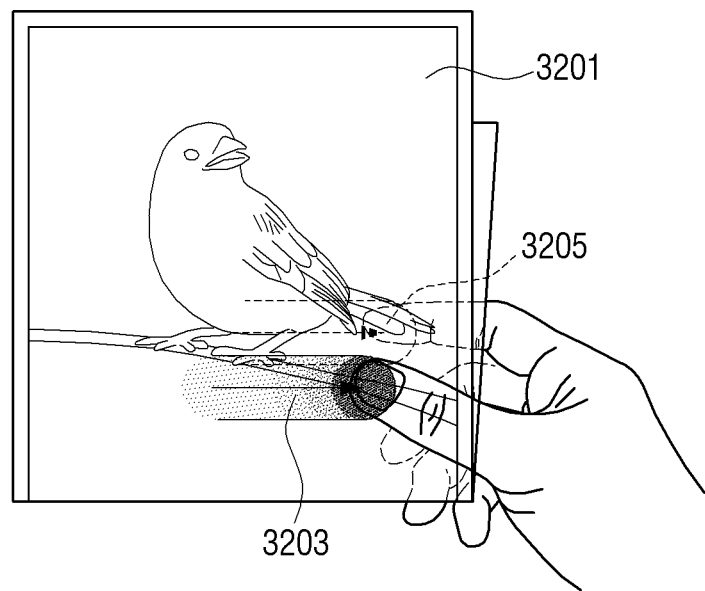

FIG. 32A illustrates that the display 230 is folded in a second folding state. The display 230 may be divided into the second area and the first area, and in the second area, the first screen 3101 may be displayed.

The controller 290 may detect the user interactions 3205 and 3203 simultaneously on the first area and the second area (S5101, FIG. 51) in a second folding state of the display 230, and control a first screen displayed on the first area or the second area to be changed to a second screen, in response to the user interactions 3205 and 3203 (S5103, FIG. 51).

Here, the term "simultaneously" may be interpreted to have an overlapping section in terms of time, and the start of a first time section and the start of a second time section do not necessarily have to coincide.

The user interactions 3205 and 3203 may be a dragging gesture. Also, the user interactions 3205 and 3203 may be a flicking gesture.

Figure 32B:
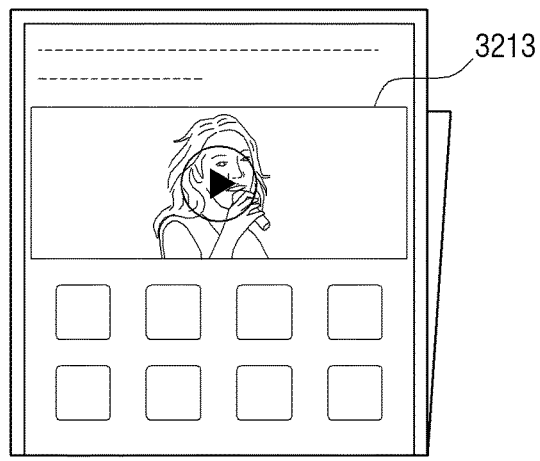

For example, as illustrated in FIG. 32B, if touch interactions 3203 and 3205 are detected simultaneously on the second area and the first area of the display, and while the display 230 is in the second folding state, an application execution screen of the display 230 is displayed, the controller 290 may change an application execution screen 3101 displayed currently on the display to be changed to a home screen 3213 to be displayed.

FIG. 32B illustrates that a personalized home screen 3213 is displayed on the second area.

Figure 32C:
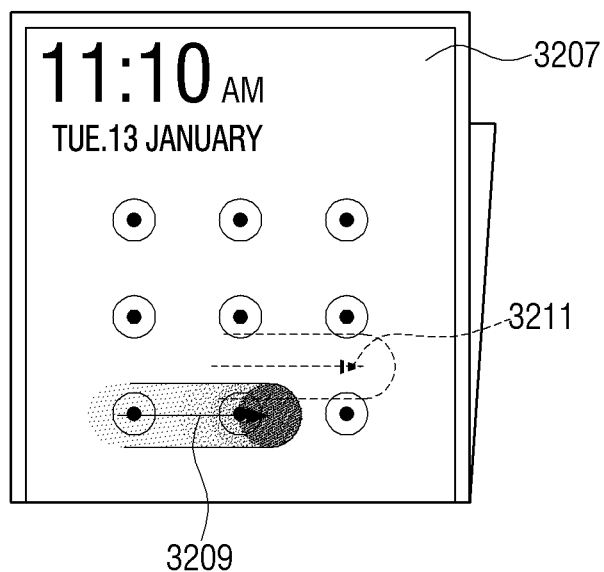

FIG. 32C illustrates where the first screen is a lock screen 3207, dragging gestures 3209 and 3211 are detected simultaneously on the second area and the first area of the display 230. The controller 290 may detect dragging interactions of simultaneously dragging on the second area and the first area, while the display 230 is in the second folding state and a lock screen is displayed on the second screen, and control the display to display a personalized home screen 3213 (FIG. 32B) to be displayed in response to the dragging interactions.

Figure 33A:
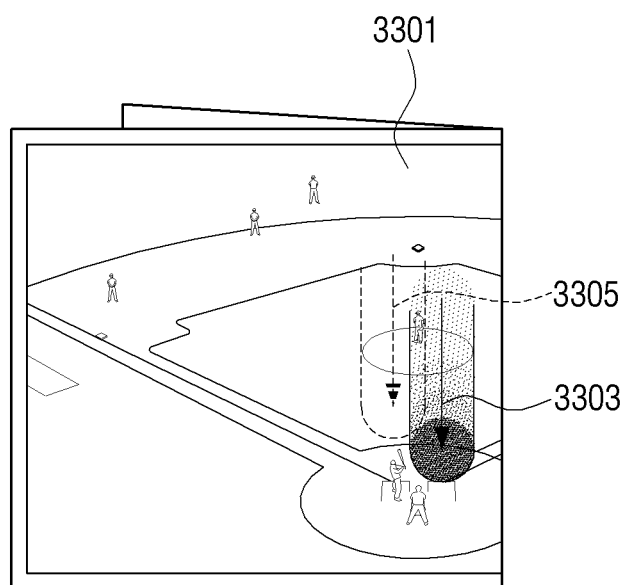
FIGS. 33A to 33C are views illustrating that a user interaction is detected simultaneously on a display and a cover, and a first screen is temporarily turned off or a lock screen is displayed according to a user interaction, according to various exemplary embodiments.
Figure 33B:
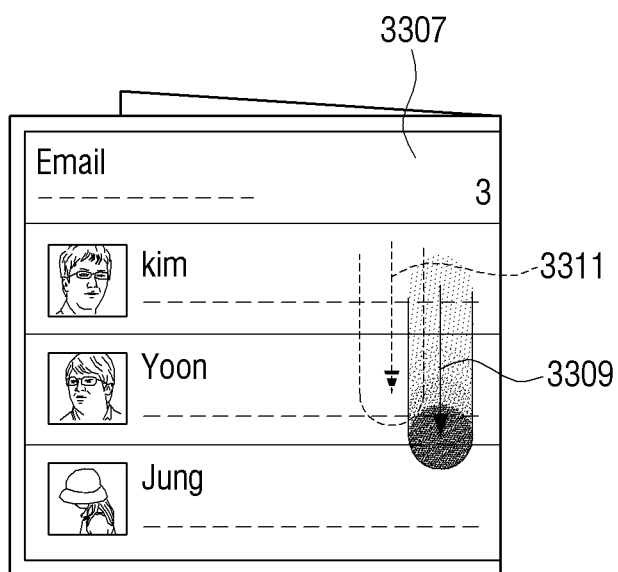
Figure 33C:
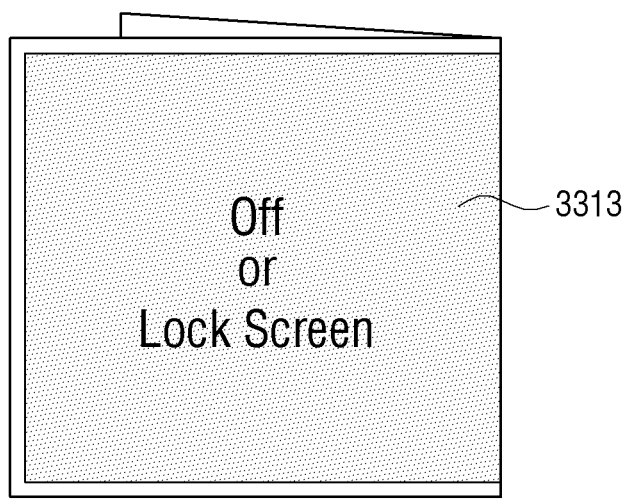

FIGS. 33A to 33C are views illustrating that user interactions are detected simultaneously on a display 230 where a first screen is displayed, and a cover, and then the first screen is temporarily turned off or a lock screen is displayed based on the user interaction.

FIG. 33A illustrates that the first screen 3301 is displayed on the display 230 which is folded in a second folding state, and user interactions 3303 and 3305 are detected simultaneously on the second area and on first area of the display 230.

The controller 290 may control the display 230 to change the first screen to be in a screen-off state or display a lock screen, in response to user interactions 3303 and 3305.

FIG. 33B illustrates that a first screen 3307 is displayed on the display 230 folded in the second folding state, and user interactions 3309 and 3311 are detected simultaneously on the second area and the first area of the display 230.

The controller 290 may control the display 230 to change the first screen to a screen-off state or display a lock screen, in response to user interactions 3303 and 3305.

FIG. 33C illustrates that the first screen of the display 230 is changed to the second screen. The second screen many be in a screen-off state. Also, the second screen may be a lock screen.

FIGS. 34A to 36B are views illustrating that, in a screen-off state of the display 230, a screen-off state of the display 230 of the user terminal device 200 is converted to be in a screen-on state, while the display 230 or the cover is touched.

While a touch is being detected, a state of the full screen of the display may be changed to a screen-on state. Or, while a touch is being detected, a state of an area where a touch is being detected may be changed to a screen-on state.

Figure 34A:
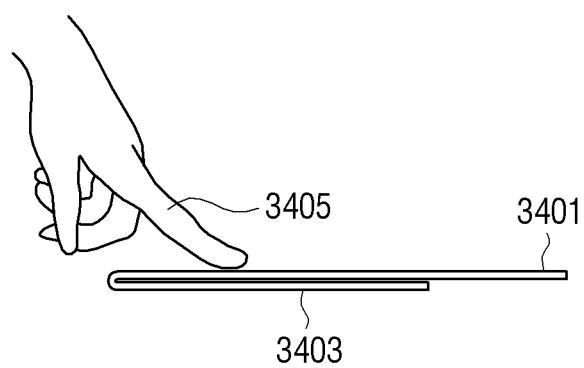
FIGS. 34A to 36B are views illustrating that, in a screen-off state of a display of a user terminal device, a state of the display is converted to a screen-on state while the display or the cover is being touched, according to various exemplary embodiments.

FIG. 34A illustrates a second folding state of a display 230. The second area 3401 and the first area 3403 of the display 230 are exposed to outside, and the second area 3401 and the first area 3403 may detect a touch, in a screen-off state.

If a user touches the second area 3401 in a screen-off state (3405), the detector 280 may detect the user's touch, and the controller 290 may change, to a screen-on state, a state of a screen of the full area of the second area 3401 or a screen in the vicinity of an area which is a touch-detecting part of the second area 3401, while the user's touch is detected. On an area which is in a screen-on state, information may be displayed.

The screen-off state may be a black screen state.

Figure 34B:
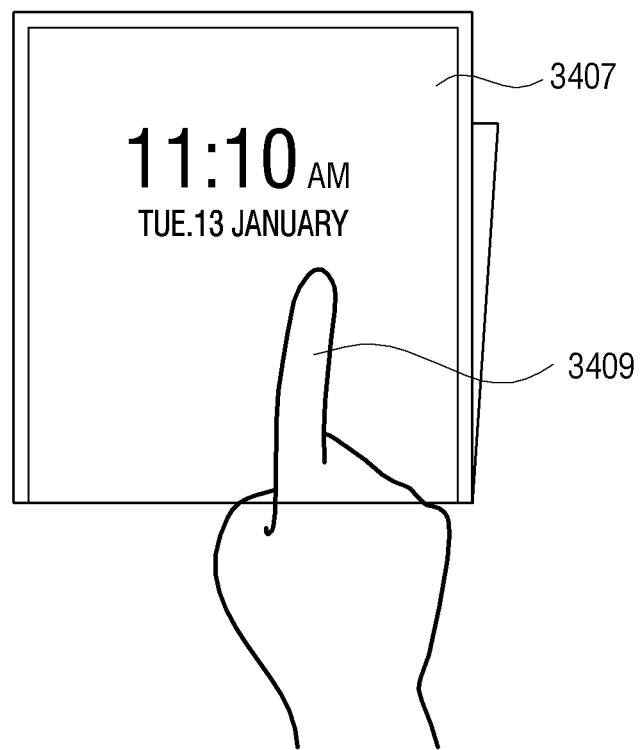

FIG. 34B illustrates that a user's touch 3409 is detected on a second area 3407 of the display, and a state of the second area 3407 where the touch is detected is changed to a screen-on state.

Figure 35A:
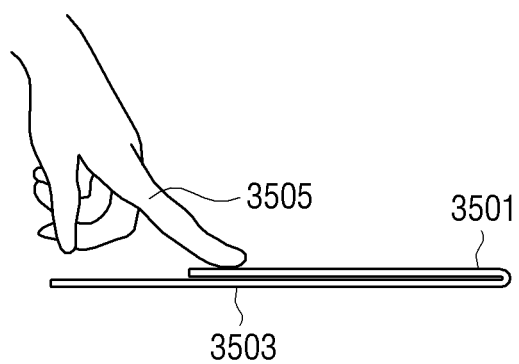

FIG. 35A illustrates a second folding state of the display. The first area 3501 and the second area 3503 of the display are exposed to outside, and the first area 3501 and the second area 3503 can detect a touch, in a screen-off state.

If a user touches the first area 3501 in a screen-off state 3505, the detector may detect the user's touch, and the controller 290 may change, to a screen-on state, a state of a screen of the full area of the first area 3501 or a screen in the vicinity of an area which is a touch-detecting part of the first area 3501, while the user's touch is detected. On an area which is a screen-on state, information may be displayed.

The screen-off state may be a black screen state.

Figure 35B:
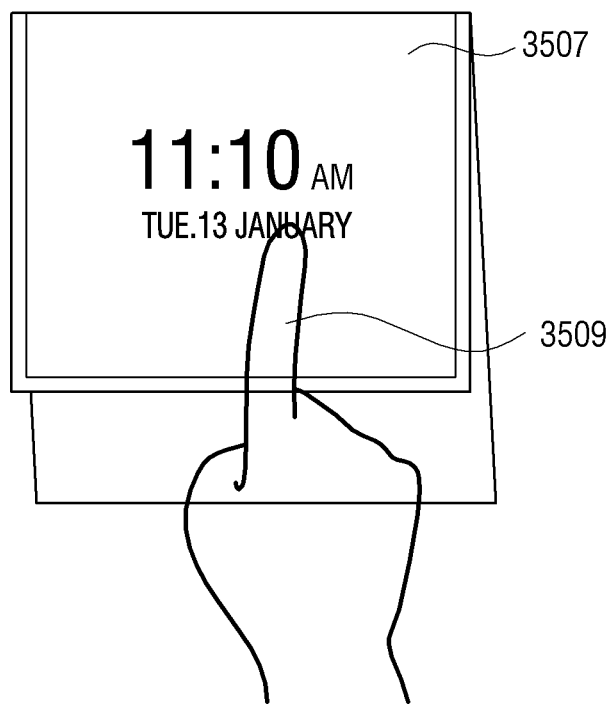

FIG. 35B illustrates that that a user's touch 3509 is detected at the first area 3507 of the display 230, and a state of the first area 3507 where the touch is detected is changed to a screen-on state.

Figure 36A:
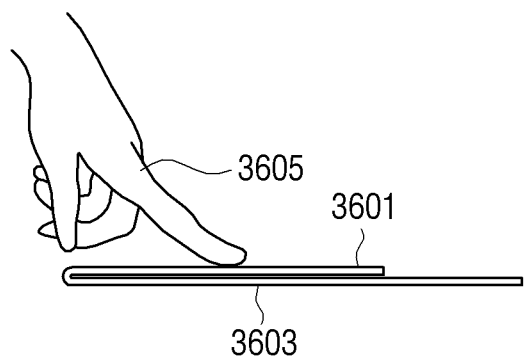

FIG. 36A illustrates a first folding state of the display 230. Covers 3601 and 3603 can detect a user's touch, and a part of the second area of the display 230 is exposed to outside. A user's touch may be detected on the covers 3601 and 3603.

Figure 36B:
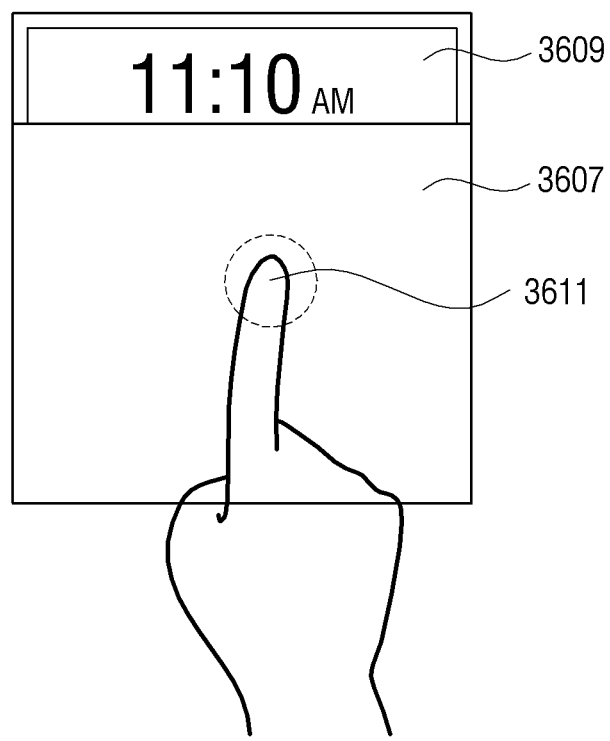

FIG. 36B illustrates a cover 3607, and an exposure area 3609 which is an exposed part of the second area.

If user touches (3611) the cover 3607 in a screen-off state, the exposure area 3609 is changed from a screen-off state to a screen-on state, and information may be displayed.

The screen-off state may be a black screen.

FIGS. 37A to 40B are drawings illustrating that a volume of the user terminal device 200 may be regulated in a screen-off state of the display 230, in response to a user's interaction detected on the display 230 and the cover.

The user terminal device 200 may detect a user interaction on the display 230 and the cover, in a screen-off state of the display. The user terminal device 200 may regulate volume of the user terminal device 200 according to a user interaction.

The screen-off state is a black screen state.

Figure 37A:
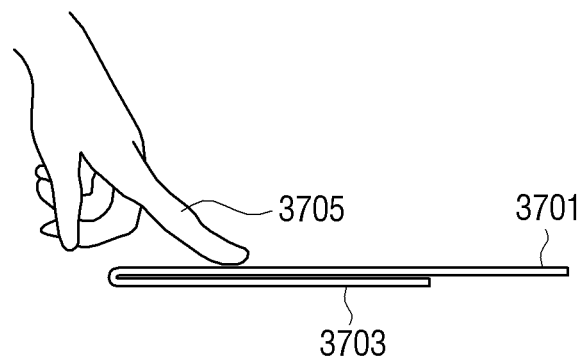
FIGS. 37A to 40B are views illustrating that, in a screen-off state of a display of a user terminal device, volume of a user terminal device is regulated, in response to a user interaction detected on a display and a cover, according to various exemplary embodiments.

FIG. 37A illustrates that the display 230 is folded such that covers face each other. The second area 3701 and the first area 3703 of the display are exposed to the outside, and a user interaction 3705 can be detected on a second area 3701.

Figure 37B:
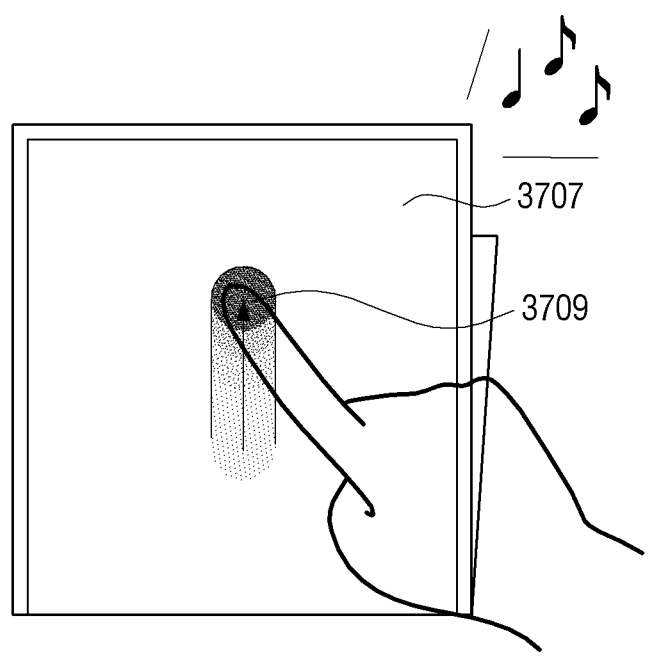

FIG. 37B illustrates that if a user interaction 3709 is detected on a second area 3707 in a screen-off state, while an application for outputting audio such as a music application is executed, the user terminal device 200 may regulate volume of the user terminal device 200, in response to the user interaction 3709.

The screen-off state may be black screen state.

Figure 38A:
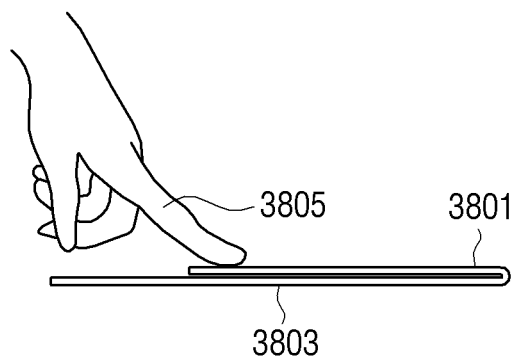

FIG. 38A illustrates that a display may be folded such that covers face each other. A first area 3801 and a second area 3803 of the display are exposed to outside, and a user interaction 3805 can be detected on the first area 3801.

Figure 38B:
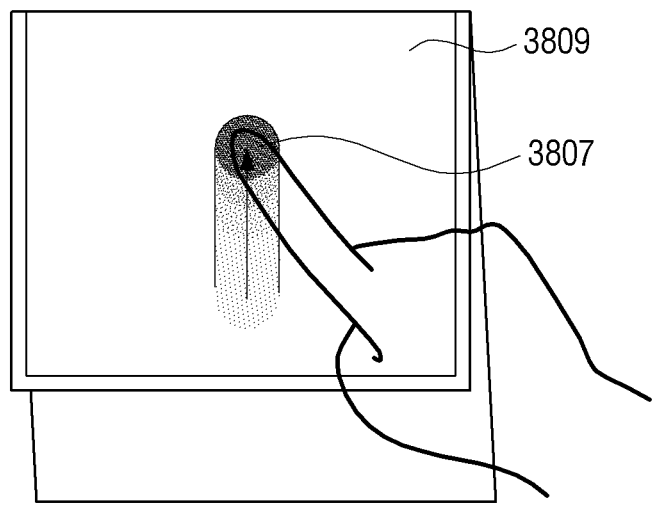

FIG. 38B illustrates that if an application for outputting audio such as a music application is executed, and a user interaction 3807 is detected on a first area 3809 in screen-off state, the user terminal device 200 may regulate volume of the user terminal device 200 in response to the user interaction 3807.

The screen-off state may be a black screen state.

Figure 39A:
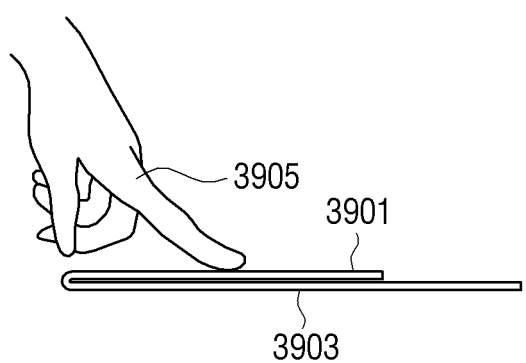

FIG. 39A illustrates that a display may be folded such that a first area and a second area face each other. Only a part 3911 (FIG. 39B) of a second area of the display 230 is exposed to outside, and a user interaction 3905 may be detected on covers 3901 and 3903.

Figure 39B:
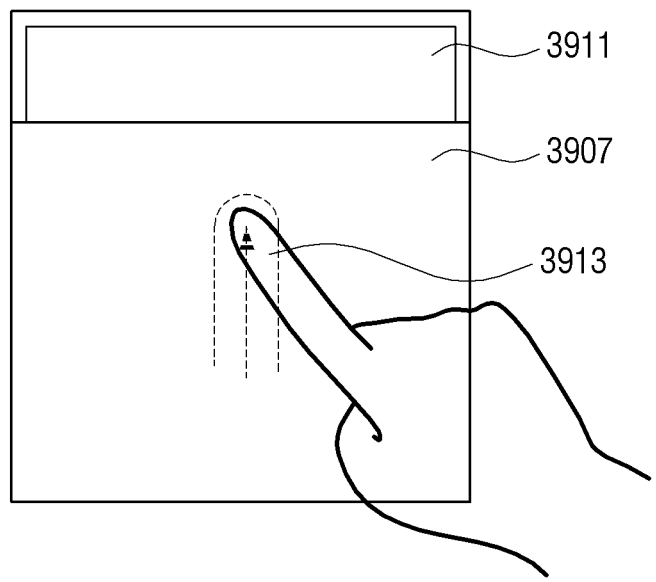

FIG. 39B illustrates that if an application for outputting audio such as a music application is executed, and a user interaction 3913 is detected in screen-off state, the user terminal device 200 may regulate volume of the user terminal device 200 in response to the user interaction 3913.

An exposure area 3911 of the second area of the display 230 may be maintained to be in a screen-off state.

The screen-off state may be black screen state.

Figure 40A:
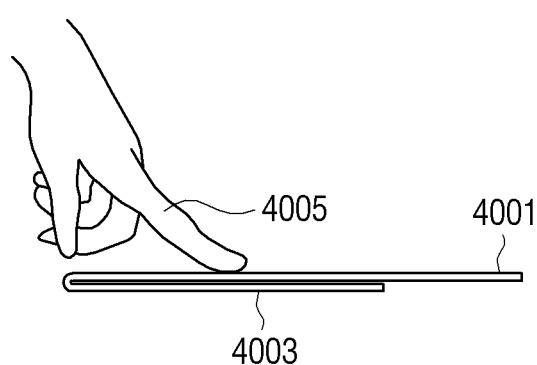

FIG. 40A illustrates that a display 230 may be folded such that the first area and the second area face each other. Only a part of a second area of the display 230 is exposed to the outside, and a user interaction 4005 can be detected on covers 4001 and 4003.

Figure 40B:
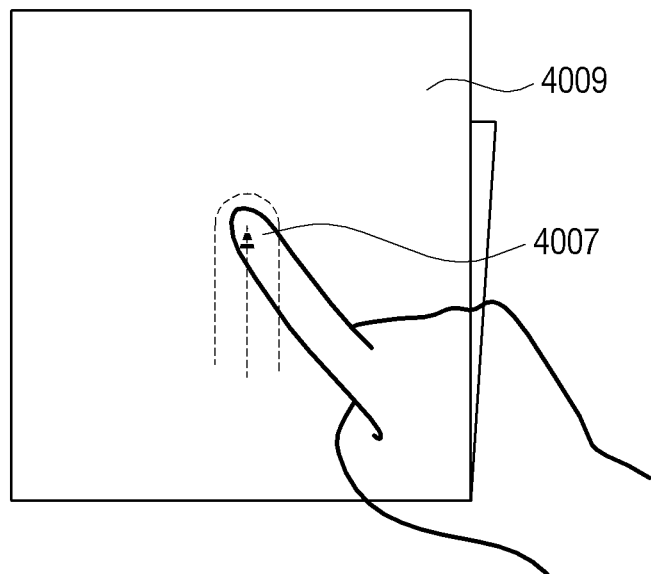

FIG. 40B illustrates that if an application for outputting audio such as a music application is executed, and a user interaction 4007 is detected on a cover 4009 in screen-off state, the user terminal device 200 may regulate volume of the user terminal device 200 in response to the user interaction 4007.

The screen-off state may be black screen state.

Figure 52:
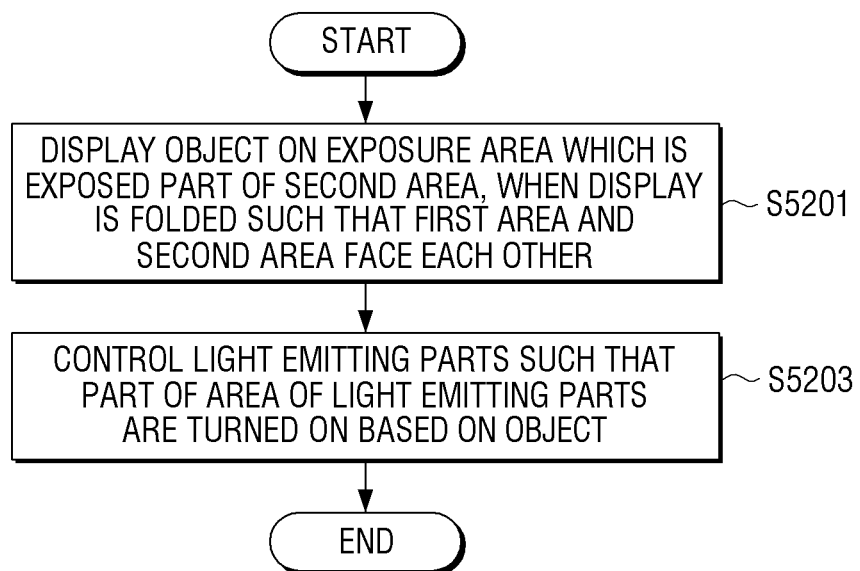
FIG. 52 is a flowchart illustrating a process performed when an affordance is displayed on a cover which includes light emitting parts in response to a user interaction, according to various exemplary embodiments.

FIGS. 41A to 46C are views illustrating one or more exemplary embodiments that various affordances, i.e., visual indicators, are provided on a cover which includes a plurality of light emitting parts, in response to a user interaction, and FIG. 52 is a flowchart illustrating a processing of displaying an affordance, i.e., visual indicator, on a cover which includes a plurality of light emitting parts, in response to the user interaction.

The user terminal device 200 may include a display 230 and a cover. The display may be divided into a first area and a second area larger than the first area.

The cover may be disposed on a rear side of the display 230 and include a plurality of light emitting parts. The detector 280 may detect a user interaction on the display 230 and the cover.

If the display is folded such that the first area and the second area face each other with reference to a folding line, the user terminal device 200 may display an object on an exposure area which is an exposed part of the second area (S5201), and control light-emitting parts such that an area of the cover is turned on based on the object. Specifically, the controller may control the light emitting parts such that an affordance, i.e., visual indicator, corresponding to the object is displayed on a cover.

Figure 41A:
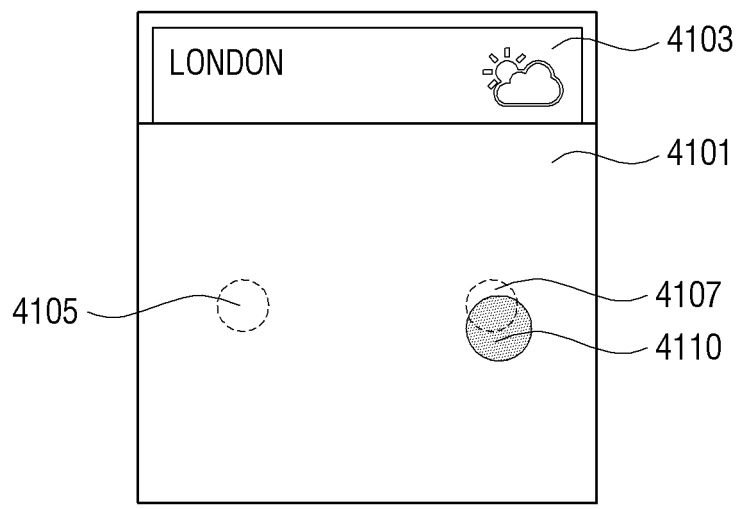
FIGS. 41A to 46C are views illustrating that in response to a user interaction, various possibilities of action are provided on a cover which includes a plurality of light emitting parts.

FIG. 41A illustrates that a display is folded such that a first area and a second area of the display 230 face each other.

The second area of the display may be covered with a cover 4101 and may include an exposure area which is an exposed part of a second area 4103. On the exposure area 4103, information such as a telephone number, a received SNS or SMS message, an informing message, an application, etc., may be displayed.

The cover 4101 may include a plurality of light emitting parts. For instance, a plurality of LEDs may be disposed in a form of 3×4 (FIG. 41D). The controller 290 may control the light emitting parts to provide an affordance, i.e., visual indicator, corresponding to a displayed object. Specifically, the controller 290 may turn on or turn off one or more of the plurality of LEDs and provide an affordance, i.e. visual indicator, corresponding to a displayed object.

For example, as illustrated in FIG. 41A, if weather information of a specific region is displayed on an exposure area 4103, the controller 290 may control light emitting arts of the cover to provide an affordance for displaying weather information of another region. The controller 290 may turn on two LEDs 4105, 4107 and provide an affordance so that a user can touch the affordance. If the user touches the LED 4107, weather information of another region may be displayed on an exposure area 4103. The term "touching a LED" refers to directly touching an LED or touching an area in the vicinity of an LED.

Figure 41B:
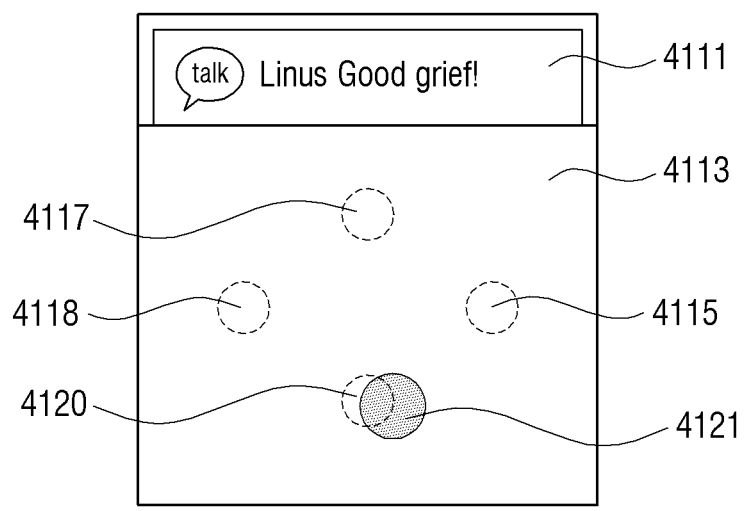

FIG. 41B illustrates that a display 230 is folded such that a first area and a second area face each other.

The second area of the display 230 is covered with a cover 4113, and may include an exposure area 4111, which is a part of the second area, which is exposed to outside. If chatting message information is displayed on the exposure area 4111, other messages may be displayed by scrolling in up/down/left/right direction. The controller 290 may control a plurality of LEDs to provide an affordance for inducing a user interaction for scrolling in up/down/left/right direction. The controller 290 may turn on four LEDs 4115, 4117, 4118, 4120 and provide an affordance so that a user can touch the affordance. If the user touches 4121 the LED 4120, other messages may be displayed on the exposure area 4111. The term "touching a LED" refers to directly touching an LED or touching an area in the vicinity of an LED.

Figure 41C:
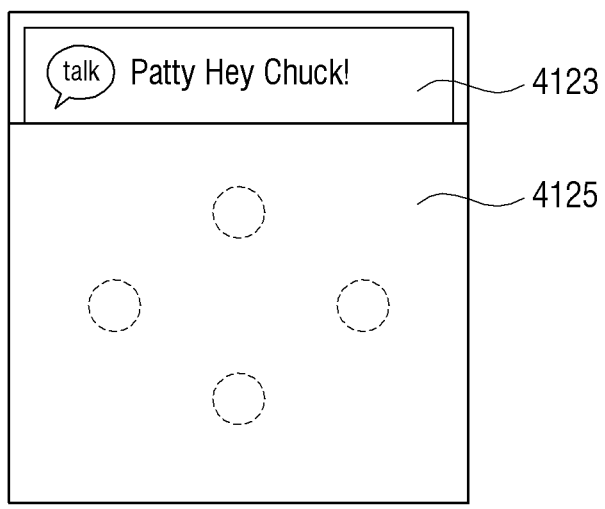
Figure 41D:
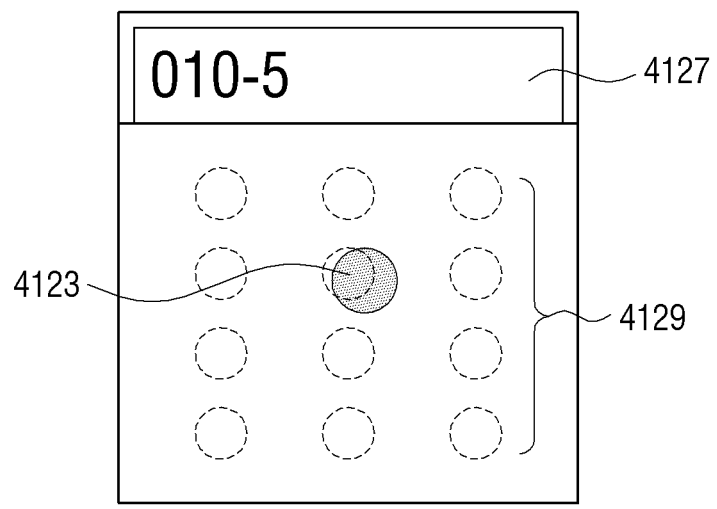

FIG. 41C illustrates that other message information may be displayed on an exposure area 4123 in response to a user's touching a LED 4120 as illustrated in FIG. 41B. On the cover 4125, four LEDs are turned on.

FIG. 41D illustrates that a display 230 may be folded such that a first area and a second area face each other.

The second area of the display 230 is covered with a cover, and may include an exposure area 4127, which is a part of the second area, which is exposed to the outside. On the exposure area 4127, a GUI for inputting a telephone number may be displayed.

On the cover, affordances informing an inputting of a telephone number may be provided. The controller 290 may control all of the 12 LEDs to be turned on and, if a user touches the LEDs, control numbers corresponding to the locations of the LEDs to be input.

For example, if the user touches an LED 4123 located in a position corresponding to '5,' '5' may be displayed on an exposure area 4127.

The term "touching a LED" refers to directly touching an LED or touching an area in the vicinity of an LED.

Figure 42A:
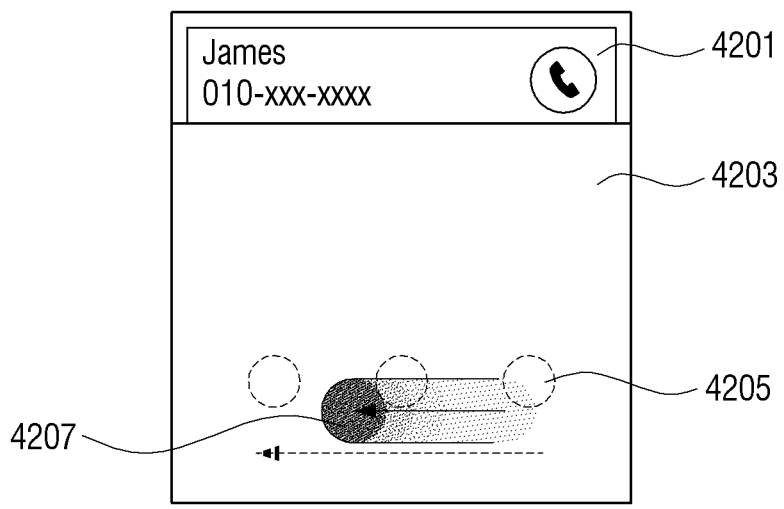

FIG. 42A illustrates that a display 230 may be folded such that a first area and a second area face each other.

The second area of the display 230 is covered with a cover 4203 and may include an exposure area 4201, which is a part of the second area, which is exposed to the outside. If a telephone call request is received, a message for informing that the telephone call request is received may be displayed on the exposure area 4203. An affordance 4205 which is associated with the telephone call request may be provided on a cover 4203. Specifically, the affordance may be provided by turning on three LEDs sequentially, such that a user may perform an interaction 4207 along a direction where the LEDs are sequentially turned on.

Figure 42B:
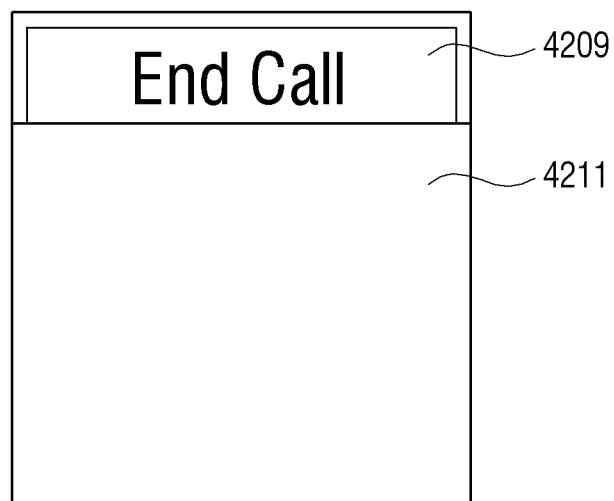

For example, if, upon receipt of a telephone call request, a UI for informing that the telephone call request is displayed on the exposure area 4201, and a user drags along a cover 4203 from right to left side 4207 along a direction where LEDs are turned on, the telephone call request may be rejected as illustrated in FIG. 42B. If a user drags along a cover 4203 from left to right the call may be accepted.

Figure 43:
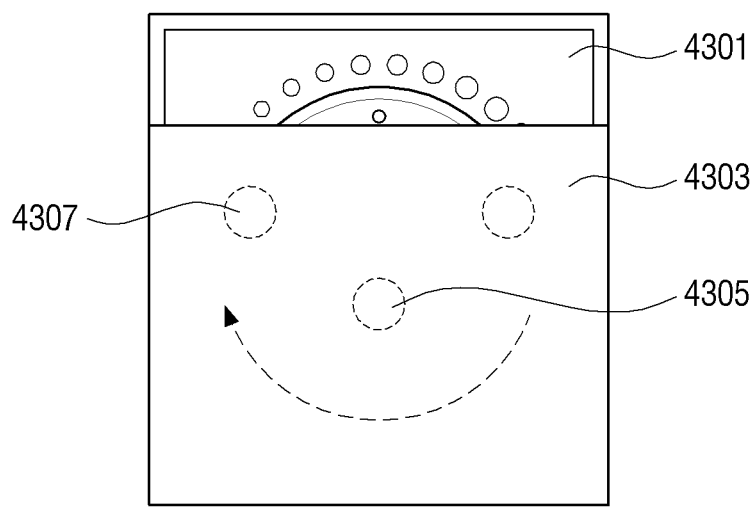

FIG. 43 illustrates that a display is folded such that a first area and a second area face each other.

The second area of the display 230 is covered with a cover 4303 and may include an exposure area 4301, which is an area of the second area, which is exposed to outside. An affordance which induces a user interaction may be provided on the exposure area 4301 and a cover 4203.

For instance, if an interaction which requires rotation of a user's finger is needed, a GUI object may be displayed on the exposure area 4301, and an affordance corresponding to the object may be provided on a cover. Specifically, a plurality of LEDs 4305 and 4307 may flick or drag in a circular form on the cover 4303.

Figure 44A:
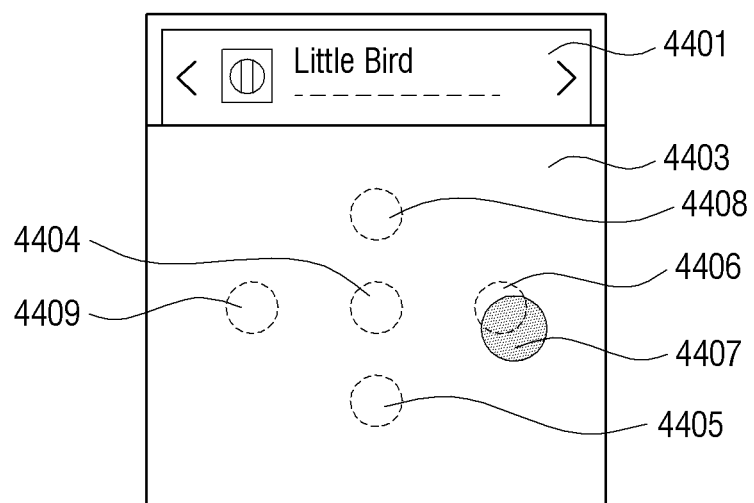

FIG. 44A illustrates that a display 230 is folded such that a first area and a second area face each other.

The second area of the display 230 is covered with a cover 4403, and may include an exposure area 4401, which is a part of the second area, which is exposed to the outside. If a music application is executed in the user terminal device 200, information regarding a currently-played music may be displayed on the exposure area 4401.

An affordance for playing a next song or a previous song and an affordance for turning up or turning down volume of a currently replayed song may be provided on the cover 4403. Specifically, the affordance may be provided by turning on five LEDs 4404, 4405, 4406, 4408, 4409 from among 12 LEDs disposed on the cover, which are disposed in the center of the display.

For instance, if a user touches (4407) the LED 4406, a next song may be selected. If a user touches the LED 4409, a previous song may be selected. If the user touches the LED 4408, volume may be turned up. If the user touches the LED 4405, volume may be turned down. If the user touches the LED 4404, a currently selected song may be replayed or stopped. These are merely examples of functions. The inventive concept is not limited to these functions.

Figure 44B:
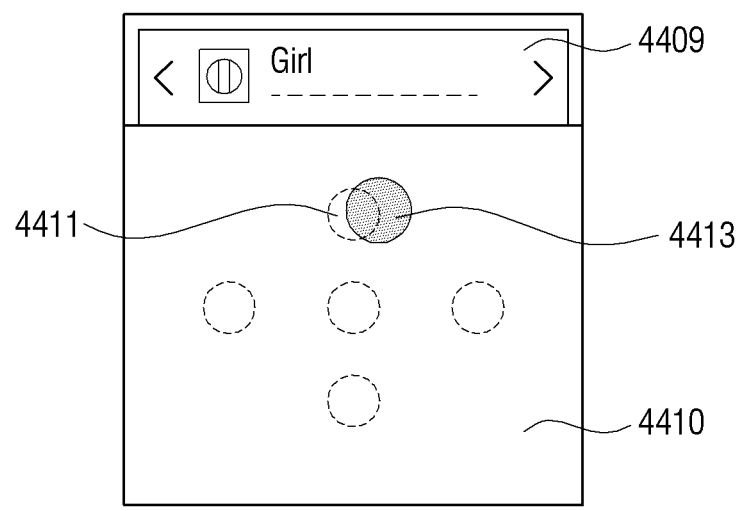

FIG. 44B illustrates information on a currently replayed song is displayed on an exposure area 4409. Five LEDs among 12 LEDs, which are disposed on the center, are turned on the cover.

If a user touches 4413 an LED 4411, volume may be turned up.

Figure 44C:
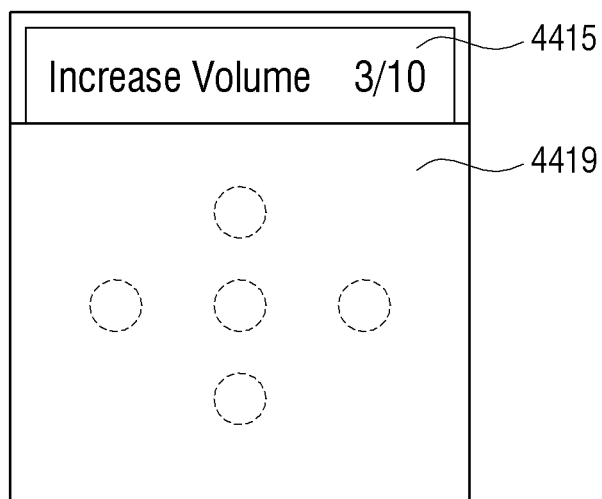

Referring to FIG. 44C, information on the volume is displayed on an exposure area 4415. FIGS. 44B and 44C illustrate that if a user touches an LED 4411, which is included on a cover 4419 (FIG. 44C), information displayed on the exposure area is changed to information on a volume to be displayed.

Figure 45A:
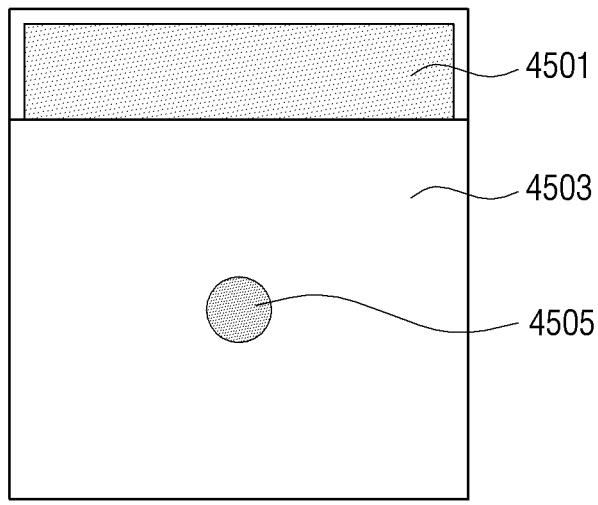
Figure 45B:
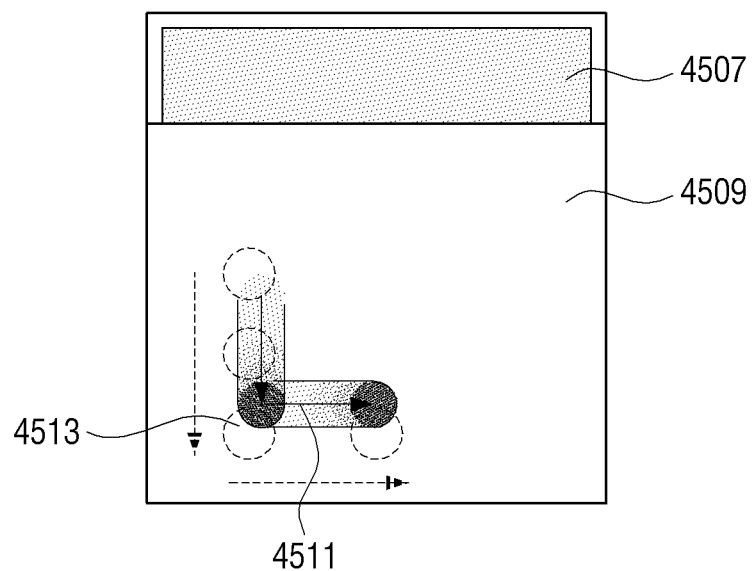
Figure 45C:
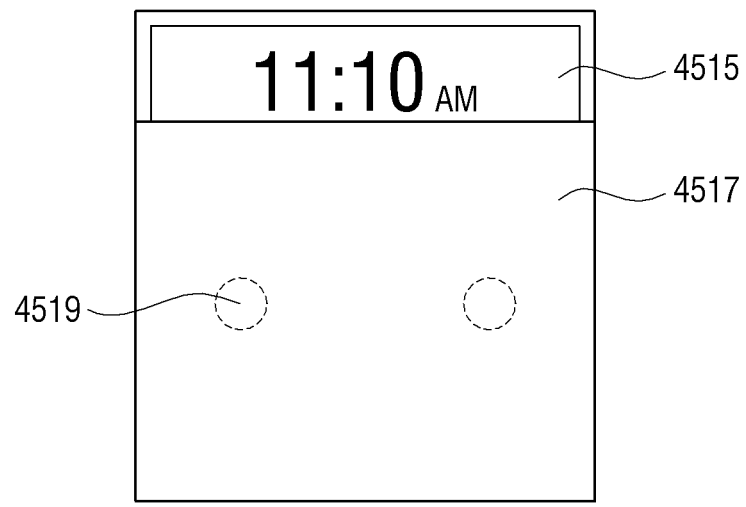

FIGS. 45A to 45C are views illustrating that if a screen is turned off while a display 230 is folded such that a first area and a second area of the display 230 face each other, a state of a screen is changed to be a screen-on state, in response to a user interaction detected on the cover.

FIG. 45A illustrates that the display 230 is folded such that the first area and the second area face each other.

The second area of the display 230 is covered with a cover 4503 and may include an exposure area 4501, which is a part of the second area, which is exposed to outside. If a user touches 4505 a cover in a screen-off state, a user terminal device may provide an affordance for inducing an interaction of turning on the screen, on the cover.

FIG. 45B illustrates that affordances 4513 and 4511 of inducing an interaction of turning on a screen on a cover 4509 is provided, in response to a user interaction of touching a cover as illustrated in FIG. 45A.

The exposure area 4507 maintains a screen-off state.

The user terminal device may display an object on the exposure area (4515, FIG. 45C) if the user brings his finger into contact with an provided affordance, drags in the bottom direction 4513 (FIG. 45B), and then keeps dragging in the right direction 4511.

FIG. 45C illustrates that an object is displayed on an exposure area 4515. An affordance 4519 associated with the currently displayed object may be displayed on the cover 4515.

Figure 46A:
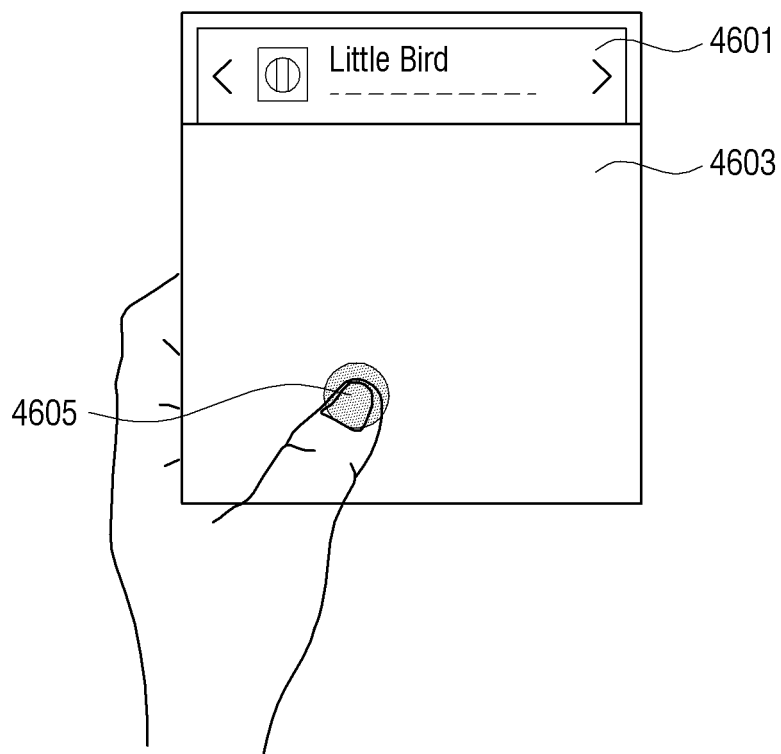
Figure 46B:
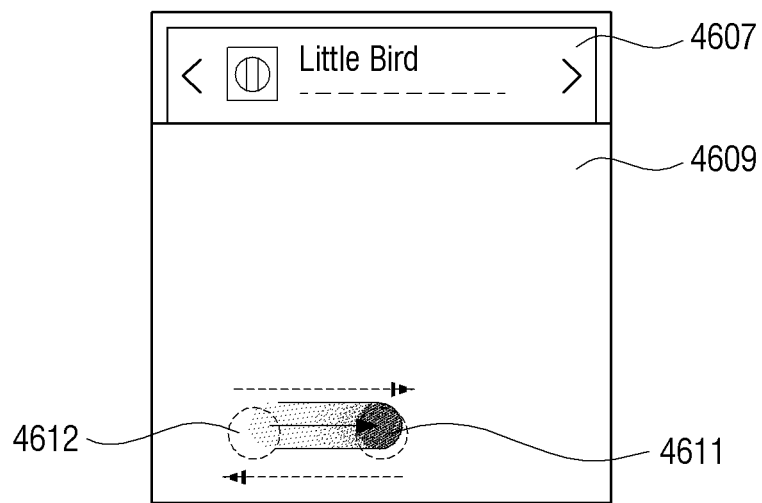
Figure 46C:
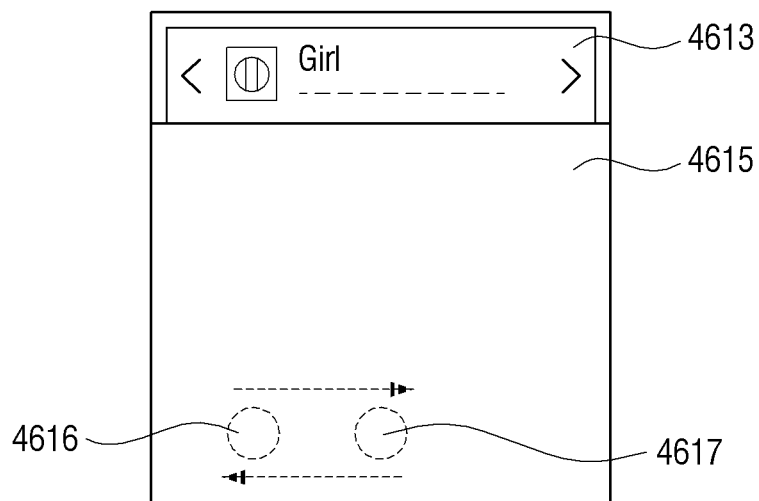

FIGS. 46A to 46C are views illustrating that an affordance corresponding to a user's touching a cover is provided, while the display 230 is folded such that a first area and a second area face each other.

FIG. 46A illustrates that a display 230 is folded such that a first area and a second area face each other.

The second area of the display 230 is covered with a cover 4603, and may include an exposure area 4601, which is an part of the second area, which is exposed to outside. If a user touches 4605 the cover, an affordance may be provided with reference to the touched point.

FIG. 46B illustrates that an object is displayed on an exposure area 4607, and affordances 4611 and 4612 are provided on a cover 4609. An affordance for selecting a next or a previous song upon a user's touching a cover may be provided. Specifically, LEDs flick in left and right direction, and thus a user's interaction of dragging in left and right direction may be induced.

FIG. 46C illustrates that an object is displayed on an exposure area 4613, and affordances 4616 and 4617 are provided on a cover 4615.

If a user touches an LED 4616, a previous song is selected, and if a user touches an LED 4617, a next song may be selected.

A displaying method of a user terminal device according to various exemplary embodiments may be realized as a program and provided in a user terminal device. Specifically, a non-transitory computer readable medium which stores a program including a controlling method of a user terminal device may be provided.

The non-transitory recordable medium refers to a medium which may store data semi-permanently rather than storing data for a short time such as a register, a cache, and a memory and may be readable by an apparatus. Specifically, the non-transitory readable medium may be CD, DVD, hard disk, Blu-ray disk, USB, memory card, ROM, etc.

The foregoing embodiments and advantages are merely exemplary and are not to be construed as limiting the present invention. The present teaching can be readily applied to other types of apparatuses. Also, the description of one or more exemplary embodiments of the present inventive concept is intended to be illustrative, and not to limit the scope of the claims, and many alternatives, modifications, and variations will be apparent to those skilled in the art.

What is claimed is:

1. A user terminal device, comprising:
a single flexible display configured to be divided into a first display area and a second display area by a folding line, and an exposure area of the first display area being not covered by the second display area when the user terminal device is folded so that the first display area faces the second display area;
a cover disposed on a rear side of the single flexible display;
a detector configured to detect a user interaction on the single flexible display and the cover; and
a controller configured to:
if the single flexible display is folded along the folding line such that the first display area and the second display area face each other, control the detector to detect a user interaction through the exposure area and the cover, and
if the single flexible display is folded along the folding line such that two parts of the cover face each other, control the detector to detect a user interaction through the first display area and the second display area.

2. The user terminal device of claim 1, wherein the controller is configured to, in response to a user interaction being detected on the cover while the single flexible display is unfolded, control the single flexible display to rotate a currently executed one or more applications in a direction of a z axis to be displayed.

3. The user terminal device of claim 1, wherein the controller is configured to, in response to a telephone call request being received while the single flexible display is folded such that the first display area and the second display area face each other, control the single flexible display to display a UI for informing that a telephone call request is received on the exposure area, and accept or reject the telephone call request according to a user interaction detected on the cover.

4. The user terminal device of claim 1, wherein the controller is configured to, in response to a user interaction of dragging simultaneously in a same direction being detected on the single flexible display and the cover while the single flexible display is unfolded, control the single flexible display to display a currently executed one or more applications overlapping.

5. The user terminal device of claim 1, wherein the controller is configured to, in response to a user interaction of dragging simultaneously in different directions being detected on the single flexible display and the cover while the single flexible display is unfolded, control the single flexible display to display a currently executed one or more applications overlapping by a predetermined angle.

6. The user terminal device of claim 1, wherein the controller is configured to, in response to a user interaction being detected simultaneously on the first display area and the second display area of the single flexible display while the single flexible display is folded such that the two parts of the cover face each other, control a first screen displayed on the second display area to be changed to a second screen.

7. The user terminal device of claim 6, wherein the first screen is a lock screen.

8. The user terminal device of claim 6, wherein the second screen includes a menu screen corresponding to the first screen.

9. A user interaction controlling method of a user terminal device which includes a single flexible display divided into a first display area and a second display area by a folding line, an exposure area of the first display area being not covered by the second display area when the user terminal device is folded so that the first display area faces the second display area, and a cover which is disposed on a rear side of the single flexible display, the method comprising:
detecting a first folding state of the single flexible display and a second folding state where the single flexible display is folded in a direction opposite to the direction of the first folding state; and
controlling, in the first folding state, a user interaction to be detected through the exposure area and the cover, and
controlling, in the second folding state, a user interaction to be detected through the first display area and the second display area.

10. The method of claim 9, wherein in the first folding state, the single flexible display is folded such that the first display area and the second display area face each other.

11. The method of claim 9, further comprising:
detecting a user interaction on the cover while the single flexible display is unfolded; and
rotating and displaying a currently executed one or more applications in a direction of a z-axis based on the user interaction.

12. The method of claim 9, further comprising:
receiving a telephone call request while the single flexible display is in the first folding state;
detecting a user interaction on the cover; and
accepting or rejecting the telephone call request based on the user interaction.

13. The method of claim 9, further comprising:
while the single flexible display is in an unfolded state, simultaneously detecting a first user interaction on the single flexible display and a second user interaction on the cover; and
displaying a currently executed one or more applications overlapping on the single flexible display based on the first user interaction and the second user interaction.

14. The method of claim 13, wherein, in response to the first user interaction being in a first direction and the second user interaction being in a second direction different than the first direction,
displaying the one or more applications overlapping by a predetermined angle.

15. The method of claim 11, further comprising:
detecting user interactions simultaneously on the first display area and the second display area while the single flexible display is in the second folding state; and
changing a first screen displayed on the first display area or the second display area, to a second screen, in response to the user interactions.

16. The method of claim 15, wherein the first screen is a lock screen.

17. The method of claim 15, wherein the second screen includes a menu screen corresponding to the first screen.

* * * * *